United States Patent [19]
Bolin et al.

[11] Patent Number: 5,191,617
[45] Date of Patent: Mar. 2, 1993

[54] VOICE INTERACTIVE COMPUTER SYSTEM

[75] Inventors: P. Stanley Bolin; Reginald B. Mason, both of Midwest City, Okla.

[73] Assignee: Intechnica International, Inc., Midwest City, Okla.

[21] Appl. No.: 543,964

[22] Filed: Jun. 22, 1990

Related U.S. Application Data

[63] Continuation of Ser. No. 423,628, Oct. 18, 1989, abandoned, which is a continuation of Ser. No. 40,512, Apr. 20, 1987, abandoned.

[51] Int. Cl.⁵ .............................................. G10L 5/00
[52] U.S. Cl. ........................................ 381/51; 381/47
[58] Field of Search ................. 364/513.5; 381/51-53; 434/115, 156, 167

[56] References Cited

U.S. PATENT DOCUMENTS 3,371,321  2/1968  Adams ............................. 340/172.5
4,016,540  4/1977  Hyatt ............................... 340/172.5

OTHER PUBLICATIONS

IEEE Paper written by James L. Flanagan, published in Apr., 1976, and entitled "Computers That Talk and Listen: Man-Machine Communication By Voice".
Martin J. Petersen, Jr., An Evaluation of Voxbox, A Computer-Based Voice-Interactive Language Learning System for Teaching English as a Second Language, 1990.
John Underwood, Linguistics Computers and the Language Teacher, 1984, pp. 40-50.
Geoffrey R. Hope, Heimy F. Taylor, James P. Pusack, Using Computers in Teaching Foreign Languages, 1984, pp. 6-11.
John Higgins, Tim Johns, Computers in Language Learning, 1984, pp. 35-87.

Primary Examiner—Emanuel S. Kemeny
Attorney, Agent, or Firm—Cushman, Darby & Cushman

[57] ABSTRACT

A voice interactive computer system having voice digitizing circuitry for digitizing voice input from an operator. The voice digitizing circuitry is preferably placed on a computer card in operative association with a central processing unit in the computer. The digitized voice input may be selectively replayed and compared with a prerecorded language vocabulary stored on a compact disc read only memory connected to the computer. The compact disc read only memory is also used for storing software which provides interaction between the voice digitizing circuitry and the computer central processing unit and random access memory in the computer. The voice digitizing circuitry may be placed on a separate computer card positioned in a slot in a bus in operative association with the central processing unit or combined with other cards. The digitized voice input may also be stored on magnetic media such as a computer disc for later review by others, such as a teacher. A method of using the voice interactive computer system in teaching a second language to a student having proficiency in a first language is also disclosed.

5 Claims, 19 Drawing Sheets

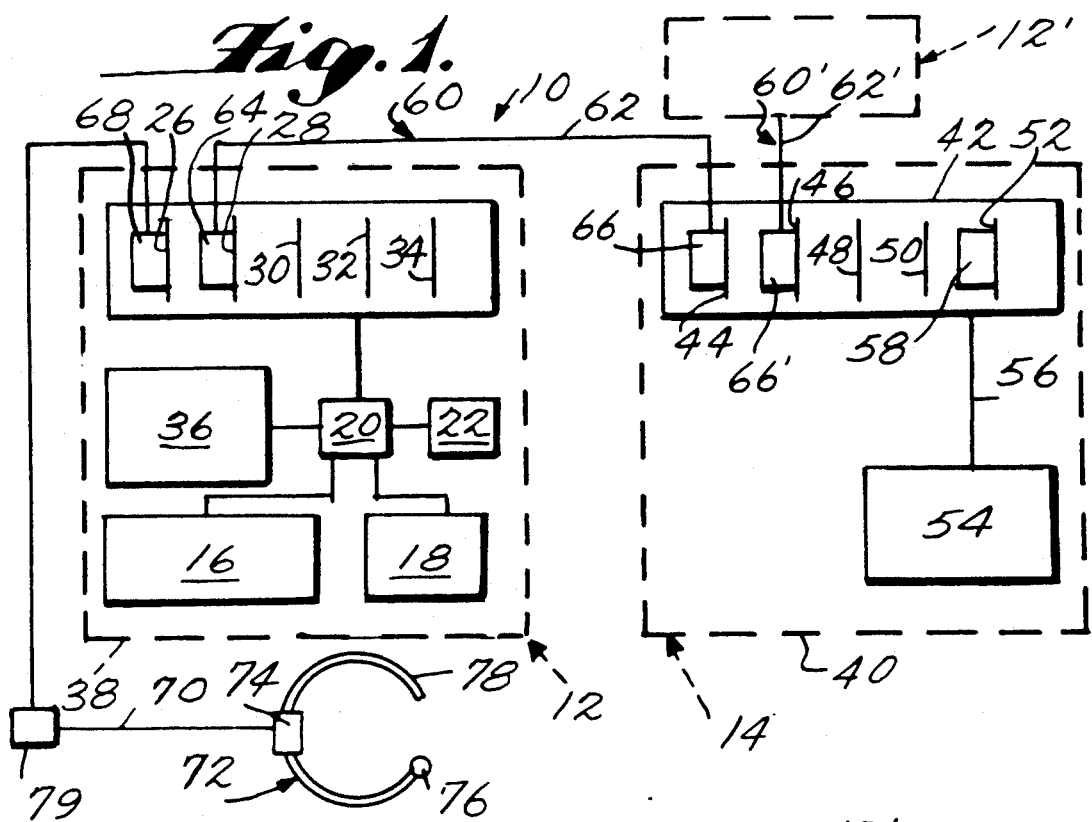
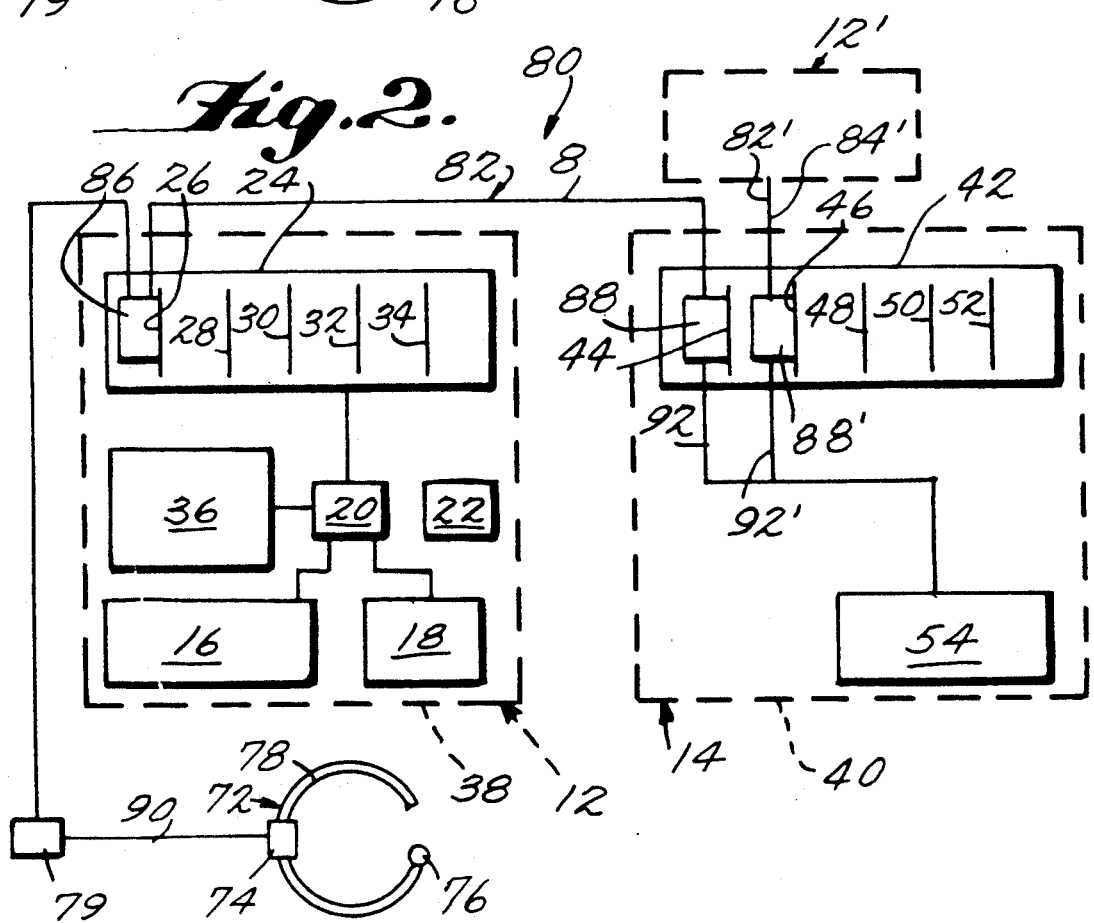

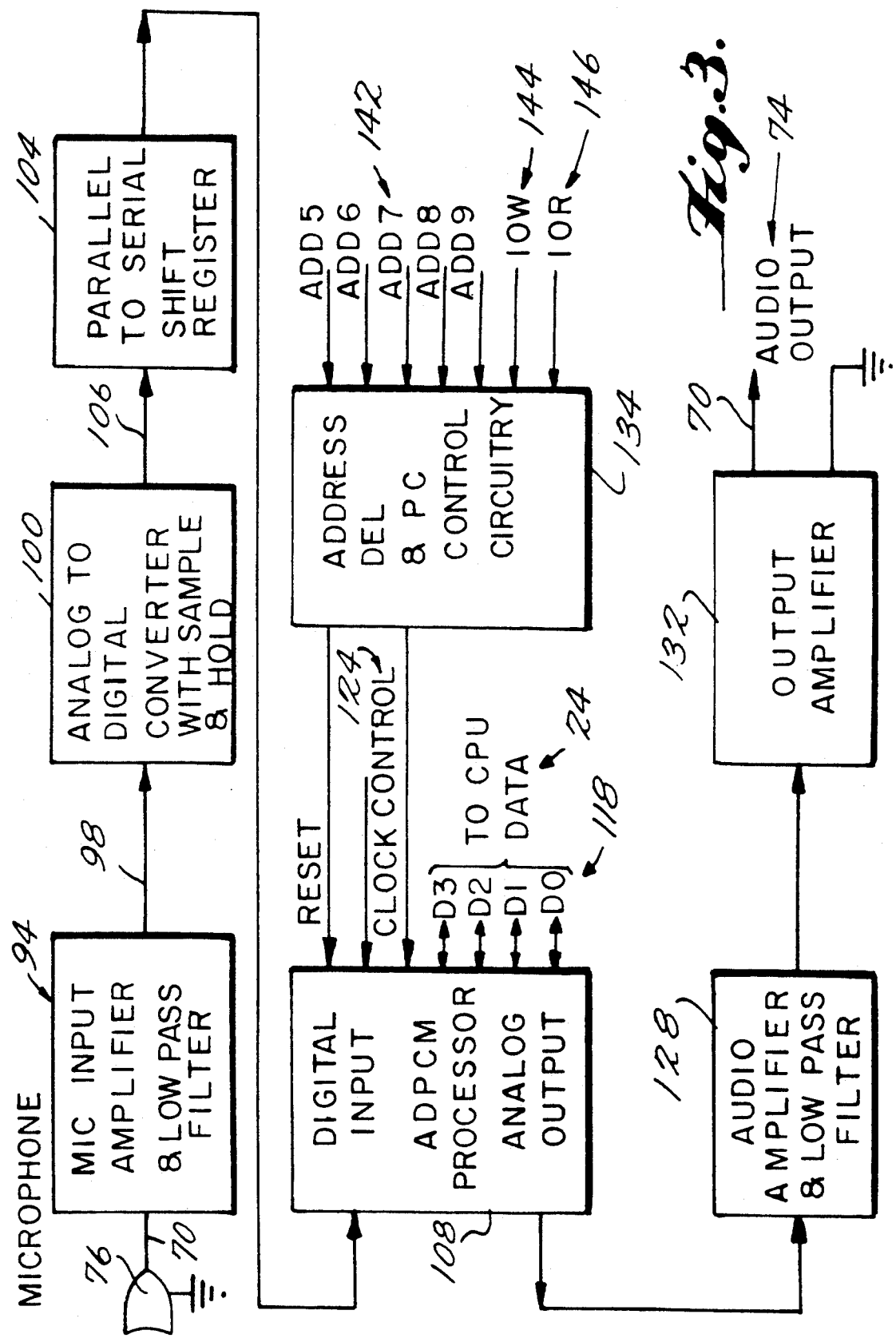

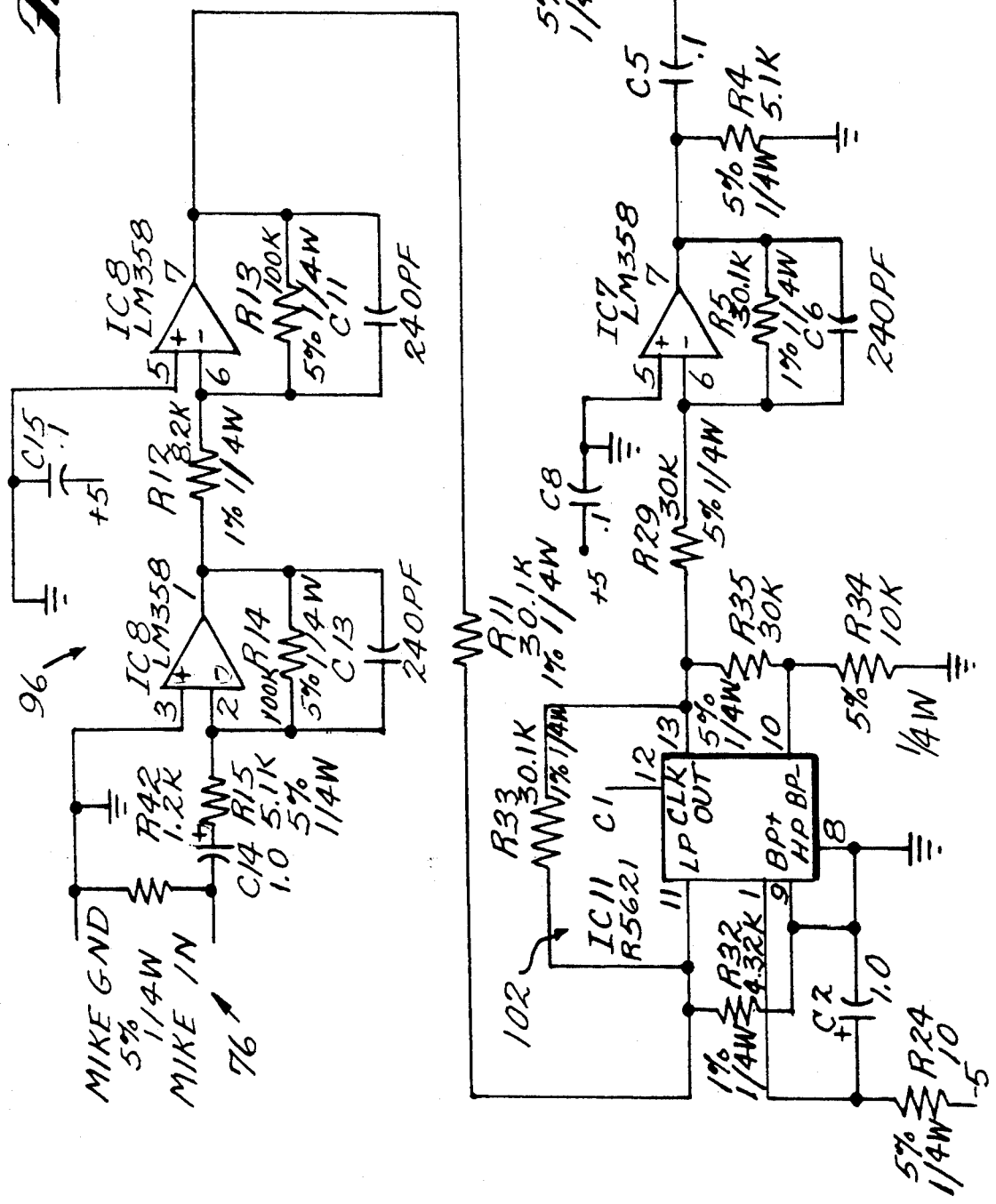

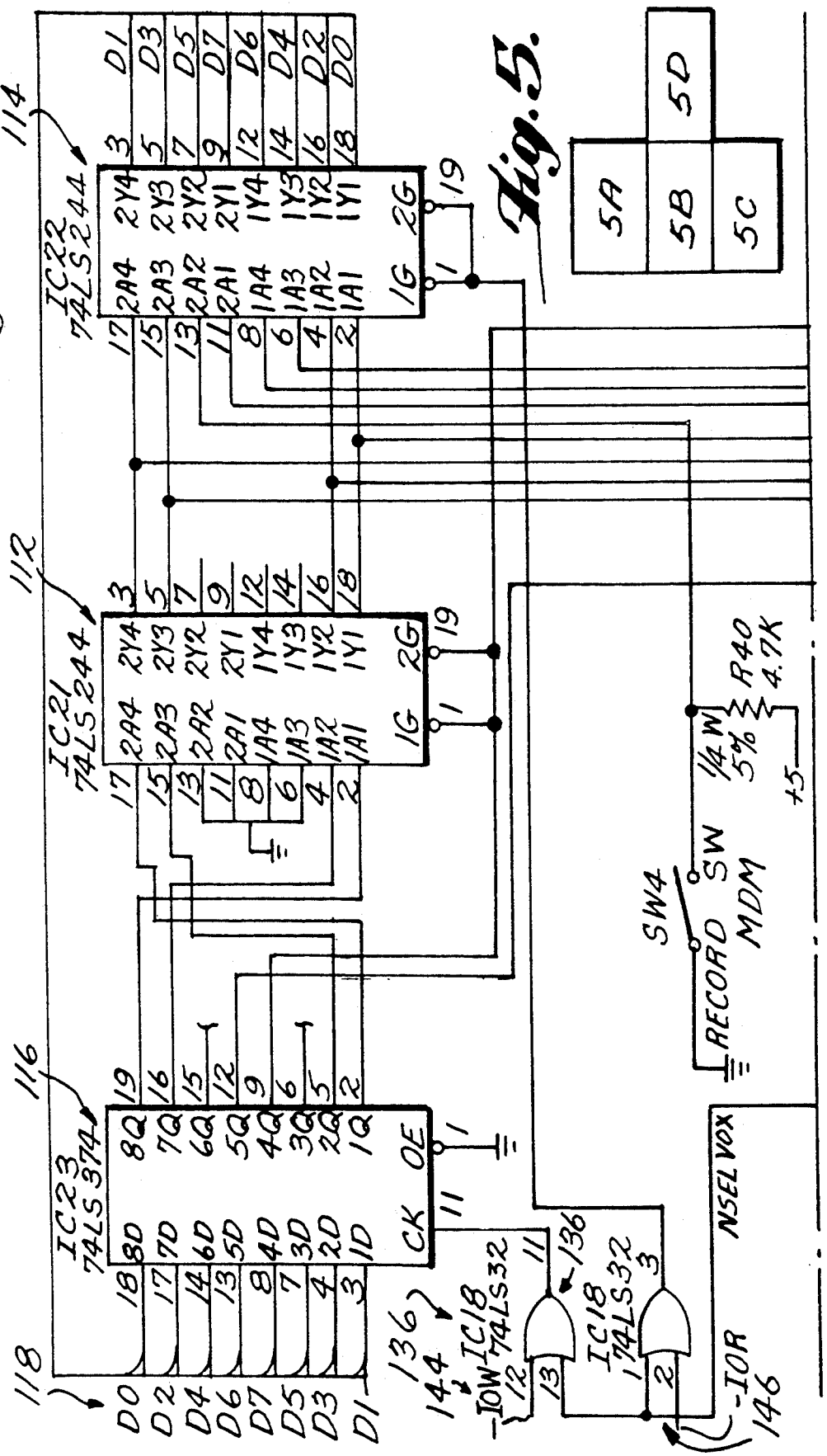

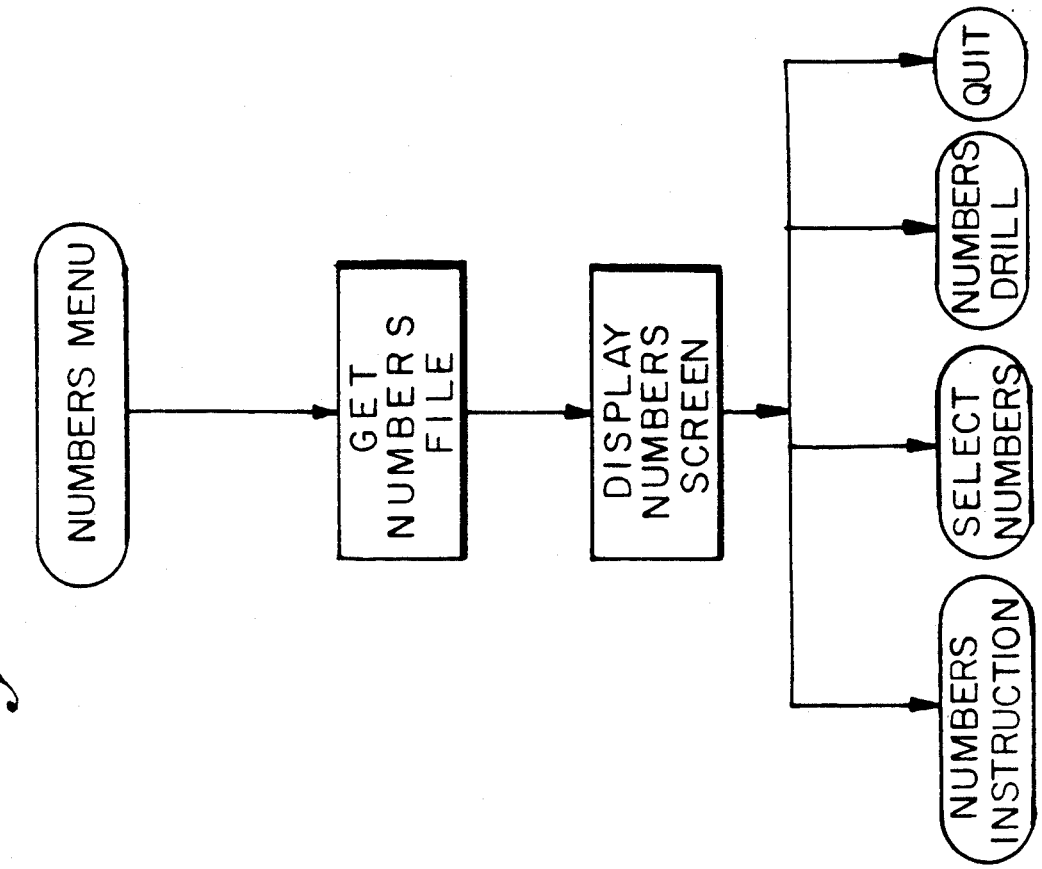
Fig. 9. MAIN NUMBERS PROGRAM
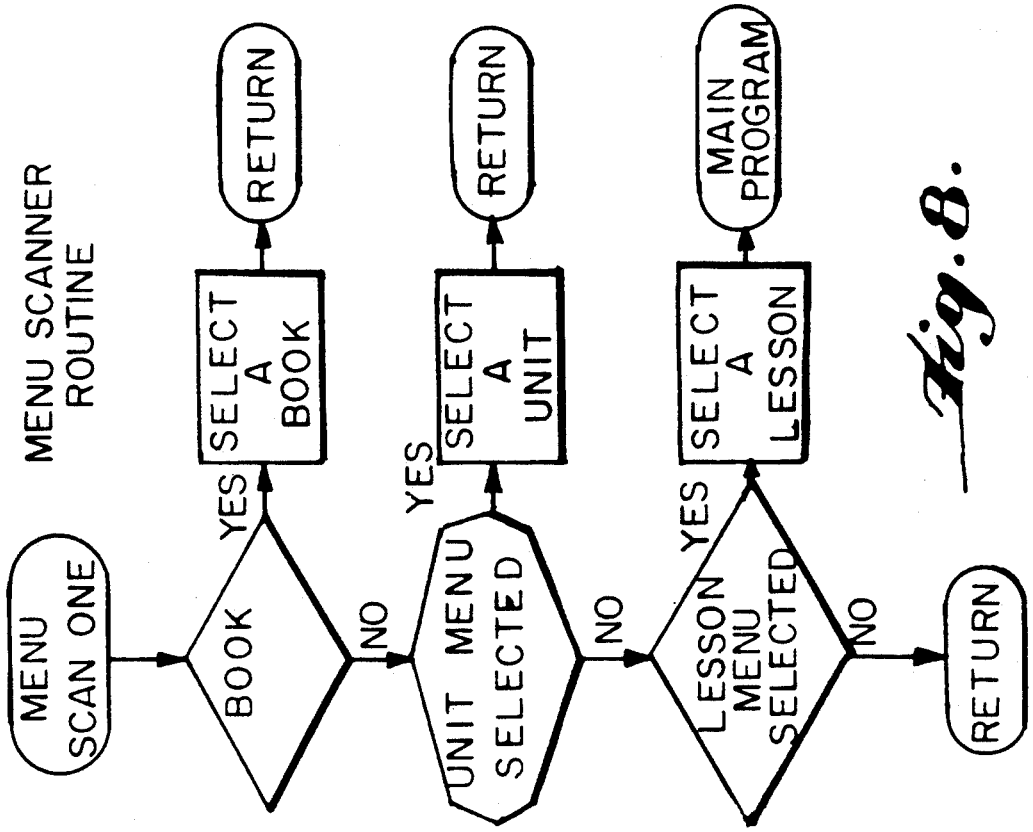
Fig. 8.

NUMBERS INSTRUCTION PROGRAM

NUMBERS INSTRUCTION ROUTINE

VOCABULARY INSTRUCTION

NUMBERS DRILL ROUTINE

VOCABULARY DRILL

GRAMMAR DRILL

REPEAT TEXT ROUTINE

VOICE INTERACTIVE COMPUTER SYSTEM

This is a continuation of copending application Ser. No. 07/423,628 filed on Oct. 18, 1989 now abandoned, which was a continuation of prior application Ser. No. 07/040,512, filed on Apr. 20, 1987, now abandoned.

BACKGROUND OF THE INVENTION

1. Field of the Invention

This invention relates to voice interactive computer systems, and more particularly, to a computer system usable in a teaching environment and having means for digitizing voice input from a student-operator and for selectively replaying the digitized voice input by the student or a teacher.

2. Description of the Prior Art

The teaching of foreign languages has traditionally been classroom time intensive. It is necessary to have the interaction between student and teacher so that the student can make the necessary learning connections between speaking, reading and writing. While learning to read the language is important and should not be delayed, multi-sensory input speeds and reinforces the process of acquiring the foreign language, verbally as well as written. In the interaction between the student and teacher, the teacher's proper pronunciation of the foreign language word or phrase is usually repeated as often as necessary, and there is an obvious, immediate aural comparison between the teacher's pronunciation and the student's pronunciation. However, a problem in most classroom situations is that devotion of individual attention by the teacher to a particular student is limited by time constraints. Because of this, the familiar language laboratory has been developed and is in widespread use as an auxiliary teaching tool.

A typical language laboratory utilizes phrases prerecorded in analog form by a language expert. The students can listen to these expert recordings and then repeat the words and phrases. The student's input is recorded in analog form, such as on audio tape media. The student's recorded portion may then be later replayed by the teacher with some systems.

A problem, however, is that there is no easy way for the student to replay what he or she has spoken to compare it with the expert's pronunciation of the same words or phrases. This is true because the student has no real control over the recording equipment. All students hear the expert simultaneously and record their responses simultaneously. Thus, slower students are quickly left behind.

Thus, an important aspect of interaction in language learning is not available in present language laboratories. That is, the student is not able to hear what he or she says and to alternately compare this with the proper pronunciation by the expert. Also, in such language laboratories, the only written materials are preprinted. In other words, there is no immediate correlation between what is spoken and what is written. Again, the student loses an important connection between the verbal and written words or phrases.

The present invention solves these language laboratory deficiencies by providing a voice interactive computer system which allows the student to digitally record his or her spoken words or phrases and immediately replay this recording or the expert prerecording by direct input from the computer keyboard. The student may quickly and easily selectively compare his or her spoken words or phrases with those pronounced properly by the expert, the expert pronunciation portion being stored in digitized form which may be easily addressed by the computer. Since each student is at a separate computer, each student is in control of his or her learning session.

The student is also presented with a visual display of specific graphics and/or written text at substantially the same time he or she is hearing the verbal counterpart, thus allowing a learning connection between graphic, written and verbal aspects which is not available in language laboratories.

While the system of the present invention cannot totally substitute for individual instruction between a student and teacher, it provides considerably more interaction between expert and student pronunciation and between verbal and written material than does the prior art. Because the student is in control of the system, the student may proceed at his or her own pace.

SUMMARY OF THE INVENTION

The voice interactive computer system of the present invention comprises a computer central processing unit, data entry means in operative association with the central processing unit, memory means in operative association with the central processing unit, software stored in the memory means, and voice digitizing means for digitizing voice input of the operator. The software comprises programming instructions, a digitized voice vocabulary, and graphics and text corresponding to the voice vocabulary. The voice digitizing means also provides a means for retrieving the digitized voice input from memory and replaying the input and also for retrieving at least a portion of the voice vocabulary from the memory means in response to at least one of a direct instruction from the operator and a portion of the programming instructions.

The apparatus further comprises microphone means for receiving the voice input from the operator and transmitting the voice input to the voice digitizing means and speaker means in operative association with the voice digitizing means for audibly reproducing the retrieved voice input and vocabulary portion. Preferably, the microphone means and speaker means are characterized by a headset which frees the hands of the operator.

The voice digitizing means is preferably characterized by a card means positionable in a slot in bus means connected to the central processing unit.

The apparatus further comprises data storage means in operative association with the central processing unit. Preferably, the voice digitizing means also comprises means for storing the digitized voice input in the data storage means. The data storage means comprises at least one of another memory means and a disc storage means. The other memory means may be characterized by a random access memory.

In the preferred embodiment, the first mentioned memory means comprises a compact disc read only memory.

One preferred method of using the computer system of the present invention is for teaching a second language to a student having some proficiency in a first language. The method comprises the steps of storing a voice language vocabulary in digitized form in memory means in operative association with a computer central processing unit, placing voice digitizing means in operative association with the central processing unit, storing software in the memory means and running the software in the central processing unit for providing interaction between the central processing unit and the voice digitizing means, digitizing an analog voice input signal from the student, storing the digitized voice input in the memory means, and comparing the digitized voice input with at least a portion of the language vocabulary. Graphics and text corresponding to the voice vocabulary may also be stored in the memory means.

The step of storing the vocabulary preferably comprises prerecording the vocabulary on a compact disc read only memory, and the step of storing the software comprises placing the software on the compact disc read only memory. The graphics and text are also prerecorded on the compact disc read only memory.

The step of placing the voice digitizing means in operative association with the central processing unit comprises placing voice digitizing circuitry on a computer card and positioning the card in the computer.

The step of storing the digitized voice input comprises storing the voice input in a random access memory in operative association with the central processing unit of the computer.

The step of comparing the digitized voice input with the portion of the vocabulary comprises selectively retrieving the voice input or vocabulary portion from the memory means and selectively replaying the digitized voice input and the portion of the vocabulary in analog form. Graphics and text may be shown on monitor means substantially simultaneously for intimate interaction with the audio.

The method of teaching a foreign language further comprises the step of storing the voice input in storage means for subsequent review by the teacher of the student. This step of storing the voice input preferably comprises storing the input on magnetic media, such as a computer disc.

It is an important object of the present to provide a computer system having means for digitizing voice input from an operator and for selectively replaying the digitized voice input.

It is another object of the invention to provide a computer system with intimately interactive audio, graphics and text.

It is a further object of the invention to provide a computer system suitable for teaching a second language to a student having proficiency in a first language.

It is an additional object of the invention to provide a computer system having voice digitizing means for digitizing voice input of an operator and retrieving the digitized voice input and for also retrieving at least a portion of a voice vocabulary stored in memory means, such retrieval being in response to a direct instruction from an operator or from software programming instructions.

A further object of the invention is to provide a language teaching computer system having a voice vocabulary stored on a compact disc read only memory.

Still another object of the invention is to provide a method of teaching a second language to a student having some proficiency in a first language in which digitized voice input of the student may be compared with a portion of a prerecorded language vocabulary.

Additional objects and advantages of the invention will become apparent as the following detailed description of the preferred embodiments is read in conjunction with the drawings which illustrate such preferred embodiments.

BRIEF DESCRIPTION OF THE DRAWINGS

FIG. 1 shows a schematic of a preferred embodiment of the voice interactive computer system of the present invention.

FIG. 2 shows a schematic of an alternate embodiment of the invention.

FIG. 3 is a functional block diagram of the voice card used in the invention.

FIGS. 4A and 4B are a circuit schematic showing the analog circuitry in the voice card.

FIGS. 5A, 5B, 5C and 5D are a circuit schematic of the digital circuitry of the voice card.

FIGS. 6-19 illustrate flow charts for the computer software main program used in the system.

DESCRIPTION OF THE PREFERRED EMBODIMENT

Figure 4A:
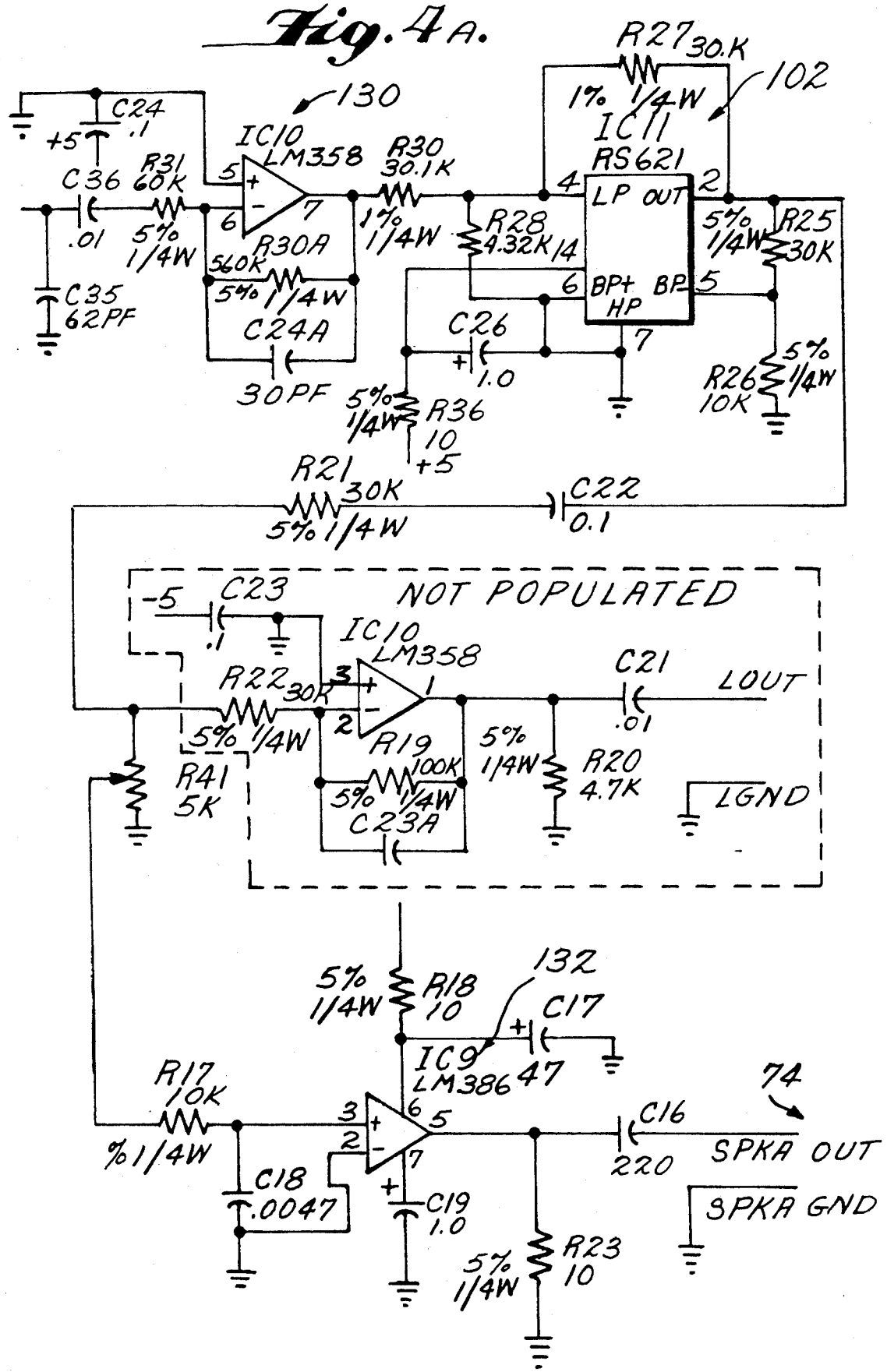
Figure 5B:
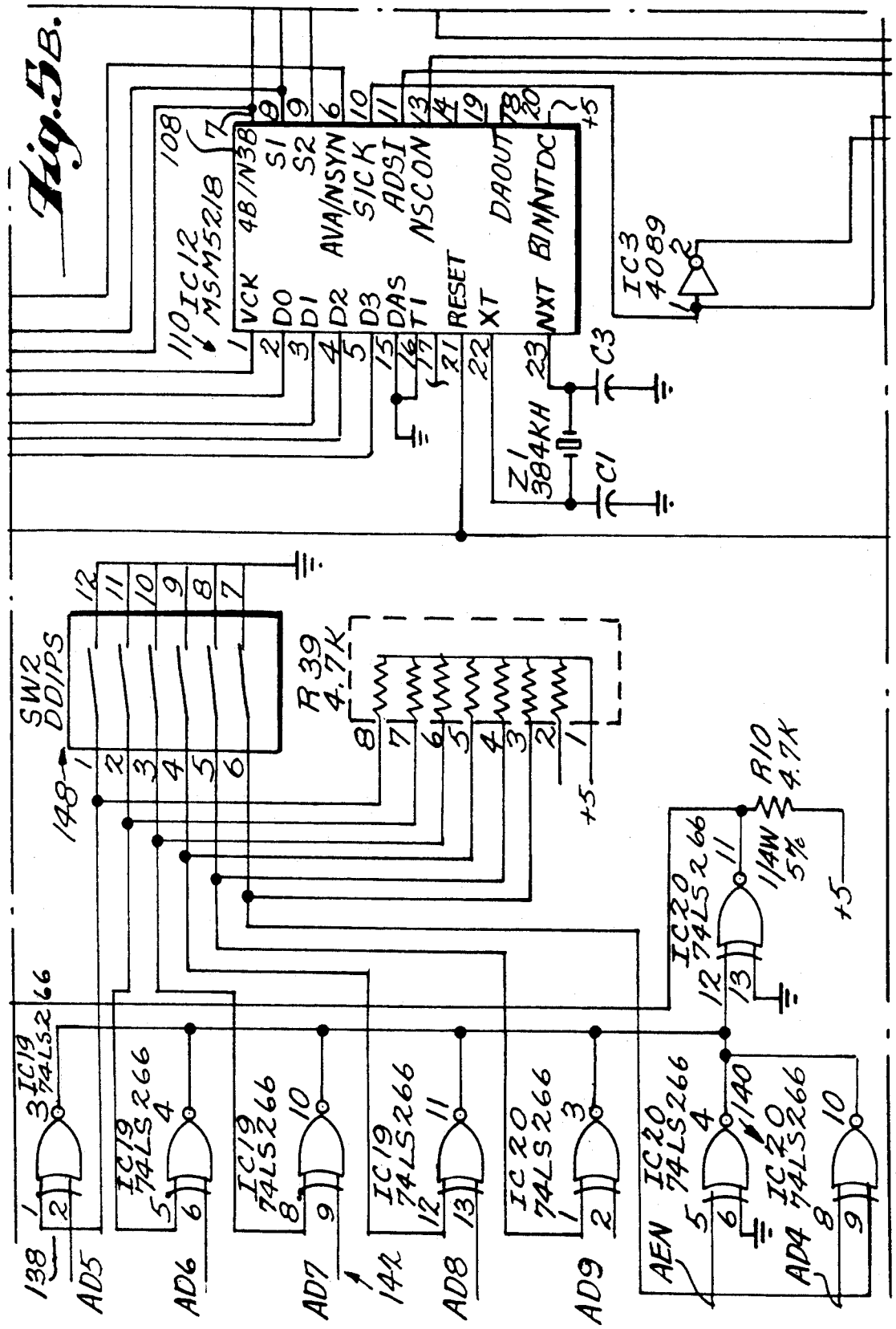
Figure 5C:
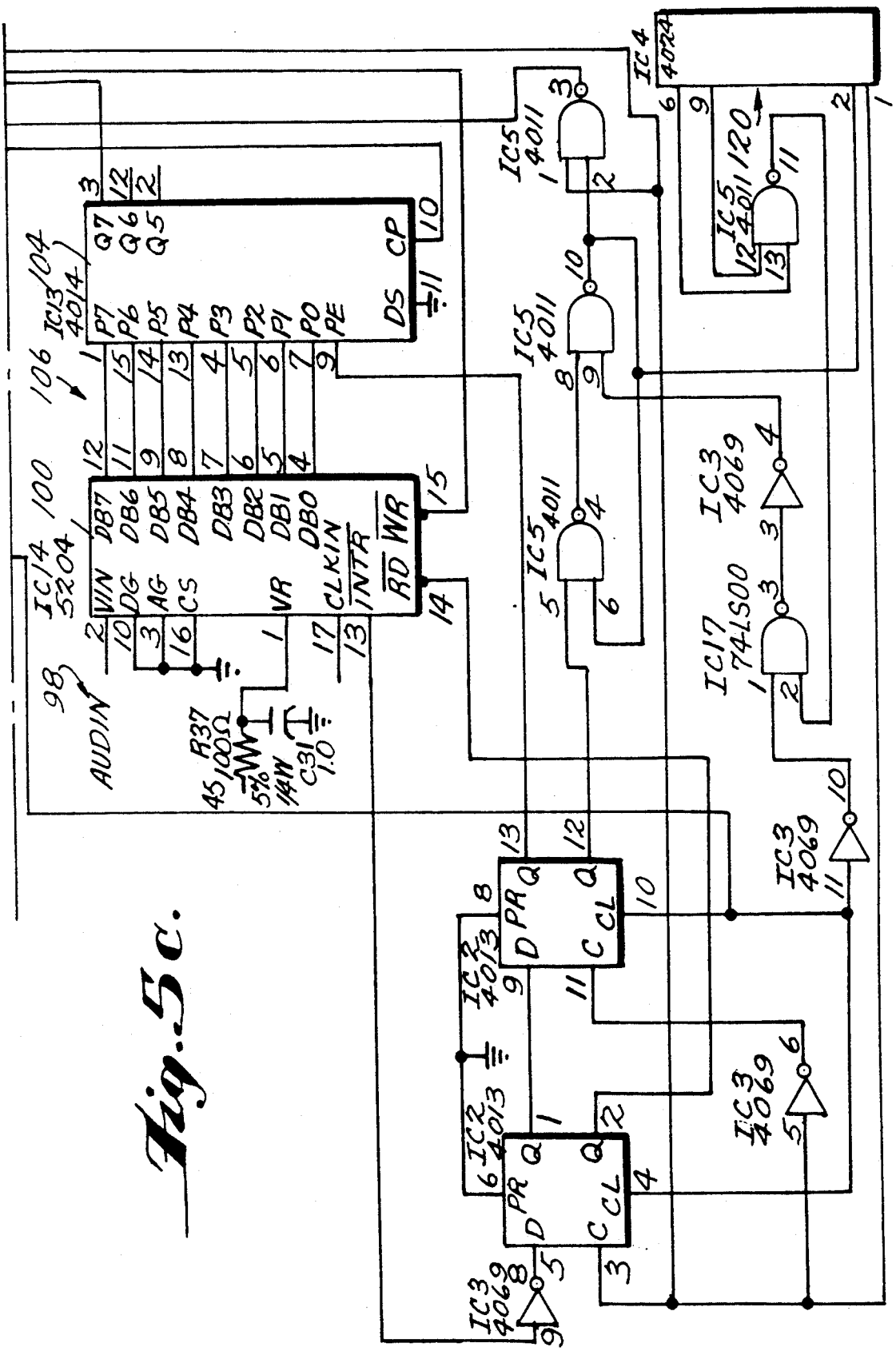
Figure 5D:
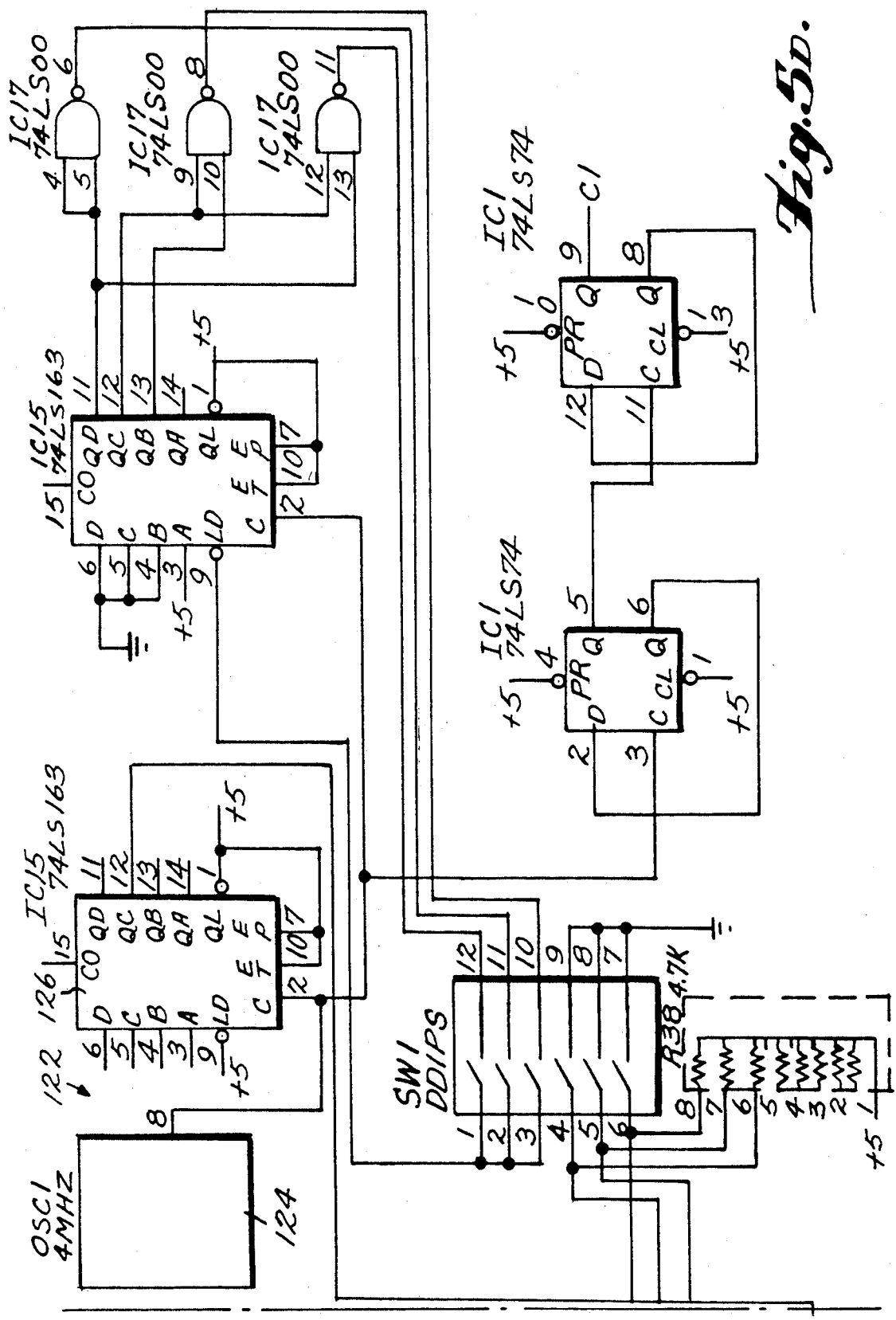

Referring now to the drawings, and more particularly to FIG. 1, an embodiment of the voice interactive computer system of the present invention is shown and generally designated by the numeral 10. The major hardware components of system 10 include a computer 12 and a module 14, although as will be understood herein, computer 12 and module 14 could be combined into a single housing if desired.

Computer 12 is of a kind generally known in the art, such as an IBM PC XT, although the system may be adapted to virtually any kind of computer and is not intended to be limited to an IBM PC. Computer 12 includes data entry means such as a keyboard 16 and data storage means, such as a disc drive 18.

Disc drive 18 may include one or more of any known disc drives, such as the various sizes of floppy disc drives or hard disc drives. The invention is not intended to be limited to any particular data storage means.

Both the keyboard and disc drive are in operative association with a central processing unit (CPU) 20 of computer 12 and thus also in operative association with a memory means 22 such as a random access memory (RAM), all of a kind known in the art.

Forming a portion of computer 12 and connected to the other components thereof is a row of computer card slots or slot bus 24, also called an input/output bus or I/0 bus. Again, slot bus 24 is of a kind known in the art and is adapted for receiving various generally known computer cards. Slot bus 24 includes a plurality of slots such as 26, 28, 30, 32 and 34. The number of slots is not critical and is not intended to be a limiting feature of the invention.

Also connected to central processing unit 20 and forming a portion of computer 12 is a cathode ray tube (CRT) monitor 36 on which is displayed data in a normal manner. All of the components of computer 12 may be enclosed within a single housing 38 or separate housings for the various components as desired.

Module 14 preferably includes a housing 40 which encloses a row of card slots or sot bus 42 similar to slot bus 24 in computer 12. In FIG. 1, slot bus 42 includes slots 44, 46, 48, 50 and 52, but the number is not critical.

Another component included in module 14 is another memory means preferably in the form of a compact disc read only memory (CDROM) drive 54. CDROM drive 54 is of a kind known in the art and is preferred because of the large amount of memory storage available thereon. However, any other type of memory storage means such as read only memory (ROM) chips or a hard disc drive may be utilized as long as the memory capacity thereof is sufficient. The invention is not intended to be limited to a CDROM drive.

CDROM drive 54 is connected by a cable 56 to a CDROM interface card 58. Interface card 58 is in turn connected to slot bus 42 in module 14 by plugging interface card 58 into one of the slots, for example slot 52.

A bus interface 60 interconnects slot bus 24 in computer 12 with slot bus 4 in module 14. Bus interface 60 includes a cable 62 having a first bus interface card 64 at one end of the cable and a second bus interface card 66 at the other end of the cable. First bus interface card 64 plugs into one of the slots, such as slot 28, in slot bus 24 in computer 12. Second bus interface card 66 plugs into one of the slots, such as slot 44, in slot bus 42 in module 14. Bus interface 60 may be of any kind known in the art and is generally referred to as a transmitter card.

It is contemplated that a plurality of computers may be connected to module 14. For example, a second computer 12', substantially identical to first computer 12, may be connected to module 14 by plugging second bus interface card 66' thereof into another slot, such as slot 46, in slot bus 42 in the module. Additional computers may also be connected to module 14 in a similar manner. The only physical limitation is the number of slots available in slot bus 42.

Computer system 10 also comprises voice digitizing means such as a voice card 68 plugged into another slot in slot bus 24 in computer 12, such as slot 26. Other computers in system 10 also have such voice digitizing means plugged thereinto. Connected to voice card 68 by a cable 70 are speaker and microphone means. Preferably, this is in the form of a headset 72 in which the speaker means includes an earphone 74, and the microphone means is a microphone 76 attached thereto. A headpiece 78 allows the operator of computer 12 to wear headset 72 while keeping his or her hands free to operate the computer. A separate speaker and microphone could also be utilized if desired.

Using control through keyboard 16, voice card 68 receives voice input from the operator through microphone 76 and digitizes the voice input in a manner hereinafter described in more detail. An optional manual control switch 79 may be placed in cable 70 to control microphone 76 externally of keyboard 16 as desired.

Referring now to FIG. 2, an alternate embodiment of the voice interactive computer system of the present invention is shown and generally designated by the numeral 80. System 80 also includes a computer 12 and a module 14. As with the first embodiment, computer 12 in system 80 includes a housing 38 which houses a keyboard 16, data storage means, such as disc drive 18, a central processing unit 20, memory means, such as random access memory 22, a slot bus 24 and a monitor 36. Again, separate housing portions for the various components may be utilized as desired.

Module 14 in alternate system 80 again includes another memory means, such as a CDROM drive 54 and a slot bus 42.

A combination bus interface/voice card/CDROM interface, generally designated by the numeral 82, interconnects computer 12 and module 14 in system 80. Interface 82 includes a cable 84 having a first interface card 86 at one end thereof which is plugged into a slot, such as slot 26, in slot bus 24 in computer 12. Interface card 86 includes all of the components and performs the same functions as first bus interface card 64 and voice card 68 in first system 10. By combining the circuit components on a single card, the amount of hardware is reduced which decreases the cost. An additional advantage is that another slot, such as slot 28, is freed in computer 12 for other usage.

The other end of cable 84 is connected to a second interface card 88 which plugs into a slot, such as sot 44, in slot bus 42 in module 14. Second interface card 88 includes all of the components and performs the same functions as CDROM interface card 58 and first bus interface card 66 in first system 10. Again, a card is eliminated which reduces the cost, and an additional slot, such as slot 52, is freed in module 14 for other usage.

Headset 72 is connected to interface card 86 by a cable 90, and CDROM drive 54 is connected to second interface card 88 by a cable 92. Optional switch 79 may be placed in cable 90.

As with first embodiment 10, it is contemplated that multiple computers, such as computer 12', may be utilized in system 80. Computer 12' is connected to module 14 by interface 82' having a cable 84' with a second interface card 88' plugged into a slot, such as slot 46, in slot bus 42 in the module. A cable 92' interconnects second interface card 88' with CDROM drive 54. Additional computers may be connected in a similar manner.

Referring now to FIGS. 3, 4A, 4B, 5A, 5B, 5C and 5D, the details of voice card 68 of system 10 or the voice card portion of interface card 86 of system 80 will be described. FIG. 3 is a functional block diagram of the circuitry schematics shown in FIGS. 4A, 4B, 5A, 5B, 5C and 5D. FIGS. 4A and 4B shows the analog circuitry required for filtering and amplification, and FIGS. 5A, 5B, 5C, and 5D shows the digital circuitry required to interface to slot bus 24 in computer 12 as well as to convert the analog voice signal to digital information. Reference will be made in this discussion only to voice card 68 of system 10, but it should be understood that this applies equally to the voice card portion of interface card 86 of alternate system 80.

In addition to the reference numerals herein, specific electrical components shown in the circuit schematics will be identified by the reference codes shown in those schematics.

In block 94, the audio signal from microphone 76 must be amplified to a suitable level by integrated circuit 96 (IC8) to interface through line 98 to analog to digital converter 100 (IC14). The signal must pass through one-half of low pass filter 102 (IC11) before being converted to a digital signal. Low pass filter 102 will attenuate any voice frequencies which are one-half of a sampling frequency.

In analog to digital converter 100, the analog signal is momentarily saved in a sample and hold circuit. Converter 100 is an eight bit successive capacitor ladder conversion. The output of analog digital converter 100 is then sent as a parallel eight bit word to parallel to serial shift register 104 (IC13) through lines 106.

Shift register 104 accepts a parallel signal from analog to digital converter 100, and the shift register can then be clocked to allow a serial stream of data to be fed to an adaptive delta pulse code modulation (ADPCM) processing chip 108 (IC12). Processing chip 108 performs the ADPCM algorithm on the incoming data and places the results on lines 110 which are connected to slot bus 24 of computer 12 through standard interface chips 112 (IC21), 114 (IC22) and 116 (IC23). Chip 112 serves as an input buffer, and chip 114 serves as an output buffer. Input/output lines 118 (D0-D7) directly connect to slot bus 24, and chips 112, 114 and 116 allow processing chip 108 to talk to slot bus 24. Chips 112, 114 and 116 are bi-directional and tristateable. Thus, processor chip 108 may both send data to computer 12 and accept data from the computer.

Timing control is provided by timing control circuit 120 which is connected to clock circuit 122. Clock circuit 122 includes an oscillator 124 (OSC1) and a counter 126 (IC15) known in the art.

In block 128, previously digitized data may be read from memory 22 of computer 12 and input to the data bus of processing chip 108. Processing chip 108 converts the digital information back to an analog signal. It is necessary to both amplify and filter the signal so that the original speech signal will sound suitable to the operator. This amplification is done by integrated circuit 130 (IC10), and the filtering is accomplished by the other half of low pass filter 102 (IC11).

The audio signal is amplified by output amplifier 132 (IC9) to a level sufficient to drive earphone 74 of headset 72 or a separate speaker.

In block 134, integrated circuits 136 (IC18), 138 (IC19), and 140 (IC20) allow computer 12 to input to the circuitry through address lines 142 (AD4-AD9 and -AEN), write line 144 (-IOW) and read line 146 (-IOR).

Switches 148 (SW2) can be set to decode a unique address in connection with the signals through write line 144 and read line 146 which will ultimately control the operation of processing chip 108, and thus the voice functions themselves.

It will thus be seen that the complete circuit of voice card 68 is capable of digitizing an analog voice signal and storing the information in the memory of computer 12. Likewise, previously recorded digital information can be converted back to an analog voice signal. All of this, of course, is under the control of software programs written to support this circuitry.

In the preferred embodiment, the software includes a computer program written in a high level language entitled "Tencore". Tencore is a commercially available language produced by Computer Teaching Corporation of Champaign, Ill. A listing of the program is included as Appendix A in the specification. In addition, the software includes an assembly language program which ties voice card 68 or the voice card portion of interface card 86 into the Tencore language program. A listing of the assembly language program is in Appendix B in the specification.

Figure 7:
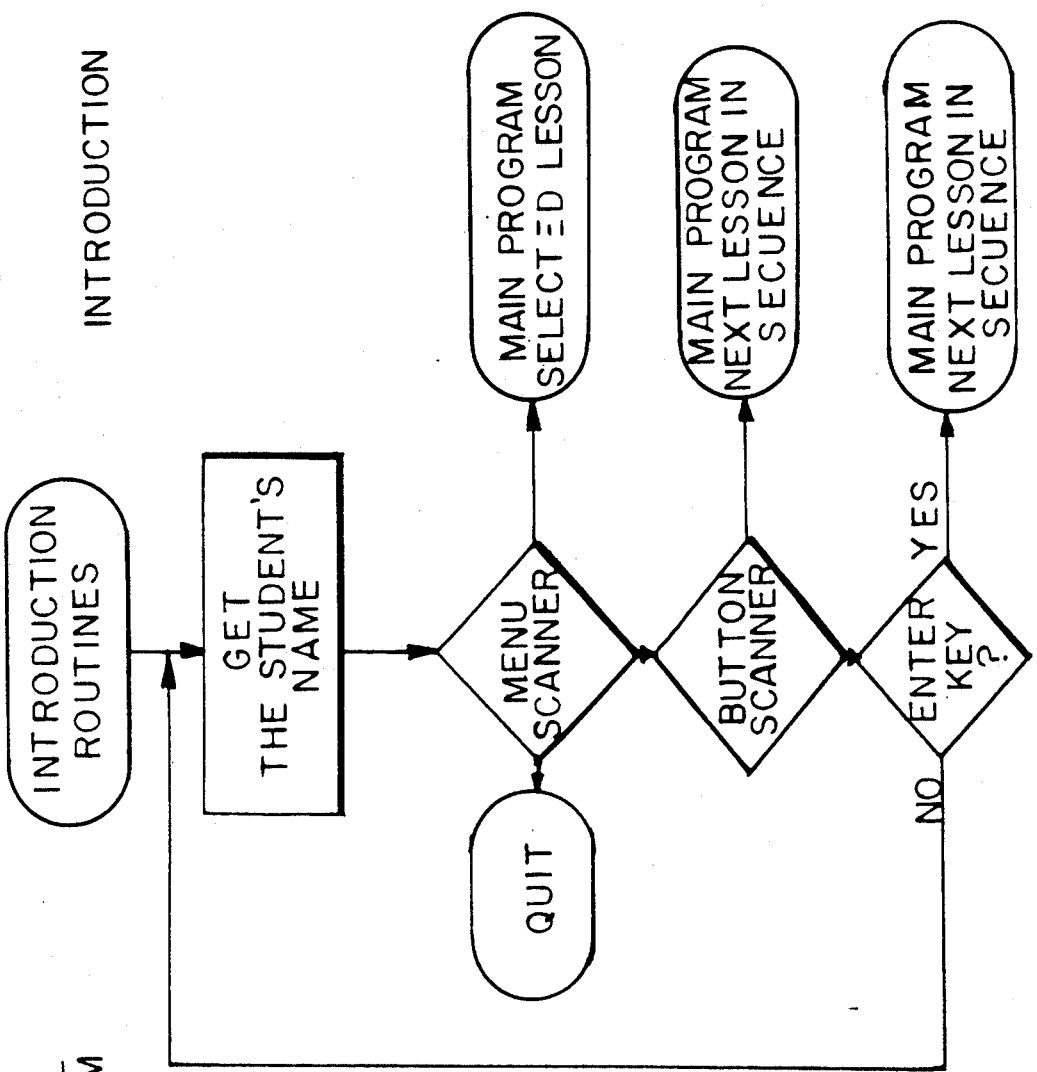
Figure 6:
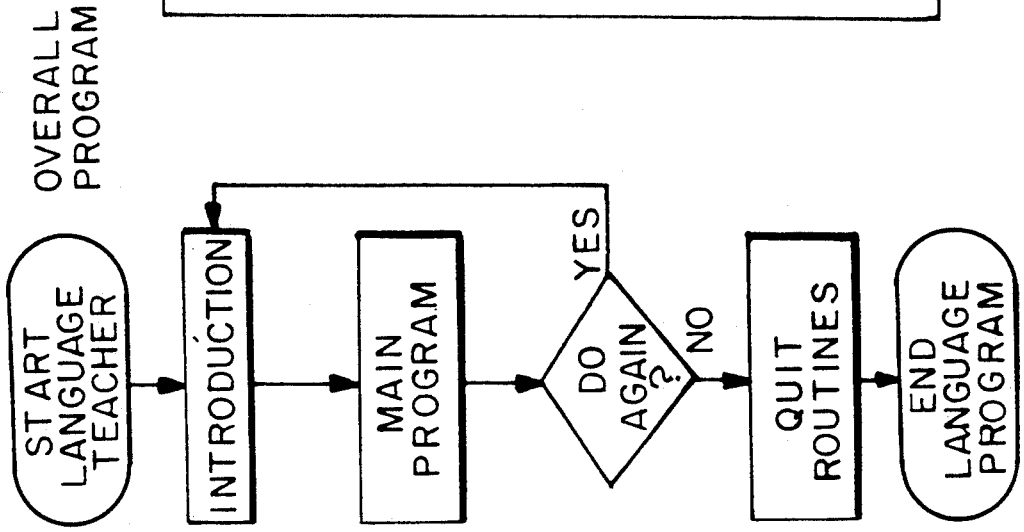

FIG. 6 is a flow diagram of the overall Tencore language program. A flow chart of the Introduction portion of the program is shown in FIG. 7. FIG. 8 presents a detailed flow chart of the Menu Scanner Routine indicated in FIG. 7.

Figure 10:
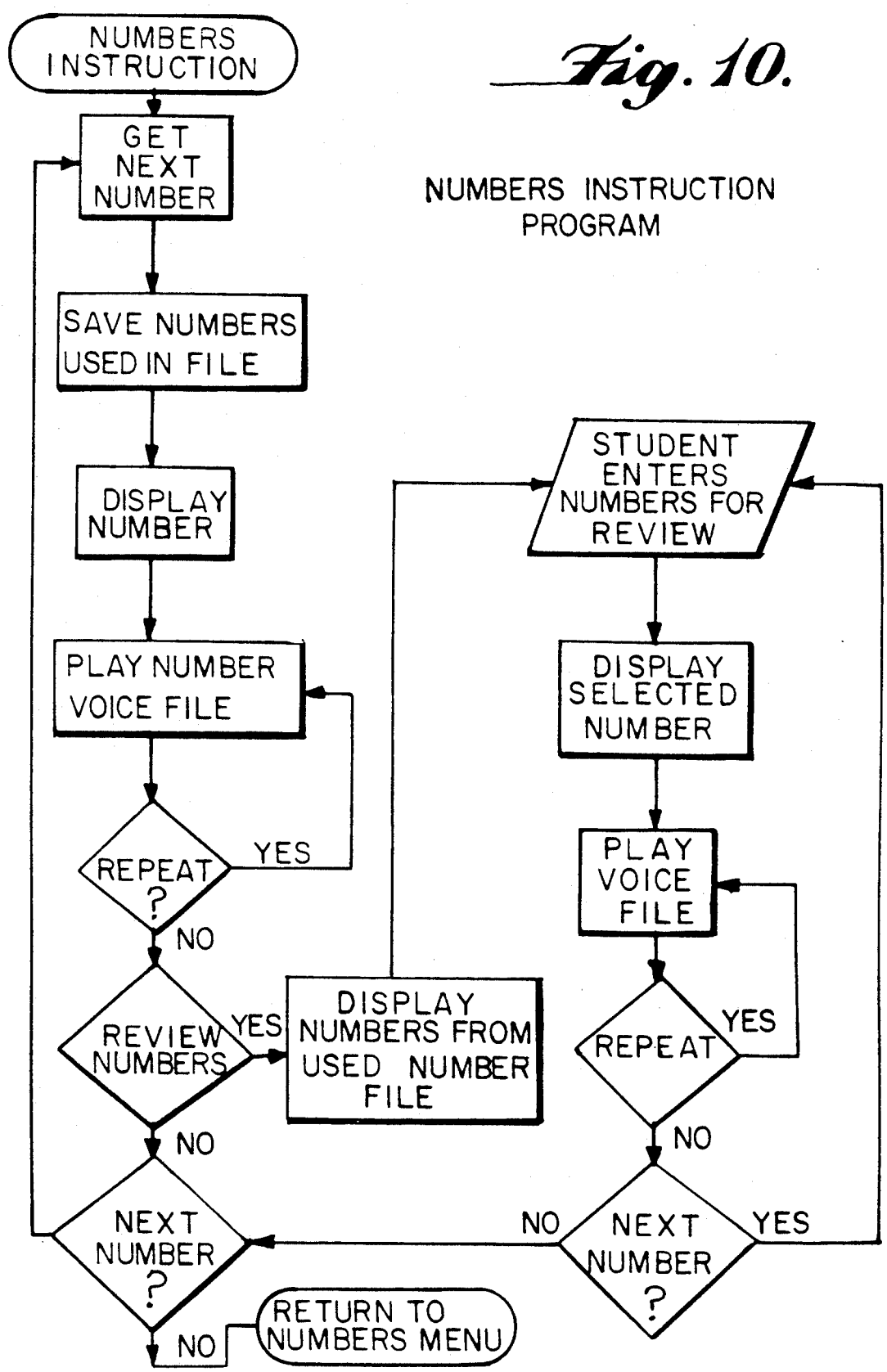

The main program includes portions for numbers, vocabulary and grammar. The Main Numbers Program is described in the flow chart shown in FIG. 9. The flow chart of the Numbers Instruction Program is shown in FIG. 10, and a flow chart of the Numbers Instruction Routine is given in FIG. 11. FIG. 12 shows a flow chart of the Numbers Drill Routine.

Figures 11, 13:
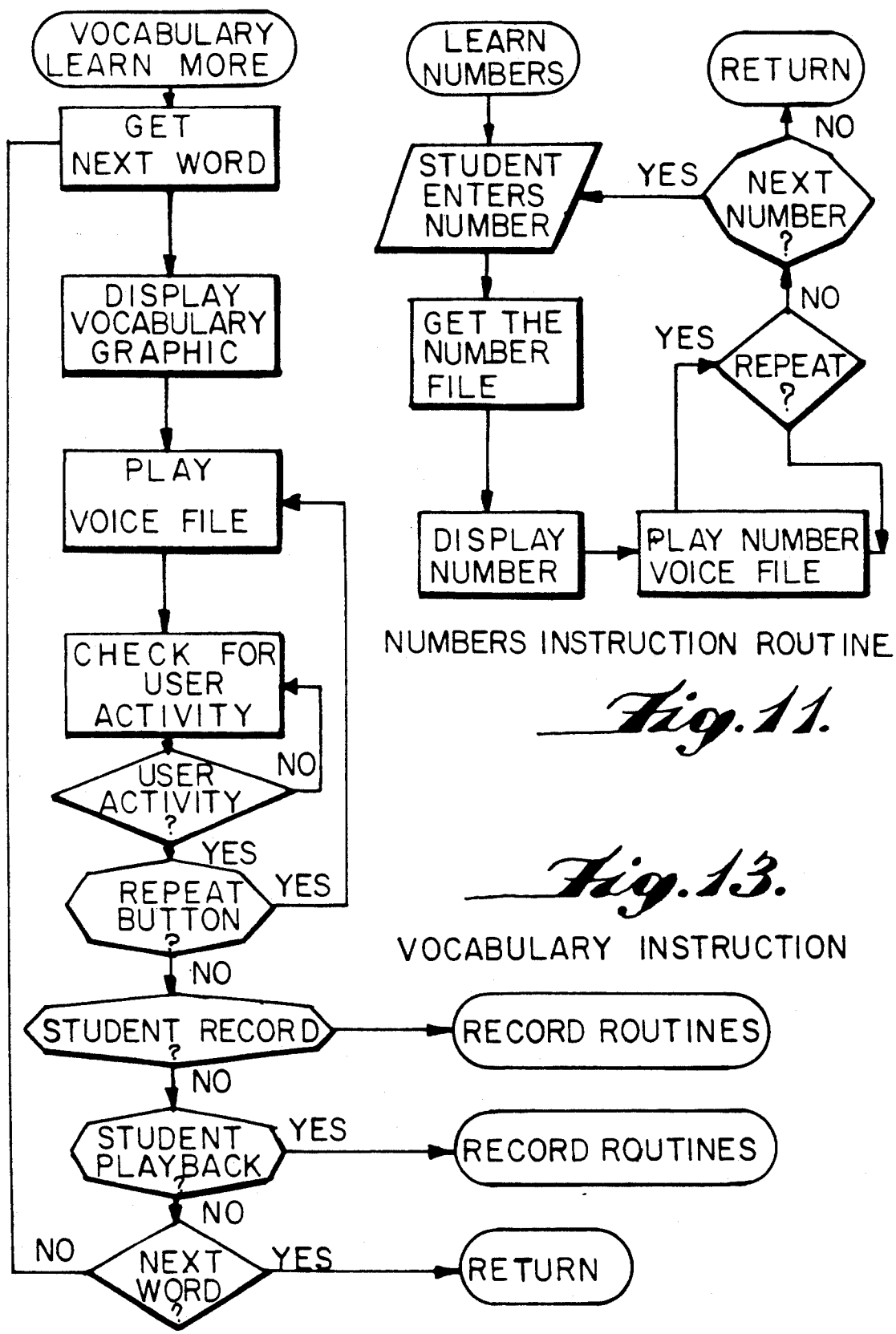
Figure 12:
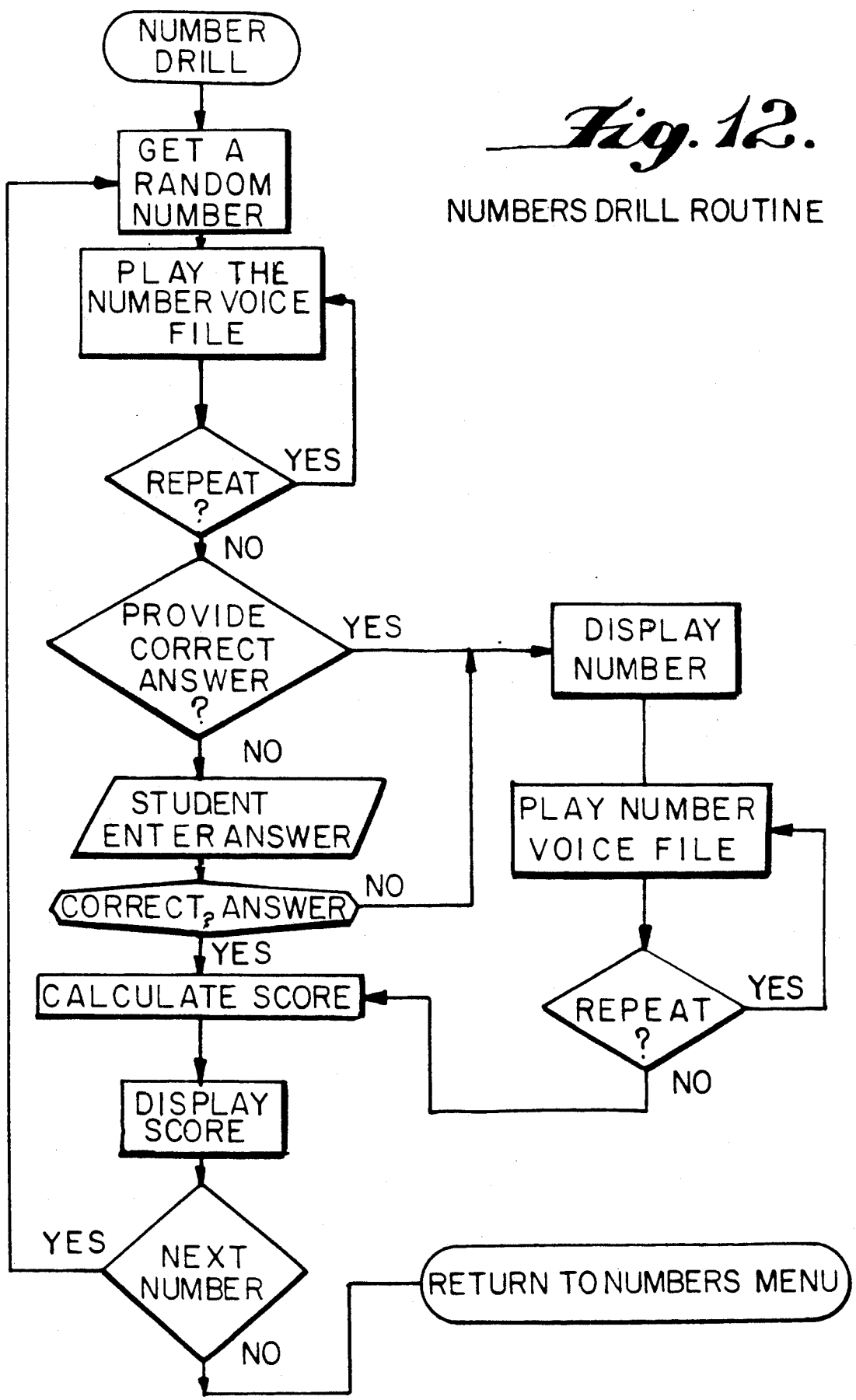
Figure 14:
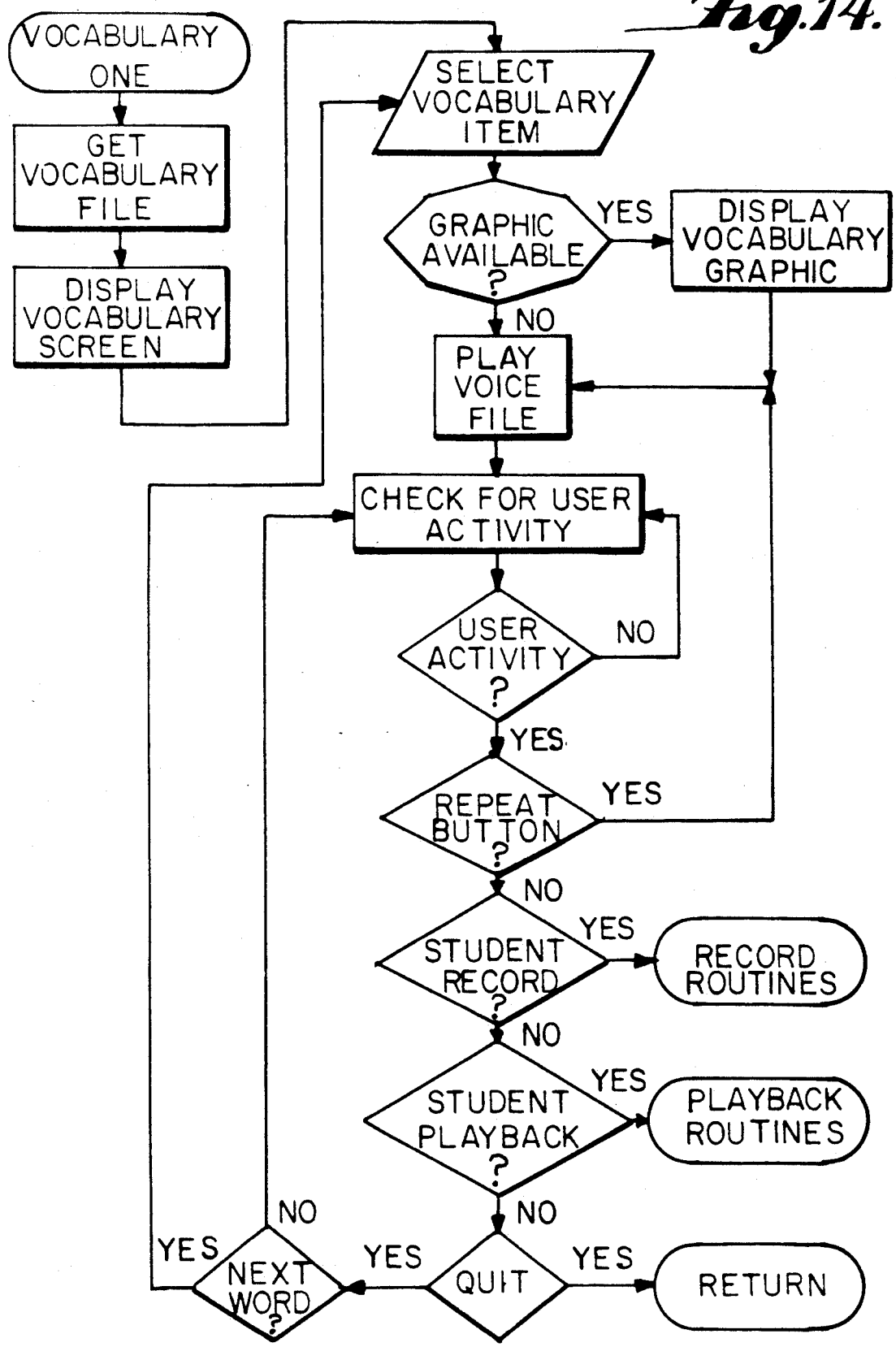
Figure 15:
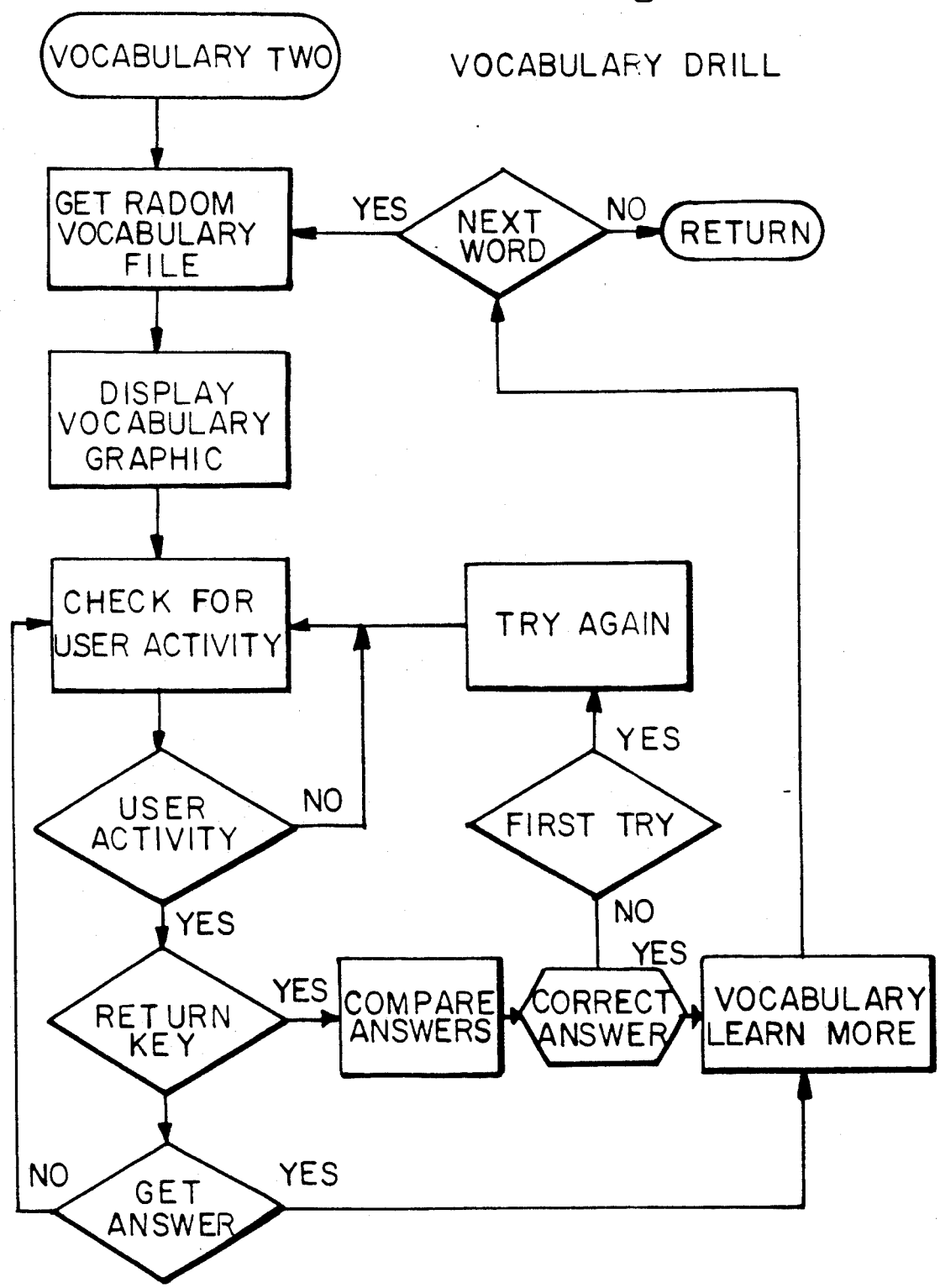

A flow chart of the Vocabulary Instruction Portion of the main program is shown in FIG. 13 The Vocabulary Learn and Review portion is shown in the flow chart of FIG. 14, and the Vocabulary Drill is illustrated in the flow chart of FIG. 15.

Figure 16:
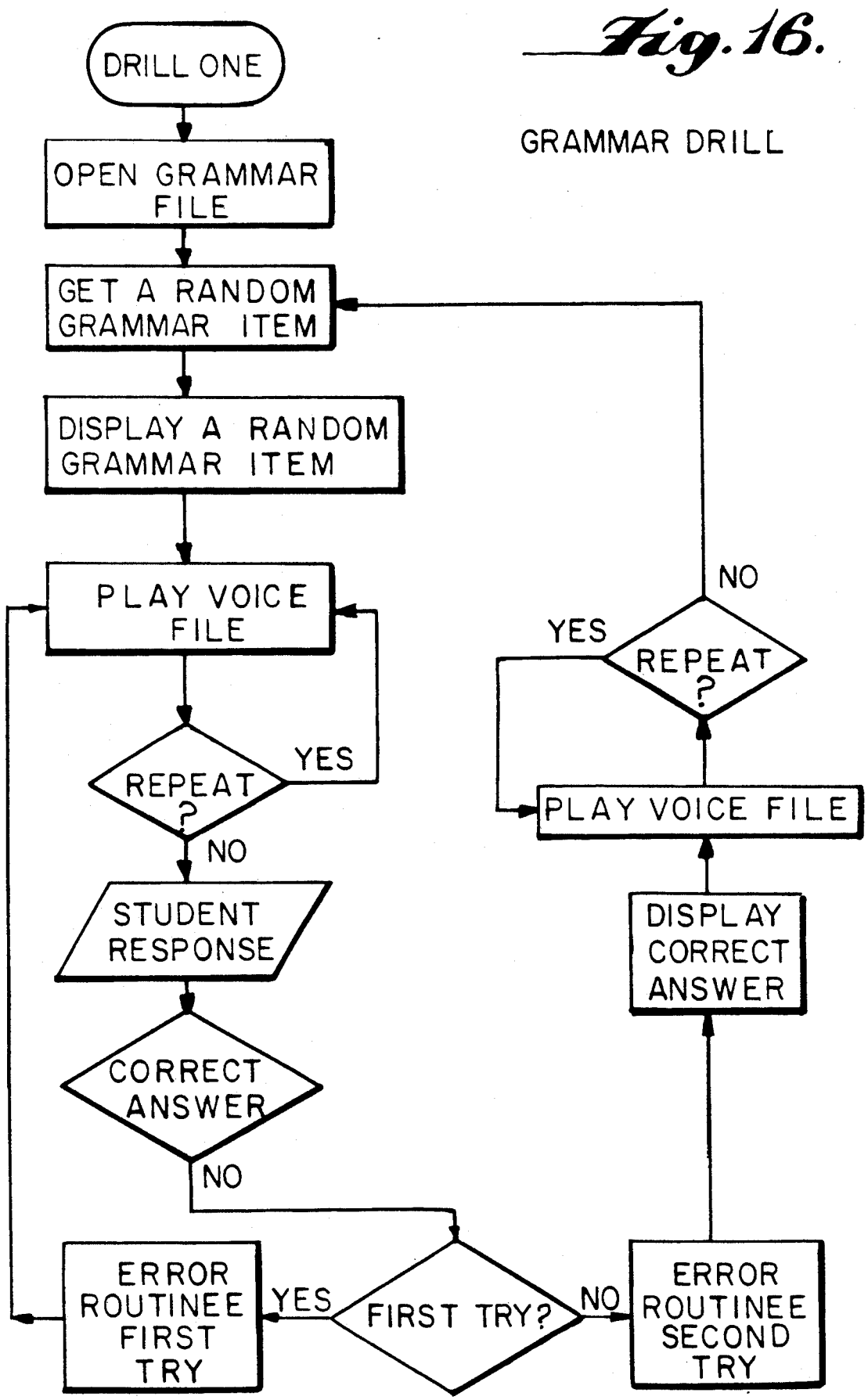

The flow chart in FIG. 16 shows the Grammar Drill portion.

Figure 17:
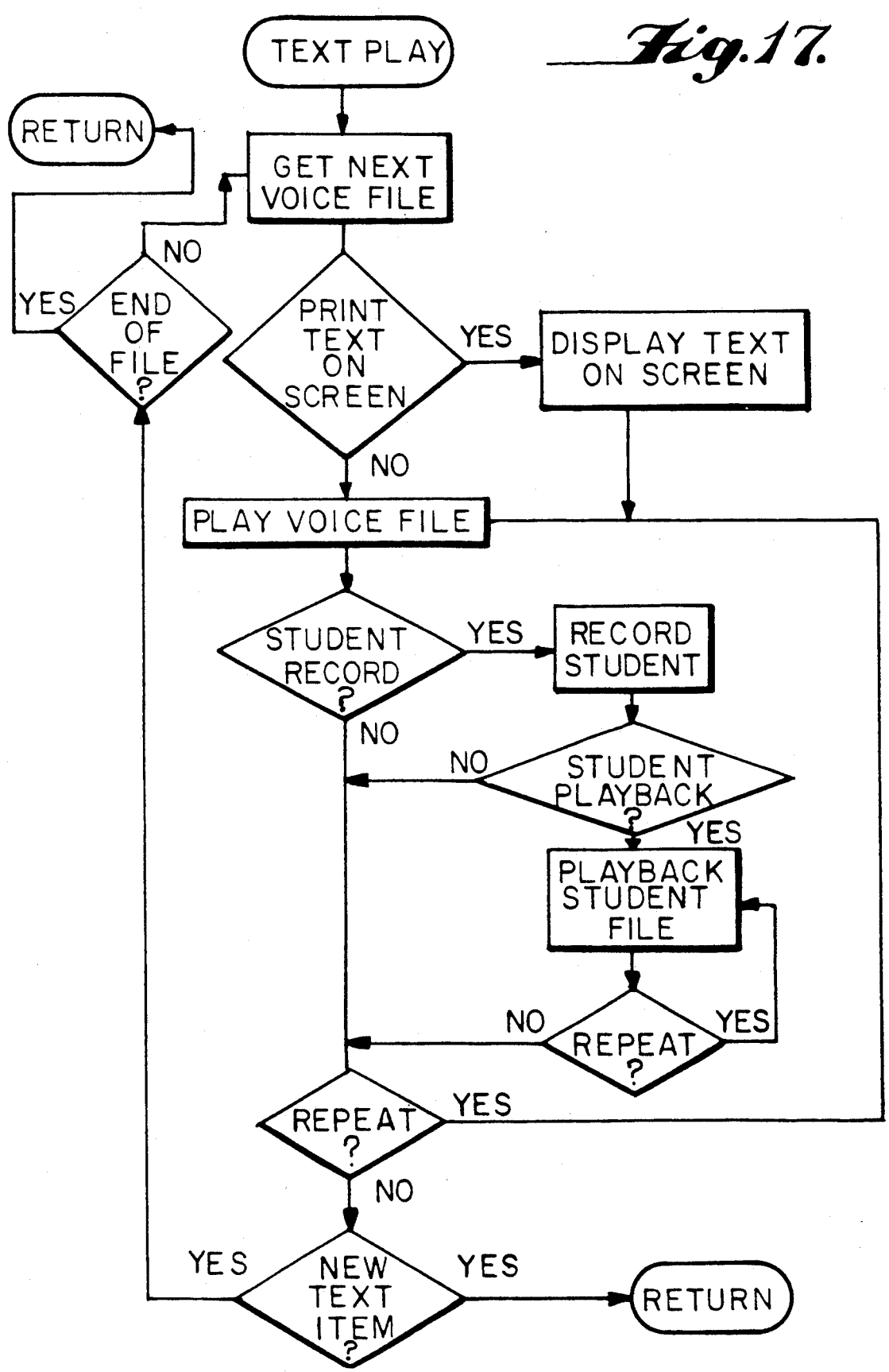
Figure 18:
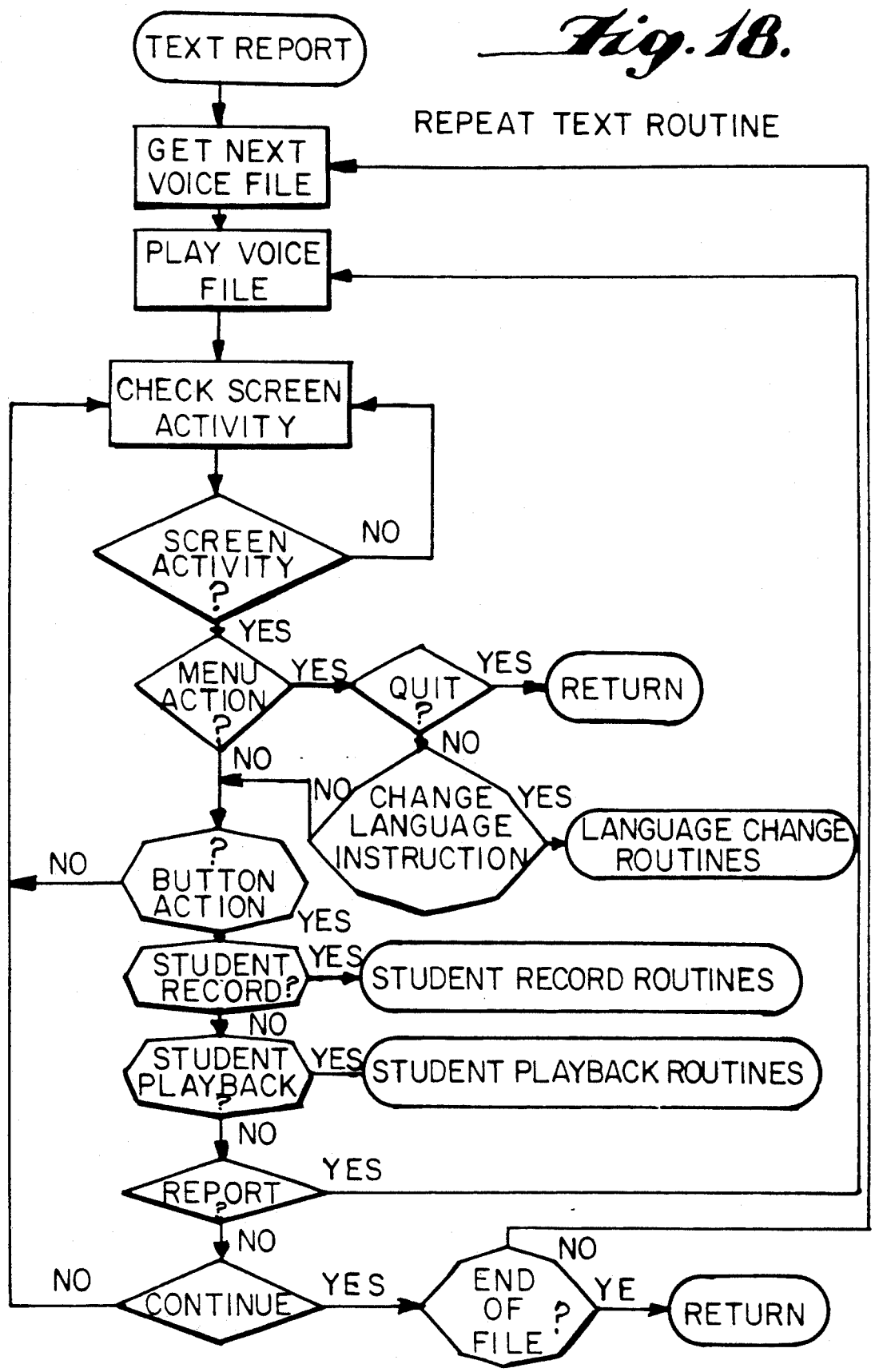

FIG. 17 gives a flow chart of the Text Play and Repeat portion of the main program, and FIG. 18 is a flow chart of the Repeat Text Routine.

Figure 19:
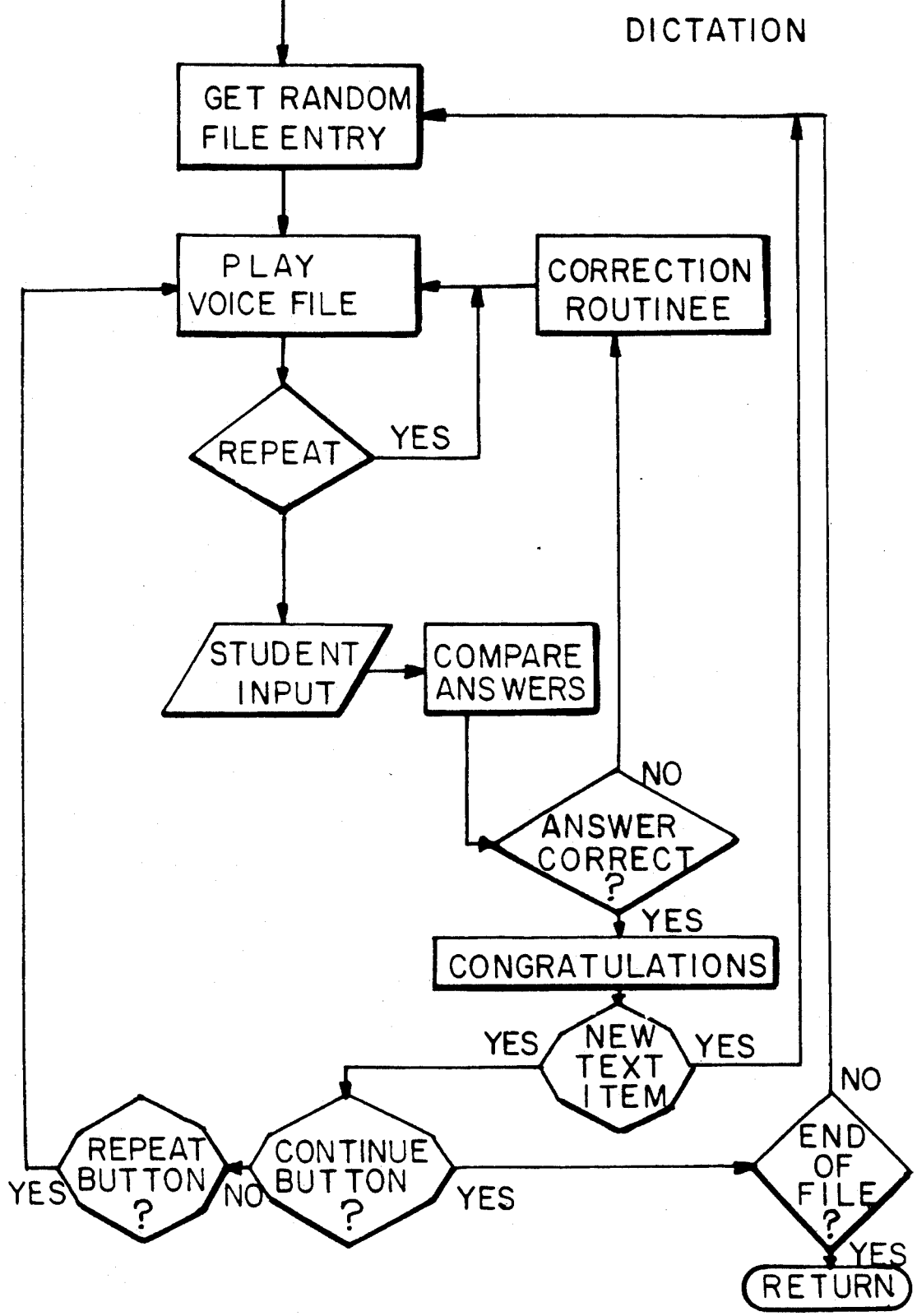

The Dictation portion of the program is presented in the flow chart of FIG. 19.

The Tencore language program of Appendix A and the assembly language program of Appendix B both have detailed comments printed in the program listings. A person skilled in the art will easily understand the software used in the present invention after a study of the flow charts of FIGS. 6-19 and the program listings in Appendices A and B.

The software is preferably stored in CDROM drive 54 and is activated upon start-up of either system 10 or 80. When the software is running in computer 12, the various functions of voice card 68 or the voice card portion of interface card 86 are activated. Again, reference in this discussion is made only to voice card 68, but this applies also to the voice card portion of interface card 86.

In using the system in a language-teaching situation, the operator or student is not required to be a computer expert. Basically, the system is turned on, and the software then functions and instructs the student throughout the process.

For teaching foreign languages, an extensive voice vocabulary is stored in CDROM drive 54 including the native or first language of the student a well as the language being taught. In most cases, one of these languages will be English. However, the invention is not intended to be limited to the teaching of foreign languages to English-speaking students. It applies equally well, and perhaps with more social impact, to the teaching of English as a second language to non-English-speaking persons. This is a particularly important function sociologically so that non-English-speaking persons can be more easily assimilated into, and work within, an English-speaking society.

Once the system is running and the student is wearing head set 72, the student may speak into microphone 76 when instructed by the program. Control may be taken through keyboard 16 or optional switch 79 for recording this voice input is digitized by voice card 68 and stored in memory in computer 12, ordinarily RAM 22. For example, the computer may display a foreign language phrase and the English equivalent thereof in text form on monitor 36 as well as giving an aural signal to the student of the phrase through earphone 74 of headset 72. Corresponding graphics may also be displayed on monitor 36. The student may then verbally repeat the foreign language word or phrase which is then stored in the system as described. By simple key strokes, on keyboard 16, the student may then replay the professionally spoken phrase from the voice vocabulary in the system and also replay his or her own spoken version of the word or phrase. Both can be replayed as many times as desired so that the student gets a true interaction with the system. The student may make additional attempts to properly pronounce the word or phrase as the student desires. Because the student is in control of the system, the student may proceed at his or her own pace.

The software and vocabulary may be written to provide any number of verbal and written exercises as desired. In all cases, the student may immediately replay his or her spoken version of the phrase and compare it to the proper pronunciation. By such repetition of this verbal aspect, there is increased comprehension.

Upon start-up of the system, the student will place memory media, such as a floppy disc, in disc drive 18, and the system will automatically record his or her spoken words or phrases on the student's disc. This data disc may then be reviewed at a later time by a teacher for evaluation and additional instruction as necessary.

Because of the unique digitized recording of the student's voice and ability to replay on command, along with corresponding graphics and text, the system provides an interaction much closer to that of a teacher-student classroom interaction than with previously known devices such as language laboratories.

While the system has been described in particular for a language-teaching situation, it will be seen that by modification of the software, the system is easily adaptable for other voice interactive usages.

It can be seen, therefore, that the voice interactive computer system of the present invention is well adapted to carry out the ends and advantages mentioned, as well as those inherent therein. While presently preferred embodiments of the invention have been described for the purposes of this disclosure, numerous changes in the arrangement and construction of parts may be made by those skilled in the art. All such changes are encompassed within the scope and spirit of the appended claims.

BEST AVAILABLE COPY

APPENDIX A

```
; enunter / defines  -- Edited: 4/19/87 11:23 am -- Printed: 4/19/87 11:30 pm

* This defines file has been tailored for listening comprehension strand.

rcount,2                ;; number of right answers
    wcount,2                ;; number of wrong answers
    attempts,2              ;; total number of attempts

TRUE  = -1
    FALSE =  0

ON  = -1
    OFF =  0 debug = FALSE
    talk  = TRUE type,1
    pcx  = 0
    pic  = 1                ;; type of picture currently being displayed offsety,1 = 0           ;; number to be added to zpy from light pen
    offsetx,1 = 0           ;; number to be added to zpx from light pen lpy,2                   ;; zpy + offsety
    lpx,2                   ;; zpx + offsetx pictnum,8               ;; current picture generic name

* TENSPEAK command list tenuinit = 0            ;; init TENSPEAK to known state
    topen   = 1             ;; open speech archive filespec.tft
    tsay    = 2             ;; speak entry n of speech archive previously opened
    tclose  = 3             ;; close previously opened speech archive
    tread   = 4             ;; read entry n into speech buffer only
    tspeak  = 5             ;; speak previously loaded speech
    tload   = 6             ;; speak filename.rec
    trecord = 7             ;; record speech into memory
    tsave   = 0             ;; save memory buffer on disk tenspeak,8              ;; tenspeak interrupt call register list; ax, bx, cx, dx
        ah,1                ;; entry number (if required) is passed in here
        al,1                ;; tenspeak command (0 - 6) is passed from here
        b..?                ;; tenspeak error (0=no error) is returned here (1 - 27)
        ch,1                ;; offset to talk archive name is passed here
        cl,1                ;; number of entries returned here in topen
```

BEST AVAILABLE COPY

```
47  filespec,45              $$ talk archive filespec
48  * (drive:)\direct1\direct2\direct3\filename(.ext),1,space,0,CR]
49
50  * picture handler defines
51  picture = 0
52  plot   = 1
53  read   = 2
54  repeat = 3
55  volume = 4
56
57  boxkey,1                  $$ box last selected by the lightpen
58  phone  = 0                $$ none of the five boxes was chosen
59  pcont  = 1                $$ continue (SIGA)
60  ppause = 2                $$ pause (PAUSA)
61  prepeat = 3               $$ repeat (REPITA)
62  phelp  = 4                $$ help (AYUDE)
63  plesson = 5               $$ lesson (LECCION)
64
65  balloonx = 00             $$ x,y location of talk balloon
66  balloony = 349
67  cluex  = 200
68  cluey  = 349
69  questx = 16
70  questy = 184
71  answerx = 200
72  answery = 184
73  inputx = 16
74  inputy = questy-3*20
75  graphx = 66
76  graphy = 570              $$ 8.5"
77  graphw = 184
78  graphh = 124              $$ 2.4"
79
80  field,1                   $$ number of field to erase
81  * erasefld field values
82  balloon = 0
83  clue   = 1
84  quest  = 2
85  answer = 3
86  input  = 4
87  half   = 5
88  graph  = 6
89
90  * defines for box locations
91  uppery = 55
92  lowery = 75
93  lextx  = 32
94  box1   = 87
95  box2   = 187
96  box3   = 287
97  box4   = 387
98  box5   = 487
```

```
  99
 100   * HELP menu equates             $$ current help request
 101   helpkey,1
 102
 103   hlpintro= 1
 104   hlphowky= 2
 105   hlpalpha= 3
 106   hlpslflt= 4
 107   hlpslfud= 5
 108   hlpnumbr= 6
 109   hlpnumwj= 7
 110   hlpsymbl= 8
 111   hlpungam= 9
 112   hlpmoney= 10
 113   hlptelep= 11
 114   hlpnames= 12
 115   hlpgreet= 13
 116   hlputih  = 14
 117   hlppast  = 15
 118   hlpgram  = 16
 119   hlpvocab = 17
 120   initial startup
 121   spacing variable
 122   screen   native
 123   thick    on
 124   options  current
 125
 126   ***** Initialization *****
 127
 128   do     tenload              $$ check to see if TENSPEAK is loaded
 129
 130   do     speak(teninit)  $$ make sure it is initialized
 131
 132   ***** SCREEN 1 *****
 133
 134   colors  cyant
 135   erase   0,349;639,199
 136
 137   calc    pictnam == 'world'
 138   do      picture(pcc,000,32,335)            $$ picture of world
 139
 140   calc    pictnam == 'logo'
 141   do      picture(pcc,000,164,300)           $$ Intechnica Logo
 142
 143   calc    pictnam == 'entnt'
 144   do      picture(pcc,000,100,185)           $$ Student Course
 145                                              $$ Introduction in
 146                                              $$  English
 147   at      24;40
 148   size    2
 149   color   red+
 150   write   Hit star to continue
```

```
151
152      do       screen(001)
153
154      pause    keys=next
155
156      color    black
157
158      erase
159
160      zero     filespec
161      pack     filespec,,\test\spint\entutor1
162      do       speak(topen)          $$ entutor1.tfl
163
164      calc     pictnam == 'spint'
165      do       picture(pcc,000,balloonx,balloony)
166
167      do       boxes
168
169 ***** SCREEN 2 *****
170
171      size     2
172      color    blue
173               balloonx+48,balloony-57
174      at
175      write    Hello!
176               My name is
                  VoxBox.
177
178      do       speak(tsoy,000)       $$ "Hello!"
179      do       speak(tsoy,001)       $$ "My name is VoxBox."
180
181      do       screen(002)
182
183      do       debug
184
185 ***** SCREEN 3 *****
186
187      do       erasefld(balloon)
188
189      size     2
190      at       balloonx+32,balloony-43
191      write    You and I
192               are beginning
193               on exciting
194               adventure.
195
196      do       speak(tsoy,002)       $$ "You and I are beginning on exciting
197                                        is adventure."
198
199      do       screen(003)
200
201      do       debug
```

```
202  ***** SCREEN 4 *****
203  do     erasefld(balloon)
204
205  at     balloonx=148,balloony=57
206  size   2
207  write  We are going
208         to learn
209         English.
210
211  do     speak(tsay,003)          $$ "We are going to learn English."
212  do     screen(004)
213  do     debug
214
215  ***** SCREEN 5 *****
216  do     erasefld(balloon)
217
218  do     speak(tsay,004)          $$ "So English should be the first word
219                                      you learn."
220  do     picture(pct,001,graph=166,graphy=25)  $$ text "ENGLISH"
221  do     speak(tsay,005)          $$ "ENGLISH."
222  do     speak(tsay,006)          $$ "See the word on the screen? Say
223                                      after me."
224  do     speak(tsay,007)          $$ "English..."
225  delay  1
226  do     speak(tsay,008)          $$ "ENGLISH"
227  do     speak(tsay,009)          $$ "Once more"
228  do     speak(tsay,010)          $$ "English"
229  delay  1
230  do     speak(tsay,011)          $$ "ENGLISH"
231  do     speak(tsay,012)          $$ "Very good."
232  do     speak(tsay,013)          $$ "From now on I will say English and I
233                                      hope you will say English."
234  do     screen(005)
235  do     debug
```

```
255      ***** SCREEN 6 *****
256      do     erasefld(balloon)
257      do     speak(tsay,014)        $$ "When we have completed all the lessons."
258   at
259   size    balloon:40,balloon=43
260   write   ?
261          You will be
262          able to..."
263
264      do     speak(tsay,015)        $$ "You will be able to..."
265      do     screen(006)
266      do     debug
267
268      ***** SCREEN 7 *****
269   at     balloon:40,balloon=69
270   size    2
271   write   speak English
272
273      do     picture(pcc,002,graphx,graphy)   $$ "speak ENGLISH"
274      do     speak(tsay,016)
275      do     screen(007)
276      do     debug
277
278      ***** SCREEN 8 *****
279      do     erasefld(graph)
280      do     erasefld(balf)
281   at     balloon:d32,balloon=99
282   size    ?
283   write   understand
284          spoken English.
285
286      do     picture(pcc,003,graphx116,graphy)   $$ "can learned English"
287   * NOTE: Had to add 116 to graphx because print(003,pct was leaving a gap
288   * line to the left of the graphx margin.
289
290      do     speak(tsay,017)        $$ "understand spoken English"
291      do     screen(008)
292      do     debug
```

```
305   ***** SCREEN 9 *****
306   do      erasefld(graph)
307   do      erasefld(half)
308
309   at      balloonx:40,balloony:99
310   size    2
311   write   read and         $$ book and English and pencil
312           write English
313
314   do      picture(pcc,004,graphx:16,graphy)
315   do      speak(tsay,018)  $$ "read English and write English"
316
317   do      screen(007)
318
319   do      debug
320
321
322   ***** SCREEN 10 *****
323   do      erasefld(graph)
324   do      erasefld(balloon)
325
326   at      balloonx:40,balloony:57
327   size    2
328   write   This is how
329           we will learn
330           together.
331
332   do      speak(tsay,019)  $$ "How will we do all this? This is how
333                            $$ we will learn together."
334
335   do      screen(010)
336
337   do      debug
338
339
340   ***** SCREEN 11 *****
341   do      erasefld(balloon)
342
343   at      balloonx:40,balloony:57
344   size    2
345   write   ?
346           I will talk to
347           you through
348           the headset.
349
350   do      picture(pcc,005,cluex:160,cluey)   $$ picture of the headset
351   do      picture(pcc,999,graphx:16,graphy:35)  $$ headset text
352
353   do      speak(tsay,020)   $$ "I will talk to you through the headset.
354                             $$ you are now wearing
```

BEST AVAILABLE COPY

```
357     do      speak(tsay,021)         $$ "the English word for headset is..."
358     do      speak(tsay,022)         $$ "headset."
359     do      speak(tsay,023)         $$ "say headset."
360     do      speak(tsay,024)         $$ "you are now wearing your headset"
361     do      screen(011)
362     do      debug
363
364     ***** SCREEN 12 *****
365
366     do      erasefld(clue)
367     do      erasefld(graph)
368     do      erasefld(balloon)
369
370     at      balloonx132,balloony-57
371     size    2
372     write   You will talk
373             to me through
374             the keyboard.
375
376     do      picture(pcc,006,graphx16,graphy)    $$ Keyboard picture
377
378     do      speak(tsay,025)         $$ "you will talk to me through the
379                                        $$ keyboard."
380
381     do      screen(012)
382     do      debug
383
384     ***** end of page 1 *****
385
386     jumpop  page2
387     screen  native
388     spacing variable
389     thick   on
390     if      debug=TRUE
391             calc    pictnam = 'spint'
392             do      picture(pcc,000,balloonx,balloony)
393             do      boxes
394             do      speak(teninit)
395             zero    filespec
396             pack    filespec,\tesol\spint\entutor1
397             do      speak(topen)
398     endif
399
400     ***** SCREEN 13 *****
```

```
408        do      erasefld(graph)
409        do      erasefld(balloon)
410
411        size    2
412        color   blue
413        at      balloon:140,balloony=57
414        write   ... and with
415                your
416                lightpen.
417
418        do      picture(pcc,007,graphx,graphy)   ## picture of lightpen.
419        do      speak(tsay,026)                  ## "and with you lightpen. This is what it
420                                                 ## looks like... your lightpen is on the
421                                                 ## desk in front of you."
422                                                 ## "Please pick it up."
423
424        do      speak(tsay,027)
425
426        do      screen(013)
427        do      debug
428
429 *****  SCREEN 14 *****
430        do      erasefld(balloon)
431
432        size    2
433        at      balloonx=32,balloony=57
434        write   You tell me
435                what to do
436                by touching.
437
438        do      speak(tsay,028)                  ## "With your lightpen you are always in
439                                                 ## control because you tell me what to do
440                                                 ## by touching the lightpen to the light-
441                                                 ## boxes now on the screen."
442        do      speak(tsay,029)                  ## "and since we will use the lightpen and
443                                                 ## lightboxes so much..."
444        do      speak(tsay,030)                  ## "I will now teach you these words in
445                                                 ## English."
446
447        do      screen(014)
448        do      debug
449
450 ***** SCREEN 15 *****
451        do      erasefld(balloon)
452        do      erasefld(graph)
453
454        at      balloonx=32,balloony=57
455        size    2
```

BEST AVAILABLE COPY

```
460  write   The English
461          word for
462          lightpen is...
463  do      picture(pcc,899,graph:185,graph:-25)    ;; text "lightpen"
464  do      
465  do      speak(tsay,031)                         ;; "The English word for lightpen is"
466  do                                              ;; lightpen
467  do      speak(tsay,032)                         ;; "lightpen"
468  delay   1
469  do      speak(tsay,035)                         ;; "LIGHTPEN"
470  do      speak(tsay,034)                         ;; "say after me..."
471  do      speak(tsay,035)                         ;; "lightpen"
472  delay   1
473  do      speak(tsay,036)                         ;; "LIGHTPEN"
474  do      speak(tsay,037)                         ;; "once more"
475  do      speak(tsay,038)                         ;; "lightpen"
476  delay   1
477  do      speak(tsay,039)                         ;; "LIGHTPEN"
478  do      speak(tsay,040)                         ;; "excellent!"
479  do      screen(015)
480  do      debug
481  ***** SCREEN 16 *****
482  do      erasefld(graph)
483  do      erasefld(balloon)
484  do      speak(tsay,041)                         ;; "Now..."
485  do      balloon(822,balloon,5)
486  at
487  size
488  write   The English
489          word for
490          lightpen is...
```

BEST AVAILABLE COPY

```
510  do      picture(pic,008,graph:185,graphy-25)   $$ lightbox text
511  do      speak(tsay,042)                         $$ "the English word for lightbox is
512                                                  $$ Lightbox"
513  delay   1
514
515  do      speak(tsay,043)                         $$ "lightbox"
516
517
518  delay   1
519
520  do      speak(tsay,044)                         $$ "LIGHTBOX"
521  do      speak(tsay,045)                         $$ "say after me..."
522  do      speak(tsay,046)                         $$ "lightbox"
523
524
525  delay   1
526
527  do      speak(tsay,047)                         $$ "LIGHTBOX"
528  do      speak(tsay,048)                         $$ "once more"
529  do      speak(tsay,049)                         $$ "lightbox"
530
531
532  delay   1
533
534  do      speak(tsay,050)                         $$ "LIGHTBOX"
535  do      speak(tsay,051)                         $$ "you say it very well"
536  do      screen(016)
537  do      listen(016)
538  do      debug
539
540  ***** SCREEN 17 *****
541  do      erasefld(graph)
542  do      erasefld(balloon)
543  at      balloonx=40,balloony=43
544  size    2
545  write   Use your
546         Lightpen to
547         touch the
548         Lightbox.
549
550  do      speak(tsay,052)                         $$ "from now on I will tell you to use
551                                                  $$ your lightpen to touch the lightbox."
```

BEST AVAILABLE COPY

```
561        do      screen(017)
562        do      debug
563
565  ***** SCREEN 18 *****
567        do      erasefld(balloon)
568        do      speak(tsay,053)      $$ "Now..."
569
570        at      balloon:x424,balloony-57
571        size    2
572        write   When you touch
573                your Lightpen
574                to a Lightbox.
575
576
577        do      lightpen(320,100,ON)
578
579        do      speak(tsay,054)      $$ "We will learn what happens when you
580                                     $$  touch your lightpen to a lightbox."
581
582        do      screen(018)
583        do      debug
584
585  ***** SCREEN 19 *****
586
587        do      erasefld(balloon)
588        do      lightpen(320,100,OFF)
589
590
591        do      speak(tsay,055)      $$ "Across the bottom of the screen"
592        do      speak(tsay,056)      $$ "starting on the left..."
593        do      speak(tsay,057)      $$ "the first word..."
594        do      speak(tsay,058)      $$ "CONTINUE"
595
596        do      fliplox(wcont)       $$ highlight the continue box
597
598        do      screen(019)
599        do      debug
600
601  ***** SCREEN 20 *****
602
603        at      balloonx440,balloony-43
604        size    2
605        write   CONTINUE
606                means that
607                when you are
```

BEST AVAILABLE COPY

```
612            'ready...'
613    do     speak(tsay,059)              $$ 'means that when you are ready...'
614    do     speak(tsay,060)              $$ 'and want to go to the next lesson.'
615    do     boxes(pcont)                 $$ put continue back for next demo
616
617
618    do     speak(tsay,061)              $$ 'I will do so when you touch your
619                                        $$ lightpen to the CONTINUE word.'
620
621    do     lightpen(box133,uppery,ON)   $$ touch lightpen to continue
622    do     f(pbox(pcont)                $$ highlight the box
623
624    delay  ?
625    do     screen(020)
626
627    do     debug
628
629    do     lightpen(box133,uppery,OFF)
630    do     boxes(pcont)                 $$ put back continue original
631
632    ***** end of page 2 *****
633    jumptop page3
634    screen  native
635    spacing variable
636    thick   on
637    if      debug=TRUE
638            calc    pictnum == 'spint'
639    .       do      picture(pcc,000,balloonx,balloony)
640    .       do      boxes
641    .       do      speak(teninit)
642    .       zero    filespec
643    .       pack    filespec,,\tesol\spint\entutor1
644    .       do      speak(topen)
645    endif
646    ***** SCREEN 21 *****
647    do      erasefld(balloon)
648
649    at      balloon:132,balloony-43
650    color   blue
651    size    ?
652    write   PAUSE simply
653            tells me to
```

```
663            wait until you
664            are ready.
665   do       lightpen(box2133,uppery11,ON)     $$ touch lightpen to pause
666   do       flipbox(ppause)                   $$ highlight the box
669   do       speak(tsay,062)                   $$ "The word PAUSE simply tells me to
670                                              $$ wait until you are ready to go on
671                                              $$ with the lesson you are working on."
672
673   do       screen(021)
674   do       debug
675
676   do       lightpen(box2433,uppery11,OFF)
678
679   do       boxes(ppause)
680
681
682 ***** SCREEN 22 *****
683   do       erasefld(balloon)
684
685            balloon.t16,balloon-43
686   at       2
687   size     blue
688   color    REPEAT lets
689   write    you go back and
690            do the last
691            exercise.
692
693   *do      speak(tsay,063)                   ** "The third word..."
694   do       speak(tsay,064)                   ** "REPEAT"
695
696   do       lightpen(box3433,uppery11,ON)     $$ touch lightpen to repeat
698   do       flipbox(prepeat)                  $$ highlight the box
699
700   do       speak(tsay,065)                   $$ "lets you go back and do the last exercise
701                                              $$ you just worked on."
702
703
704   do       speak(tsay,066)                   $$ "as often as you like."
705
706   do       screen(022)
707
708   do       debug
709
710   do       lightpen(box3433,uppery11,OFF)
711
712   do       boxes(prepeat)
713
```

```
714  ***** SCREEN 23 *****
715  do    erasefld(balloon)
716
717  at    balloonx+16,balloony-43
718  size  2
719  color blue
720  write HELP means I am
721        always ready
722        to assist when
723        trouble occurs.
724
725  do    speak(tsay,067)          $$ "The Lightbox word.."
726  do    speak(tsay,068)          $$ "HELP"
727  do    lightpen(box4133,uppery+1,ON)   $$ touch lightpen to help
728  do    fliphox(phelp)           $$ highlight the box
729  do    speak(tsay,069)          $$ "means I am always available to come
730                                    $$ running when you run into trouble."
731
732  do    screen(023)
733  do    debug
734  do    lightpen(box4133,uppery+1,OFF)
735  do    boxes(phelp)
736
737  ***** SCREEN 24 *****
738  do    erasefld(balloon)
739
740  at    balloonx+16,balloony-43
741  size  2
742  color blue
743  write When you touch
744        HELP with your
745        lightpen, watch
746        what happens.
747
748  do    speak(tsay,070)          $$ "When you touch HELP with your Lightpen
749                                    $$ I will show you all the ways I can help
750                                    $$ you..."
751                                    $$ "WATCH!"
752  do    speak(tsay,071)
753  do    lightpen(box4133,uppery+1,ON)   $$ touch lightpen to help
754  do    fliphox(phelp)
```

BEST AVAILABLE COPY

```
768      do        screen(024)
769
770      do        debug
771
772      do        speak(tclose)        $$ close entutor1.tf1
773      ***** SCREEN 25 *****
774
775      zero      filespec
776      pack      filespec,\tesol\spint\entutor2
777      do        speak(topen)         $$ open entutor2.tf1
778
779      do        helpment(65,275)
780
781      do        screen(025)
782
783      do        speak(tsay,000)      $$ "I will help you with:"
784      do        speak(tsay,001)      $$ "Introduction"
785      do        speak(tsay,002)      $$ "How to use your keyboard"
786      do        speak(tsay,003)      $$ "Alphabet"
787      do        speak(tsay,004)      $$ "Letters"
788      do        speak(tsay,005)      $$ "Words"
789      do        speak(tsay,006)      $$ "Numbers"
790      do        speak(tsay,007)      $$ "Words"
791      do        speak(tsay,008)      $$ "Symbols"
792      do        speak(tsay,009)      $$ "Words and Numbers Game"
793      do        speak(tsay,010)      $$ "Money"
794      do        speak(tsay,011)      $$ "Telephone"
795      do        speak(tsay,012)      $$ "Names"
796      do        speak(tsay,013)      $$ "Greetings"
797      do        speak(tsay,014)      $$ "This-That"
798      do        speak(tsay,015)      $$ "Past Tense"
799      do        speak(tsay,016)      $$ "Grammar"
800      do        speak(tsay,017)      $$ "Vocabulary"
801
802      do        speak(tsay,018)      $$ "When you choose which HELP you want..."
803      do        speak(tsay,019)      $$ "we will start that lesson over from the
804                                     $$ beginning."
805
806      do        debug
807      ***** end of page 3 *****
808
809      jumpop    page4
810      screen    native
811      spacing   variable
812      thick     on
813
814      if        debug=TRUE
815      .         calc     pictnam = 'spint'
816      .         do       speak(leninit)
817
```

BEST AVAILABLE COPY

```
B16          zero     filespec
B17          pack     filespec,,\tesol\spint\entutor2
B18           do      speak(topen)
B19
B20   endif
B21
B22   ***** SCREEN 26 *****
B23
B24   colore  block
B25   erase                    $$ erase whole screen to get rid of help menu
B26
B27    do     picture(pcc,000,balloonx,balloony)    $$ put back talk balloon
B28           boxes
B29
B30    do     speak(tsay,020)                       $$ "At the right"
B31    do     speak(tsay,021)                       $$ "on the screen"
B32    do     speak(tsay,022)                       $$ "the lightbox word..."
B33
B34    do     flipbox(plesson)
B35
B36    do     speak(tsay,023)                       $$ "LESSON"
B37
B38           balloonx:132,balloony:43
B39           2
B40    at     blue
B41    size   LESSON simply
B42    color  means I will
B43    write  show you all
B44           the lessons.
B45
B46    do     boxes(plesson)                        $$ put back for demo
B47
B48    do     speak(tsay,024)    $$ "Simply means I will show you all the
B49                              $$ individual lessons and you can choose
B50                              $$ the one you want. Watch!"
B51
B52    do     lightpen(box5133,uppery11,ON)         $$ touch lightpen to lesson
B53
B54    do     flipbox(plesson)
B55
B56    do     screen(026)
B57
B58    do     debug
B59
B60   ***** SCREEN 27 *****
B61
B62    do     erasefld(balloon)
B63
B64    do     lp_move(275,295)
B65
B66    at     balloonx:16,balloony:43
```

BEST AVAILABLE COPY

```
868  size    2
869  color   blue
870  write   It's just like
871          using a menu
872          in a restaurant.
873          You choose...
874
875  do      speak(tsay,025)    $$ "See? It is just like using a menu in a
876                             $$ restaurant. This is what is available
877                             $$ and you choose the one you want."
878
879  do      screen(027)
880
881  do      speak(tsay,026)    $$ "The lessons we will learn are:"
882  do      speak(tsay,027)    $$ "Alphabet"
883  do      speak(tsay,028)    $$ "Letters and..."
884  do      speak(tsay,029)    $$ "Words"
885  do      speak(tsay,030)    $$ "Numbers"
886  do      speak(tsay,031)    $$ "Words"
887  do      speak(tsay,032)    $$ "Symbols and ..."
888  do      speak(tsay,033)    $$ "Words and Numbers Game"
889  do      speak(tsay,034)    $$ "Money"
890  do      speak(tsay,035)    $$ "Telephone"
891  do      speak(tsay,036)    $$ "Names"
892  do      speak(tsay,037)    $$ "Greetings"
893  do      speak(tsay,038)    $$ "This-that and ..."
894  do      speak(tsay,039)    $$ "Past Tense"
895
896  do      speak(tsay,040)    $$ "So simple"
897  do      speak(tsay,041)    $$ "so easy"
898  do      speak(tsay,042)    $$ "such fun!"
899
900  do      debug
901
902  ***** SCREEN 28 *****
903
904  colore  black
905  erase                      $$ erase whole screen to get rid of lesson menu
906
907  do      picture(pcc,000,balloonx,balloony)    $$ put back talk balloon
908
909  do      boxes
910
911  do      speak(tsay,043)    $$ "Because I want you to feel comfortable
912                             $$ with me."
913
914  at      balloonx+16,balloony-43
915  size    2
916  color   blue
917  write   I will now show
918          you 3 important
```

```
919              uses of your
920              keyboard.
921      do      speak(tsay,044)        ** "I will now show you 3 important ways to
922                                     ** use your keyboard to help you learn
923                                     ** English."
924
925      do      screen(028)
926
927      do      debug
928
929 ***** SCREEN 29 *****
930
931      do      erasefld(balloon)
932
933      do      speak(tsay,045)        ** "First..."
934
935   at         balloonx:24,balloony:43
936   size       2
937   color      blue
938   write      On the right of
939              your keyboard
940              is a key with
941              a STAR.
942
943      do      speak(tsay,046)        ** "on the right of your keyboard is a key
944                                     ** with a star."
945
946      do      picture(pcc,009,graphx:350,graphy) ** picture of a star.
947
948      do      speak(tsay,047)        ** "It looks like this"
949
950      do      screen(029)
951
952      do      debug
953
954 ***** SCREEN 30 *****
955
956      do      erasefld(balloon)
957
958      do      speak(tsay,048)        ** "everytime you want to tell me you have
959                                     ** finished an exercise and want me to show
960                                     ** you a new one."
961      do      speak(tsay,049)        ** "hit the star key."
962
963   at         balloonx:132,balloony:57
964   size       2
965   color      blue
966   write      The English
967              word for star
968              is ...
969
```

```
970         do       speak(tsay,050)                   $$ "the English word for star is..."
971         do       picture(pcc,010,graph:116,graphy=35)    $$ star text
972
973         do       speak(tsay,051)                   $$ "Star"
974         do       speak(tsay,052)                   $$ "star is the word I will use from now on"
975         do       speak(tsay,053)                   $$ "when you hit the star"
976         do       speak(tsay,054)                   $$ "I will respond"
977
978         do       screen(030)
979
980         do       debug
981
982  **** end of page 4 ****
983
984         do       speak(tclose)                     $$ close entutor2.tf1
985
986  jumpop  page5
987  define  local
988  index,1
989  errors = graphx
990  errory = graphy-45
991  width = 17
992  sentence(24),1
993  try,1                                             $$ attempts counter for erase demo
994  define  end
995
996  screen  native
997  spacing variable
998  thick   on
999
1000        if       debug=TRUE
1001        calc     pictnam == 'spint'
1002  .     do       picture(pcc,000,balloonx,balloony)
1003  .     do       boxes
1004  .     do       speak(teninit)
1005        endif
1006
1007  zero   filespec
1008  pack   filespec,,\tesol\spint\entutor3
1009        do       speak(topen)                      $$ open entutor3.tf1
1010
1011        calc     try = 0                           $$ reset demo attempts
1012
1013  ***** SCREEN 31 (36) *****
1014
1015        do       speak(tsay,000)                   $$ "Second..."
1016
1017  begin                                            $$ entry point for erase demo
```

```
1021  do     erasefld(graph)
1022  do     erasefld(balloon)
1023  at     balloon,416,balloony 43
1024  size   2
1025  color  blue
1026  write  When you make
1027         a typing mistake
1028         it is easy to
1029         correct.
1030
1031  do     speak(tsay,001)           $$ "When you make a typing mistake"
1032  do     speak(tsay,002)           $$ "it's so easy to correct."
1033
1034  do     b.move(031 1 53try)
1035  do     debug
1036
1037  **** SCREEN 32 (37) ****:
1038  do     erasefld(balloon)
1039
1040  at     balloon(416,balloony 43
1041  ?
1042  size   2
1043  color  blue
1044  write  A key with
1045         the English
1046         word...
1047         ERASE.
1048
1049  do     screen(032 4 5*try)
1050  do     speak(tsay,003)           $$ "On your keyboard is a key with the
1051                                    $$ English word..."
1052  do     picture(pcc,011,cluex,cluey-25) $$ picture of the erase key.
1053  do     speak(tsay,004)           $$ "ERASE"
1054  do     speak(tsay,005)           $$ "Look at the word on your screen..."
1055  do     speak(tsay,006)           $$ "Then find that key on your keyboard."
1056  do     speak(tsay,007)           $$ "Very good!"
1057  do     speak(tsay,008)           $$ "In English"
1058  do     speak(tsay,009)           $$ "ERASE is the word for erase"
1059  do     speak(tsay,010)           $$ "ERASE is ERASE"
1060  do     speak(tsay,011)           $$ "Each time you hit the ERASE key..."
```

BEST AVAILABLE COPY

```
1073          do           speak(tsay,012)       $$ "you will erase one letter of what you
1074                                              $$ have typed"
1075
1076          do           speak(tsay,013)       $$ "you will ERASE starting at the right
1077                                              $$ end of what you have typed and moving
1078                                              $$ to the left."
1079
1080          do           speak(tsay,014)       $$ "It would be easier to understand if
1081                                              $$ you watched me correcting a typing mistake
1082          do           debug
1083
1084    ***** SCREEN 33 (3U) *****
1085
1086          do           prosefld(balloon)
1087
1088          do           screen(033 + 5*try)
1089
1090    spacing  fixed
1091    thick    on
1092    size     ?
1093    color    red
1094    at       errorx,errory
1095    write    I like learning English
1096
1097    pack     sentence(1),,I like learning English
1098          do           speak(tsay,015)       $$ "I like learning English."
1099
1100          do           speak(tsay,016)       $$ "I made two mistakes in spelling"
1101
1102          do           speak(tsay,017)       $$ "so I hit the erase key"
1103
1104          do           speak(tsay,018)       $$ "and erase"
1105
1106          do           speak(tsay,019)       $$ "one letter at a time"
1107
1108          loop    index == 22,3,-1
1109               at      errorx+width*index,errory
1110               erase   errorx+width*index,errory+20;errorx+width*(index+1),errory
1111               beep    0.1,400
1112               delay   0.1
1113          endloop
1114
1115          do           speak(tsay,020)       $$ "until I reach the first mistake"
1116
1117          do           speak(tsay,021)       $$ "I made"
1118
1119          do           speak(tsay,022)       $$ "I then retype the sentence correctly."
1120
1121    at     errorx+3*17,errory
1122    loop   index == 4,23
```

BEST AVAILABLE COPY

```
1125  .       shown   sentence(index)
1126  .       beep    0,1,400
1127  endloop
1128
1129  do      speak(tsay,023)         $$ "I like learning English."
1130
1131  do      debug
1132
1133  ***** SCREEN 39 (39) *****
1134
1135  do      erasefld(balloon)
1136
1137  do      screen(034 + 5*try)
1138
1139  do      speak(tsay,024)         $$ "That is all there is to it!"
1140
1141  if      try/0   debug
1142  .       do      debug                   $$ don't ask twice
1143  .       branch  1nologin
1144  endif
1145
1146  do      speak(tsay,025)         $$ "Would you like to see that again?"
1147
1148  spacing variable
1149  size    2
1150  color   blue
1151  at      balloonx+48,balloony-43
1152  write   To see again
1153          touch your
1154          lightpen to
1155          REPEAT.
1156
1157  do      speak(tsay,032)         $$ "Just touch you lightpen to the REPEAT
1158                                  $$ word."
1159
1160  do      lightpen(box3133,uppery+1,ON)   $$ draw lightpen to repeat box
1161
1162  lwait
1163  do      pointer
1164  do      lightpen(box3133,uppery+1,OFF)
1165  do      erasefld(graph)
1166  do      boxchek
1167  if      boxkey/prepeat
1168  .       branch  lwait
1169  else
1170  .       calc    try == try + 1          $$ count this pass
1171  .       branch  1again
1172  endif
1173
1174  ***** SCREEN 40 *****
1175
```

BEST AVAILABLE COPY

```
1176  1nologin
1177  do         erasefld(balloon)
1178  do         erasefld(clue)
1179  do         erasefld(graph)
1180
1181
1182  do         screen(40)               ;; entry to skip second demo of erase
1183
1184  do         speak(tsay,027)          ;; "it is so easy you won't have any
1185                                      ;; trouble."
1186
1187  do         speak(tsay,028)          ;; "The third step is really exciting"
1188
1189             balloons+32,balloony-43
1190  at
1191  size       2
1192  color      blue
1193  write      How you can
1194             hear yourself
1195             speaking
1196             English.
1197  do         speak(tsay,029)          ;; "It is how you can hear yourself
1198                                      ;; speaking English."
1199  do         debug
1200
1201  ***** SCREEN 41 *****
1202
1203  do         erasefld(balloon)
1204
1205  do         screen(41)
1206
1207  do         speak(tsay,030)          ;; "On your keyboard"
1208
1209  do         speak(tsay,031)          ;; "in the lower right-hand corner"
1210
1211  do         speak(tsay,032)          ;; "is a key with the English word"
1212
1213             balloons+38,balloony-57
1214  at
1215  size       2
1216  color      blue
1217  write      The talk key
1218             looks like
1219             this...
1220  do         picture(pcx,017,graphx+100,graphy)  ;; picture of talk key
1221
1222  do         speak(tsay,033)          ;; "TALK"
1223
1224  do         speak(tsay,034)          ;; "See the word on your screen"
```

```
1226   do       speak(tsay,035)      ** "Please find the TALK key on your
1227                                 ** keyboard."
1228
1229   do       speak(tsay,036)      ** "Very good!"
1230
1231   do       speak(tsay,037)      ** "In English the TALK means talk."
1232
1233   do       speak(tsay,038)      ** "Talk is TALK"
1234
1235   do       speak(tsay,039)      ** "When I ask you to record a sentence"
1236
1237   do       speak(tsay,040)      ** "hit the TALK key"
1238
1239   do       speak(tsay,041)      ** "listen for a BEEP that sounds like this"
1240
1241   beep     0.5,200
1242
1243   do       speak(tsay,042)      ** "then talk into your microphone."
1244
1245   do       speak(tsay,043)      ** "Microphone is the English word for
1246                                 ** microphone."
1247
1248   do       speak(tsay,044)      ** "After you have recorded your voice"
1249
1250   do       speak(tsay,045)      ** "hit the TALK key again"
1251
1252   do       speak(tsay,046)      ** "then"
1253
1254   do       debug
1255   **** SCREEN 42 ****
1256   do       erasefld(balloon)
1257   do       erasefld(graph)
1258
1259   do       screen(042)
1260
1261
1262   do       speak(tsay,047)      ** "on your keyboard are two keys with
1263                                 ** words in ENGLISH."
1264
1265   do       speak(tsay,048)      ** "The words are LISTEN and SAVE."
1266
1267   do       speak(tsay,049)      ** "See the words on your screen?"
1268
1269
1270   at       balloon:132,balloony-57
1271   size     2
1272   color    blue
1273   write    Listen and
1274            Save will
1275            look like this.
1276
```

BEST AVAILABLE COPY

```
1277     do       picture(pcc,013,graphx+16,graphy)    $$ listen
1278     do       picture(pcc,014,graphx+90,graphy)    $$ save key
1279
1280
1281     do       speak(l.say,050)                     $$ "Please find them on your keyboard"
1282
1283     do       speak(l.say,051)                     $$ "very good"
1284
1285     do       debug
1286
1287     ***** end of page 5 *****
1288
1289     do       speak(t.close)                       $$ close entutor3.tfl
1290
1291     jumpon   page6
1292     screen   native
1293     spacing  variable
1294     thick    on
1295
1296     if       debug=TRUE
1297     .        calc    picnum == 'spint'
1298     .        do      picture(pcc,000,balloonx,balloony)
1299     .        do      break
1300     .        do      speak(t.init)
1301     endif
1302
1303     zero     filespec
1304     pack     filespec,,\esol\spint\entutor4       $$ open entutor4.tfl
1305     do       speak(t.open)
1306
1307     ***** SCREEN 43 *****
1308
1309     do       erasefld(balloon)
1310
1311     at       balloonx+16,balloony-57
1312     size     2
1313     color    blue
1314     write    The English
1315              word for listen
1316              is LISTEN.
1317
1318     at       cluex+130,cluey-75
1319     size     2
1320     color    red
1321     write    LISTEN
1322
1323     do       screen(43)
1324
1325     do       speak(t.say,000)                     $$ "In English LISTEN is the word for
1326                                                   $$ listen."
1327     do       speak(t.say,001)                     $$ "Listen is LISTEN"
```

```
1328   do          speak(tsay,002)         ** "Hit the LISTEN key to hear yourself"
1329   do          speak(tsay,003)         ** "after you have listened"
1330
1331   do          debug
1332
1333   ***** SCREEN 44 *****
1334   do          erasefld(clue)
1335   do          erasefld(balloon)
1336
1337   at          balloonx132,balloony-57
1338   size        2
1339   color       blue
1340   write       The English
1341               word for save
1342               is SAVE.
1343
1344   at          locx1130,clney-72
1345   size
1346   color       red
1347   write       SAVE
1348
1349
1350   do          screen(44)
1351
1352   do          speak(tsay,004)         ** "please hit the SAVE key"
1353   do          speak(tsay,005)         ** "to save what you have recorded"
1354   do          speak(tsay,006)         ** "In English SAVE is the word for save"
1355   do          speak(tsay,007)         ** "Save is SAVE."
1356
1357   do          debug
1358
1359   ***** SCREEN 45 *****
1360   do          erasefld(clue)
1361   do          erasefld(balloon)
1362   do          erasefld(graph)
1363
1364   do          speak(tsay,008)         ** "Once more quickly"
1365
1366   at          balloonx132,balloony-57
1367   size        2
1368   color       blue
1369   write       You record
1370               with the TALK
1371               Key and...
1372
1373   do          screen(45)
```

BEST AVAILABLE COPY

| | | | |
|---|---|---|---|
| 1380 | do | speak(tsay,009) | ** "hit the TALK key" |
| 1381 | do | speak(tsay,010) | ** "listen for the BEEP" |
| 1382 | | | |
| 1383 | beep | 0.5,200 | |
| 1385 | do | speak(tsay,011) | ** "record your voice" |
| 1386 | | | |
| 1387 | do | speak(tsay,012) | ** "hit TALK again" |
| 1388 | | | |
| 1389 | do | speak(tsay,013) | ** "then hit the LISTEN key to hear your |
| 1390 | | | ** voice." |
| 1391 | do | speak(tsay,014) | ** "Hit the SAVE key" |
| 1392 | | | |
| 1393 | | | |
| 1394 | *do | speak(tsay,015) | ** "then hit the STAR" |
| 1395 | *do | speak(tsay,016) | ** "so I can come back!" |
| 1396 | | | |
| 1397 | do | speak(tsay,017) | ** "It sounds more complicated than it |
| 1398 | | | ** really is." |
| 1399 | | | |
| 1400 | do | speak(tsay,018) | ** "You try it once and you'll discover how |
| 1401 | | | ** easily you can do it." |
| 1402 | | | |
| 1403 | do | speak(tsay,019) | ** "when I say NOW" |
| 1404 | | | |
| 1405 | do | speak(tsay,020) | ** "hit the TALK key" |
| 1406 | | | |
| 1407 | do | speak(tsay,021) | ** "after the BEEP" |
| 1408 | | | |
| 1409 | do | speak(tsay,022) | ** "record your voice" |
| 1410 | | | |
| 1411 | do | speak(tsay,023) | ** "Hit TALK again" |
| 1412 | | | |
| 1413 | do | speak(tsay,024) | ** "then hit LISTEN" |
| 1414 | | | |
| 1415 | do | speak(tsay,025) | ** "to hear yourself" |
| 1416 | | | |
| 1417 | do | speak(tsay,026) | ** "and last" |
| 1418 | | | |
| 1419 | do | speak(tsay,014) | ** "Hit the SAVE key" |
| 1420 | *do | speak(tsay,027) | ** "hit SAVE and then STAR" |
| 1421 | | | |
| 1422 | do | speak(tsay,028) | ** "If you can't think of anything to say" |
| 1423 | | | ** "just say your name" |
| 1424 | | | |
| 1425 | | | |
| 1426 | do | speak(tsay,029) | ** "your address" |
| 1427 | | | |
| 1428 | do | speak(tsay,030) | ** "how you are feeling today" |
| 1429 | | | |
| 1430 | do | speak(tsay,031) | ** "anything at all" |
| 1431 | | | |

```
1432    do       speak(tsay,032)        ** "Ready?"
1433    do       speak(tsay,033)        ** "Do it"
1434    do       speak(tsay,034)        ** "NOW!"
1435
1436    do       debug
1437
1438    ***** SCREEN 46 *****
1439
1440    do       era.efld(balloon)
1441    do       eraseflд(graph)
1442
1443    nextop   page-7
1444
1445    at       balloonx=32,balloony=57
1446    ?
1447    size     blue
1448    color    Please record
1449    write    your voice
1450             NOW!!
1451
1452    do       screen(46)
1453
1454    at       graphx=100,graphy=28
1455    1
1456    size     while:
1457    color    When ready....
1458    write    Hit TALK key to start recording sequence
1459             Wait for the beep
1460             Speak into the microphone loud and clear
1461             Hit TALK key again to stop recording
1462
1463    time     30                      ** set timeout to 30 seconds
1464    Italk
1465
1466    do       numlock      ** make talk, listen, and save work
1467
1468    pause    keys=ins,timeup,next
1469
1470    if       =key=timeup
1471    *.       do       speak(tsay,035) ** "Remember"
1472    *.       do       speak(tsay,036) ** "you must hit the STAR key"
1473    *.       do       speak(tsay,037) ** "or I can't come back."
1474    .        do       speak(tsay,038) ** "Please record your voice"
1475    .        do       speak(tsay,039) ** "or"
1476    .        do       speak(tsay,040) ** "if you have"
1477    .        do       speak(tsay,041) ** "hit the STAR key"
1478    .        do       speak(tsay,042) ** "NOW!"
1479    .        time     30
1480    .        branch   Italk
```

```
1484   elseif  zkey/cins
1485     .    branch ltalk
1486   endif
1487
1488    do    speak(lrecord)           ## kill the extra key
1489    pause
1491    do    numlock
1492
1493    .     graph=100,graphy=96
1494    size   1
1495    color  yellow
1496    write  Hit LISTEN key to hear your voice
1497
1498    pause
1499    do    keys=cbe,next
1500    do    speak(llspeak)
1501
1502    .    graphx100,graphy 110
1503    size  1
1504    color  green
1505    write  Hit SAVE key to store your speech
1506
1507    pause
1508    do    keys=cse,next
1509    pack  filespec,,\lesol\save\save000.rec       ## save the crap!
1510    do    speak(tsave)
1511
1512   ***** end of page 7 *****
1513
1514    zero  filespec                ## reset filespec due to save command
1515    pack  filespec,,\lesol\spint\entutor4
1516    do    speak(tclose)            ## close entutor9.LF)
1517
1518    jumper page7
1519    define local
1520    help4  = 325
1521    help7  = 345
1522    define end
1523
1524    screen active
1525    spacing variable
1526    thick   on
1527
1528    if    debug=TRUE
1529     .    calc   picnum = 'spint'
1530     .    do    picture(pcc,000,balloonx,balloony)
1531     .    do    boxes
1532     .    do    speak(teninit)
1533    endif
1534
```

BEST AVAILABLE COPY

```
1535  do        erasefld(balloon)
1536  do        erasefld(graph)
1537  zero      filespec
1538  pack      filespec,\tesol\sprint\entutor5
1539  do        speak(1open)                    $$ open entutor5.tfl
1540
1541  ***** SCREEN 47 *****
1542
1543  do        screen(047)
1544
1545  do        erasefld(balloon)
1546
1547  do        speak(tsay,000)                 $$ "Did you have a good time?"
1548
1549  at        balloonx+64,balloony--43
1550  size      2
1551  color     blue
1552  write     I want you
1553        to enjoy
1554        learning
1555        English.
1556
1557  do        speak(tsay,001)                 $$ "I hope so because I want you to enjoy
1558                                              learning English."
1559  do        speak(tsay,002)                 $$ "I have explained the mechanics of how
1560                                              easily we will work together."
1561  do        speak(tsay,003)                 $$ "now I want to explain how we will make
1562                                              learning easier."
1563  do        speak(tsay,004)                 $$ "I will teach you English words"
1564  do        speak(tsay,005)                 $$ "one at a time."
1565  do        speak(tsay,006)                 $$ "by saying the word to you in English
1566                                              and Spanish"
1567
1568  do        debug
1569
1570  ***** SCREEN 48 *****
1571
1572  do        screen(048)
1573
1574  do        erasefld(balloon)
1575
1576  at        balloonx+48,balloony--43
1577  size      2
1578  color     blue
1579  write     Writing the
1580        word in
1581        English and
1582        Spanish.
1583
1584  at        graphx+100,graphy--75
1585  size      2
```

```
1586  color  red+
1587  write  ENGLISH and SPANISH
1588
1589  do     speak(tsay,007)     ££ "and by writing the word on your screen
1590                             ££  in English and Spanish."
1591  do     speak(tsay,008)     ££ "just like I am talking and writing now"
1592  do     speak(tsay,009)     ££ "This will be an easy way for you to
1593                             ££  build your vocabulary of English words."
1594  do     speak(tsay,010)     ££ "We will review the English words we have
1595                             ££  learned in each lesson."
1596  do     speak(tsay,011)     ££ "and you will have the opportunity to
1597                             ££  answer questions to use your new English
1598                             ££  words."
1599
1600  do     debug
1601
1602  ***** SCREEN 49 *****
1603
1604  do     screen(049)
1605
1606  do     erasefld(balloon)
1607  do     erasefld(graph)
1608  at     balloon:132,bottomy:43
1609  size   2
1610  color  blue
1611  write  You can always
1612         review all the
1613         English words
1614         with HELP.
1615
1616
1617  do     speak(tsay,012)     ££ "You can always review all the English
1618                             ££  words you have learned by simply touching
1619                             ££  the HELP lightbox and then using your
1620                             ££  lightpen to touch VOCABULARY."
1621
1622  do     lightpen(box:4135,uppery:11,ON)
1623
1624  do     flipbox(phelp)
1625
1626  do     debug
1627
1628  ***** SCREEN 50 *****
1629
1630  do     erasefld(balloon)
1631  at     balloon:132,bottomy:43
1632  size   2
1633  color  blue
1634  write  Then use your
```

```
1636              lightpen to
1637              select
1638              Vocabulary.
1639
1640       do     helpmenu(helpx,helpy)
1641
1642       do     screen(050)
1643       do     debug
1644
1645       do     screen(999)
1646
1647
1648       do     lightpen(helpx+10,helpy+264,ON)   $$ point at Vocabulary Review
1649
1650       do     vocab(265,345)                    $$ pop up vocabulary review list
1651
1652       do     debug
1653
1654  ***** SCREEN 51 *****
1655
1656  colors black
1657  erase
1658
1659       do     picture == 'spint'
1660       do     picture(pcr,000,balloonx,balloony)  $$ for debug
1661              boxes
1662
1663       do     screen(051)
1664
1665       do     speak(tsay,013)                   $$ "As your English vocabulary grows"
1666
1667       do     erasefld(balloon)
1668
1669       at     balloonx+16,balloony-57
1670       size   2
1671       color  blue
1672       write  We will begin
1673              using complete
1674              sentences.
1675
1676       do     speak(tsay,014)                   $$ "we will begin using complete sentences"
1677
1678       at     graphx,graphy-75
1679       size   2
1680       color  red
1681       write  You will learn English grammar.
1682
1683       do     speak(tsay,015)                   $$ "and this is how you will learn English
1684                                                $$ grammar."
1685       do     speak(tsay,016)                   $$ "You will hear me speaking English words
1686                                                $$ in the context of sentences"
```

BEST AVAILABLE COPY

```
1687   do           speak(tsay,017)          ** "you will see the English words on your
1688   do           speak(tsay,018)          ** screen in the context of sentences."
1689                                         ** "and you will have the opportunity to
1690   do           speak(tsay,019)          ** speak these sentences and type them
1691                                         ** "and answer questions about them.
1692   do           debug
1693
1694   ***** end of page 7 *****
1695
1696
1697   jumpop       pase0
1698   define       local
1699   helpx        = 325
1700   helpy        = 345
1701   define       end
1702
1703   screen       native
1704   spacing      variable
1705   thick        on
1706
1707   if           debug=TRUE
1708   .            calc         pictnam == 'spint'
1709   .            do           picture(pic,000,balloonx,balloony)
1710   .                         boxes
1711   .            do           speak(tendinit)
1712   .                         filespec
1713   .            pack         filespec,\tesol\spint\ventators
1714   .            do           speak(topen)
1715   endif
1716
1717   ***** SCREEN 52 *****
1718
1719   do           screen(052)
1720
1721   do           ccusefld(balloon)
1722   do           cousefld(graph)
1723
1724   at           balloonx:140,balloony-43
1725   size         2
1726   color        blue
1727   write        You can also
1728                use HELP to
1729                choose ...
1730
1731   do           speak(tsay,020)          ** "You can also always touch HELP with
1732                                         ** you lightpen and then choose Grammar."
1733
1734   do           lightpen(box4133,uppery41,ON)
1735
1736   do           flipbox(phelp)
1737
```

BEST AVAILABLE COPY

```
1738          do      debug
1739
1740   *****  SCREEN 53 *****
1741
1742          do      screen(053)
1743
1744          at      balloonx+40,balloony-127
1745          size    ?
1746          color   blue
1747          write   Grammar
1748
1749          do      helpment(helpx,helpy)
1750
1751          do      debug
1752
1753          do      screen(080)
1754
1755          do      lightpen(helpx+10,helpy-250,ON)    $$ point at Grammar Review
1756
1757          do      Grammar(260,325)                   $$ pop up grammar review list
1758
1759          do      debug
1760
1761   *****  SCREEN 54 *****
1762
1763          colore  black
1764          erase
1765
1766          do      screen(054)
1767
1768          calc    picnam == 'spin1'
1769          do      picture(pcc,000,balloonx,balloony)
1770          do      boxes
1771
1772          at      balloonx+40,balloony-43
1773          size    ?
1774          color   blue
1775          write   Learning
1776                  English will
1777                  be fun and
1778                  challenging.
1779
1780          do      speak(1say,021)         $$ "Learning English will be fun and
1781                                          $$ challenging."
1782          do      speak(1say,022)         $$ "Now"
1783          do      speak(1say,023)         $$ "I believe you are ready to start the
1784                                          $$ lessons."
1785          do      speak(1say,024)         $$ "so I am going to give you a choice."
1786          do      speak(1say,025)         $$ "pick up your lightpen."
1787          do      debug
1788
1789   *****  SCREEN 55 *****
```

BEST AVAILABLE COPY

```
1790              screen(055)
1791      do
1792      do        erasefld(balloon)
1793
1794                balloonx116,balloony-43
1795      at        2
1796      size      blue
1797      color     Touch either
1798      write     "How to use
1799                your keyboard"
1800                or CONTINUE.
1801
1802
1803      do        helpmenu(helpx,helpy)         ## pop up the help menu
1804
1805      do        speak(tsay,026)               ## "and touch either the 'How to use your
1806                                              ## keyboard' box under HELP"
1807      do        speak(tsay,027)               ## "or"
1808      do        speak(tsay,028)               ## "if you already know 'How to use your
1809                                              ## keyboard"
1810      do        speak(tsay,029)               ## "touch the CONTINUE word at the bottom
1811                                              ## of your screen and we will begin our
1812                                              ## first English lesson."
1813      do        speak(tsay,030)               ## "Are you ready?"
1814      do        speak(tsay,031)               ## "Alright"
1815      do        speak(tsay,032)               ## "touch your lightpen to your choice"
1816      do        speak(tsay,033)               ## "NOW"
1817
1818      do        pointer
1819
1820      do        boxchek
1821
1822 ***** Since the helpmenu pointer section is disabled, let's fake it.
1823      calc      helpkey == (helpy - lpy - 32)/14 + 1
1824
1825      if        debug
1826      .         at        25:5
1827      .         size      1
1828      .         color     white
1829      .         write     The chump selected $$$
1830      .         if        boxkey=pcont
1831      .                   write     CONTINUE
1832      .         elseif    helpkey=hlpbook7
1833      .                   write     How to use your keyboard
1834      .         else
1835      .                   write     something else
1836      .         endif
1837      .         do        debug
1838      endif
1839      do        debug
1840
```

BEST AVAILABLE COPY

```
1841       if        hotkey=pcont
1842                 jump      spdir,start
1843       elseif    helpkey=alphakey
1844                 jump      enkey,start
1845       endif
1846
1847
1848       jump      menu,start
1849
1850       ***** end of page 8 *****
1851       receive field
1852
1853       colore    black
1854
1855       if        field = balloon
1856                 colore    whitet
1857                 erase     balloonx+16,balloony-15;balloonx+256,balloony-127
1858                 colore    black
1859       elseif    field = clue
1860                 erase     cluex,cluey;639,answery+1
1861       elseif    field = quest
1862                 erase     questx,questy;questx+256,questy-84
1863       elseif    field = answer
1864                 erase     answerx,answery;answerx+352,answery-112
1865       elseif    field = input
1866                 erase     inputx,inputy;inputx+256,inputy-28
1867       elseif    field = half
1868                 colore    whitet
1869                 erase     balloonx+16,balloony-70;balloonx+256,balloony-127
1870                 colore    black
1871       elseif    field = graph
1872                 erase     graphx,graphy;graphx+graphw,graphy-graphyw
1873       endif
1874       enable    pointer
1875
1876       pause     keys=pointer
1877
1878       if        debug=TRUE
1879                 size      1
1880                 colore    black
1881                 color     whitet
1882                 thick     on
1883                 if        zscreent=0
1884                 .         at        20;20
1885                 .         erase     20
1886                 else
1887                 .         at        25;40
1888                 .         erase     20
1889                 endif
1890
1891                 if        zscreent=0
```

BEST AVAILABLE COPY

```
1892              . else          at       20:20
1893              . . .
1894              . endif
1895              . write         zpx = (s,zpx,3)
1896              . . .
1897
1898              . if            zsystem=0
1899              . . .           at       20:30
1900              . else          at       22:70
1901              . . .
1902              . endif
1903              . write         zpy = (s,zpy,3)
1904       endif
1905
1906       code            lpy == zpy + offsety
1907                       lpx == zpx + offsetx
1908
1909       disable pointer
1910       define local
1911       xloc,2
1912       yloc,2
1913       offset     = 32
1914       cheight    = 14                  ## height of char in dots
1915       nchars     = 4                   ## number of chars in heading
1916       wchars     = 26                  ## number of chars in longest line
1917       nlines     = 10                  ## number of lines in the list
1918       width      = (wchars + 2)*7      ## if thick is on, else ( )*0
1919       height     = nlines*cheight + offset + 6
1920       timelen    = 0.1
1921       tonehz     = 800
1922       define end
1923
1924       receive xloc,yloc
1925       thick on
1926       spacing fixed
1927
1928       colore  front
1929       erase   xloc,yloc;xloc+width,yloc+height
1930       color   blue
1931       box     xloc,yloc;xloc+width,yloc+height;4
1932       size    2
1933       draw    xloc,yloc+offset;xloc+width,yloc+offset
1934       color   red
1935       write   xloc+(width - 13*nchars)/2,yloc+offset + 2
1936              HELP
1937       size    1
1938       color   blue
1939       at
1940       write   xloc+10,yloc-(offset+height)
1941              p Introduction
1942              p How to use your keyboard
1943              ) Alphabet
```

BEST AVAILABLE COPY

```
1943            p Letters
1944            p Words
1945          ) Numbers
1946            p Words
1947            p Symbols
1948            p Words and Numbers time
1949          ), Money
1950            p Telephone
1951          p Names
1952            p Greetings
1953            p This-That
1954            p Past Tense
1955            p Grammar
1956            p Vocabulary
1957          p Don't want help
1958
1959   beeping variable
1960
1961   return                                     ;; disable pointer for now
1962
1963   lmain
1964
1965   do       pointer
1966
1967   calc     helpkey == (yloc - lpy -offset)/cheight + 1
1968
1969   if       debug=TRUE
1970   .        at     25:1
1971   .        erase  40
1972   .        at     25:1
1973   .        write  The man wants helpkey (s,helpkey)
1974   .        return
1975   endif
1976   if       helpkey > nlines or$ helpkey <= 0
1977   .        beep   tonelen,tonehz
1978   .        branch lmain
1979   elseif   helpkey = nlines
1980   .        beep   tonelen,tonehz
1981   .        branch lmain
1982   *.       return
1983   elseif   helpkey = hlpintro
1984   .        beep   tonelen,tonehz
1985   .        branch lmain
1986   .        do     xlocxx
1987   elseif   helpkey = hlphowdy
1988   .        beep   tonelen,tonehz
1989   .        branch lmain
1990   .        do     xlocxx
1991   elseif   helpkey = hlpabdu
1992   .        beep   tonelen,tonehz
1993   .        branch lmain
1994   .        do     xlocxx
1995   elseif   helpkey = hlpalfit
```

BEST AVAILABLE COPY

```
1995  .      beep      tonelen,tonehz
1996  .      branch    1main
1997  .      do        xlocxx
1998  elseif helpkey = hlpalfed
1999  .      beep      tonelen,tonehz
2000  .      branch    1main
2001  .      do        xlocxx
2002  elseif helpkey = hlpnumbr
2003  .      beep      tonelen,tonehz
2004  .      branch    1main
2005  .      do        xlocxx
2006  elseif helpkey = hlppound
2007  .      beep      tonelen,tonehz
2008  .      branch    1main
2009  .      do        xlocxx
2010  elseif helpkey = hlpsymbl
2011  .      beep      tonelen,tonehz
2012  .      branch    1main
2013  .      do        xlocxx
2014  elseif helpkey = hlppungem
2015  .      beep      tonelen,tonehz
2016  .      branch    1main
2017  .      do        xlocxx
2018  elseif helpkey = hlpmoney
2019  .      beep      tonelen,tonehz
2020  .      branch    1main
2021  .      do        xlocxx
2022  elseif helpkey = hlptelep
2023  .      beep      tonelen,tonehz
2024  .      branch    1main
2025  .      do        xlocxx
2026  elseif helpkey = hlpnomeu
2027  .      beep      tonelen,tonehz
2028  .      branch    1main
2029  .      do        xlocxx
2030  elseif helpkey = hlpgreet
2031  .      beep      tonelen,tonehz
2032  .      branch    1main
2033  .      do        xlocxx
2034  elseif helpkey = hlptlth
2035  .      beep      tonelen,tonehz
2036  .      branch    1main
2037  .      do        xlocxx
2038  elseif helpkey = hlppast
2039  .      beep      tonelen,tonehz
2040  .      branch    1main
2041  .      do        xlocxx
2042  elseif helpkey = hlpgram
2043  .      beep      tonelen,tonehz
2044  .      branch    1main
2045  .      do        xlocxx
2046  elseif helpkey = hlpvocab
```

BEST AVAILABLE COPY

```
2047              do           vocab(265,345)
2048              return
2049      endif
2050      define       local
2051      xloc,2
2052      yloc,2
2053      offset    = 35              ;; height of char in dots
2054      cheight   = 14              ;; number of chars in heading
2055      nchars    = 6               ;; number of chars in longest line
2056      wchars    = 26              ;; number of lines in the list
2057      nlines    = 13
2058      width     = (wchars + 2)*7  ;; if thick is on, else ( )*8
2059      height    = nlines*cheight + offset + 6
2060      tonelen   = 0.1
2061      tonehz    = 800
2062      define        end
2063
2064      receive  xloc,yloc
2065      thick    on
2066      spacing  fixed
2067
2068      colors   ( yout
2069      erase    xloc,yloc;xloc+width,yloc-height
2070      color    blue
2071      box      ?
2072      size     xloc,yloc;xloc+offset;xloc+width,yloc-height;4
2073      draw     cell
2074      color    LESSON
2075      at       xloc(width  18#nchars)/2;yloc-offset 1 2
2076      write    1
2077      size     ?
2078      color    blue
2079      at       xloc+8,yloc-(offset 1 +height)
2080      write    ) Alphabet
2081               p Letters
2082               p Words
2083               ) Numbers
2084               p Words
2085               p Symbols
2086               p Words and Numbers Game
2087               p Money
2088               p Telephone
2089               p Names
2090               p Greetings
2091               p This-That
2092               p Past tense
2093
2094      spacing  variable
2095      define   local
2096      xloc,2
2097      yloc,2
```

BEST AVAILABLE COPY

BEST AVAILABLE COPY

```
2149        width      = (nlines + 2)*9        $$ if thick is on, else ( )*8
2150        height     = nlines*cheight ; offset + 6
2151        Lonelen    = 0.1
2152        Lonehz     = 800
2153        define     end
2154
2155        receive    slow,>lot
2156        thick      on
2157        spacing    fixed
2158
2159        color      cyan
2160        color      slot,>loc;xloc+width,>loc+height
2161        color      white
2162        box        slot,>loc+xloc+width,>loc+height;
2163        dline      slot,>loc+offset;xloc+width,>loc+offset
2164        color      red
2165        size       2
2166        at         xloc+(width - 13*charw)/2,>loc + offset + 2
2167        write      GRAMMAR REVIEW
2168        color      blue
2169        size       1
2170        at         xloc+8,>loc + offset + cheight + cheight + 2*cheight)
2171        write      English grammar review appears here
2172
2173        sprm_eng variable
2174        * This is the English version of boxes
2175
2176        define  local
2177        boxnum,1
2178        define  end
2179
2180        screen  native
2181        size    1
2182
2183        nocheck receive
2184        receive boxnum
2185
2186        * This module displays the option boxes at the bottom of the screen
2187        * CONTINUE,PAUSE,REPEAT,HELP,LESSON
2188
2189        if       boxnum=phone
2190        .        do      boxes(fcont)
2191        .        do      boxes(ppause)
2192        .        do      boxes(prepeat)
2193        .        do      boxes(phelp)
2194        .        do      boxes(p_lesson)
2195        elseif   boxnum=cont                  $$ box 1 - CONTINUE - SIGA
2196        .        color    white
2197        .        box      box1,upper,;box1166,lowery;4
2198        .        color    blue
2199        .        box      box152,uppery-2;box1164,lowery+2
```

BEST AVAILABLE COPY

```
2200             at      box1117,texty
2201             color   cyan
2202             write   CONT
2203     elseif                                    ** Box 2 - PAUSE - PAUSA
2204             color   white
2205             box     box2,uppery;box2164,lowery;4
2206             color   green
2207             box
2208             at      box212,uppery-2;box2164,lowery12
2209             box     box2113,texty
2210             color   blue
2211             write   PAUSE
2212     elseif  boxnum=repeat                     ** Box 3 - REPEAT - REPITA
2213             color   white
2214             box     box3,uppery;box3166,lowery;4
2215             color   red+
2216             box
2217             at      box312,uppery-2;box3164,lowery12
2218             box     box219,texty
2219             color   blue
2220             write   REPEAT
2221     elseif  boxnum=help                       ** Box 4 - HELP - AYUDE
2222             color   white
2223             box     box4,uppery;box4166,lowery;4
2224             color   brown+
2225             box
2226             at      box412,uppery-2;box4164,lowery12
2227             box     box2117,texty
2228             color   blue
2229             write   HELP
2230     elseif  boxnum=lesson                     ** Box 5 - LESSON - LECCION
2231             color   white
2232             box     box5,uppery;box5166,lowery;4
2233             color   cyan
2234             box
2235             at      box512,uppery-2;box5164,lowery12
2236             box     box515,texty
2237             color   blue
2238             write   LESSON
2239     endif
2240     color   white+                  **_asset default foreground color
2241     * boxhot returns a value indicating which of the five boxes was selected
2242     * by the last pointer stroke.
2243     if      (any ^ uppery|offsety) tor$ (any ^ lowery|offsety)
2244             boxkey == phone
2245     elseif  (zps ^ box11off;sets $and1$ zps ^ box1166|offsets)
2246             boxkey == print
2247     elseif  (zps ^ box21off;sets $and1$ zps ^ box2166|offsets)
2248             boxkey == pause
2249     elseif  (zps ^ box31off;sets $and1$ zps ^ box3166|offsets)
2250             boxkey == repeat
2251     elseif  (zps ^ box41off;sets $and1$ zps ^ box4166|offsets)
2252             boxkey == help
2253     elseif  (zps ^ box51off;sets $and1$ zps ^ box5166|offsets)
```

```
2252          .end,f       .talc        boxkey == plesson
2253          define       lorat
2254          boxnum_1
2255          define       col
2256
2257          screen       native
2258          size         1
2259          color        white
2260          thick        on
2261
2262
2263          nocheck      receive
2264          receive      boxnum
2265
2266  * This module displays the option boxes at the bottom of the screen
2267  * as does 'boxes' but this does them without color
2268  * CONTINUE,PAUSE,REPEAT,HELP,LESSON
2269  * SIGA    ,PAUSA,REPITA,AYUDE,LECCION
2270
2271          if           boxnum=pcont
2272          .            do           flipbox(pcont)
2273          .            do           flipbox(ppause)
2274          .            do           flipbox(prepeat)
2275          .            do           flipbox(phelp)
2276          .            do           flipbox(plesson)
2277          .            boxnum=pcont                    $$ Box 1 -- CONTINUE - SIGA
2278          .            color        blue
2279          .            box          box1,upper;box1166,lowery;4
2280          .            color        black
2281          .            box          box112,uppery-2;box1464,lowery+2
2282          .            at           box1117,texty
2283          .            color        white
2284          .            write        CONT
2285          elseif       boxnum=ppause                   $$ Box 2 -- PAUSE - PAUSA
2286          .            color        green
2287          .            box          box2,uppery;box2166,lowery;4
2288          .            color        black
2289          .            box          box212,uppery-2;box2464,lowery+2
2290          .            at           box2213,texty
2291          .            color        white
2292          .            write        PAUSE
2293          elseif       boxnum=prepeat                  $$ Box 3 -- REPEAT - REPITA
2294          .            color        red
2295          .            box          box3,uppery;box3166,lowery;4
2296          .            color        black
2297          .            box          box312,uppery-2;box3464,lowery+2
2298          .            at           box3319,texty
2299          .            color        white
2300          .            write        REPEAT
2301          elseif       boxnum=phelp                    $$ Box 4 -- HELP - AYUDE
2302          .            color        brown
```

```
2303            box         box:4,uppery;box:156,lowery;4
2304            color       black
2305            box         box:12,uppery-2;box:154,lowery;5
2306      .     at          box:11,lowery
2307            color       white
2308    elseif  bognoun.plesson            1t Box 5 - LESSON - LESSION
2309            color       cyan
2310            box         box:5,uppery;box:166,lowery;4
2311            color       black
2312            box         box:12,uppery-2;box:164,lowery;5
2313            box
2314      .     at          box:15,lesly
2315            color       white
2316            write       LESSION
2317    endif
2318
2319    color   define      white-0       44 reset default foreground color
2320    define  local
2321    4,2
2322    y,2
2323    slate,1
2324    define  end
2325
2326    thick   on
2327
2328    receive x,y,slate
2329
2330    if      slate=on
2331    .       color       cyan
2332    .       draw        x,y;x,y115;x-33,y165;x-46,y175;x-46,y150; 13,y110;x,y
2333                        ;x-13,y115;x,y115;x,y155;x-46,y165;x-25,y165;x-30,y175
2334    elseif  slate=off
2335    .       color       black
2336    .       draw        x,y;x,y115;x,y165;x-46,y175;x-46,y160;x-13,y110;x,y
2337                        ;x-13,y110;x,y115;x,y155;x-46,y160;x-33,y160;x-46,y175;x-30,y175
2338    endif
2339    * correct displays the happy face and words in balloon
2340
2341    spacing variable
2342
2343    do      erasefld(clue)
2344
2345    color   blue
2346    size    2
2347      .     at          balloonx149,balloony-71
2348            write       Your answer
2349                        is correct!
2350
2351    code    pitlnum == 'right'
2352    do      pitlure(pos,006,clues,cluey-30)
```

BEST AVAILABLE COPY

```
2354   *enable  pointer
2355   *lloop
2356   *pause   keys=pointer
2357   *
2358   *do      boxchek
2359   *if      hotkey=phelp
2360   *.       size    1
2361   *.       at      25;40
2362   *.       write   Select continue
2363   *.       branch  lloop
2364   *.       hotkey / pcont
2365   *sheet   branch  lloop
2366   *.
2367   *endif
2368   *
2369   *       1
2370   *at     25;40
2371   *erase  20              ;; get rid of help message
2372
2373   do     debug
2374
2375   do     erasefld(clue)
2376   do     erasefld(balloon)
2377   * subface displays the unhappy face and words in balloon
2378   spacing variable
2379
2380   do     erasefld(clue)
2381
2382   color  blue
2383   size   2
2384   at     balloon140,balloony-71
2385   write  Your answer
2386          is wrong!
2387
2388   calc   picloam == 'sad'
2389   do     picture(pcc,000,cluex,cluey-36)
2390
2391   *enable pointer
2392   *lloop
2393   *pause  keys=pointer
2394   *
2395   *do     boxchek
2396   *if     hotkey=phelp
2397   *.      size    1
2398   *.      at      25;40
2399   *.      write   Select continue
2400   *.      branch  lloop
2401   *.      hotkey / pcont
2402   *sheet  branch  lloop
2403   *.
2404   *endif
```

BEST AVAILABLE COPY

BEST AVAILABLE COPY

```
2456         beep    leng,500
2457         beep    leng,800
2458         beep    leng,500
2459         beep    leng,800
2460         beep    leng,500
2461         beep    leng,800
2462         beep
2463         return
2464  endif
2465  size
2466     dl
2467     write
2468     writeln
2469            1
2470            2521
2471            TENSPEAK error (s,nl) $$
2472            dlff;
2473            Invalid function number;
2474            File not found;
2475            Path not found;
2476            Too many files open;
2477            Access denied;
2478            Invalid handle;
2479
2480            Memory control blocks destroyed;
2481            Insufficient memory;
2482            Invalid memory block address;
2483            Invalid environment;
2484            Invalid format;
2485            Invalid access code;
2486            Invalid data;
2487            Not defined;
2488            Invalid drive was specified;
2489            Attempt to remove current directory;
2490            Not same device;
2491            No more files;
2492            Illegal input file specification;
2493            Illegal index file;
2494            Illegal command number requested;
2495            Archive file is already open;
2496            Index too big for buffer;
2497            Entry number is out of range;
2498            No speech in buffer;
2499            Name did not match current archive;
2500            No archive open;
2501            VPLK timeout (hardware failure);
2502            Speech buffer overflow (warning);
2503            Bad vcx file format;
2504            Illegal error returned by TENSPEAK - (show,nl)
2505            command is *ltf
2506     write  command:{Lommand;Input;Input;bay;tclose;tread;tspeak;tloud;trecord;tleave
2507     write  yellow
2508     nl     23,76
2509     write  out
2510     out    beep_nest
```

BEST AVAILABLE COPY

BEST AVAILABLE COPY

```
2558        screen   native
2559
2560        nocheck  receive
2561        receive  type,picnumbr,alrcaly
2562
2563        pack:    type;picname(1);piclen;
2564                 \tesol\sprintX(a,picknum)(t,picnumbr,3).pcx;
2565                 \tesol\sprintX(a,picknum)(t,picnumbr,3).pcc
2566
2567
2568        loop     index = 1,32
2569           if           picname(index) = h20
2570              .         calc  picname(index) = h30
2571           endif
2572           if           picname(index) = h0d
2573              .         calc  picname(index) = 0
2574           endif
2575
2576        endloop
2577
2578        *loop    index = 1,32
2579        *.      shown  picname(index)
2580        *outloop picname(index:1) = 0
2581        *endloop
2582
2583        if      type = pcc
2584           .    alrcaly
2585        endif
2586
2587        device  picture,plot,picname(1),piclen
2588        if
2589           .    zreturn / -;
2590           .    size  {
2591           .    at    2538
2592           .    write  Picture plotting error!!  $$$
2593           writec zreturn;
2594                  "picture.exe" not loaded;
2595                  Invalid function code;
2596                  DOS version < 2?;
2597                  Can't open file;
2598                  Not enough memory?;
2599                  Can't read file;
2600                  No image stored;
2601                  Wrong display type
2602           .     zreturn=3 for zreturn=5
2603           .     write  "$$$
2604           .     loop   index = 1,32
2605           .             shown  picname(index)
2606           .     outloop picname(index:1) = 0
2607           .     endloop
2608           .     write  "FB1
```

```
2607           .          endif
2608           .          pause   keysnext
2609           .          exitsys
2610           endif
2611           define  local
2612           screen,2
2613           define  end
2614
2615           if         debug = FALSE
2616           .          return
2617           endif
2618
2619           spacing fixed
2620
2621           receive screen
2622
2623           size    1
2624           colore  white
2625           color   blue
2626           at      1:36
2627           erase   15
2628           at      1:36
2629           write   @@SCREEN (b,screen)@@
2630           spacing variable
2631           colore  black
2632           if         debug = FALSE
2633           .          return
2634           endif
2635
2636
2637           size    1
2638           colore  white
2639           at      1:73
2640           erase   7
2641           color   blue
2642           at      1:73
2643           write   @@USER*$$$
2644
2645           pause   keys-next,space
2646
2647           colore  black
2648           at      1:73
2649           erase   7
2650           at      1:36
2651           erase   15
2652           define  local
2653           ii,2
2654           proglen = 17
2655           numlock(proglen),1
2656           define  end
2657
```

```
2658   loop    ii == 1,proglen
2659           tales   ii-2,numlock(ii) ==
2660                   hte,            $$ push ds
2661                   h068,00,00,     $$ mov ax,0000
2662                   h8e,h0d8,       $$ mov ds,ax
2663                   h06h,h17,h0A,   $$ mov bx,417H
2664                   h8a,h07,        $$ mov al,[bx]
2665                   h24,h0dF,       $$ and al,0dFH
2666                   h88,h07,        $$ mov [bx],al
2667                   h1F,            $$ pop ds
2668                   h0cb            $$ retf
2669           endloop
2670   asmcall numlock(1)
2671
```

| | | | | | | |
|---|---|---|---|---|---|---|
| boxcheck | 2238 | boxes | 2174 | correct | 2339 | debug | 2633 |
| defines | 1 | erasefld | 1051 | flipbox | 2254 | grammar | 2141 |
| helpmenu | 1910 | lessmenu | 2030 | lightpen | 2320 | numlock | 2652 |
| page2 | 393 | page3 | 640 | page4 | 811 | page5 | 909 |
| page6 | 1291 | page7 | 1519 | page8 | 1698 | picture | 2550 |
| pointer | 1074 | sndface | 2376 | screen | 2411 | speak | 2418 |
| start | 120 | tenload | 2516 | vocab | 2095 | | |

APPENDIX B

Microsoft (R) Macro Assembler Version 4.00                4/20/87 09:26:24

TENSPEAK.ASM Hooks to TENCORE language for VoxCard                Page  1-1

```
                PAGE ,132
                TITLE TENSPEAK.ASM Hooks to TENCORE language for VoxCard   04-MAR-87
;*****************************************
;*** tenspeak.osm ***
;*****************************************
                NAME tenspeak ;adapted from tspeak.osm of 09-JAN-87
;v2.1   modified on 07-APR-87 to fix speak_rec command
;v2.2   modified on 09-APR-87 to add trecord, tsave, tload commands
;v2.3   fixed on 10-APR-87 jle bug in num_check & handle 80 file txs
;v2.4   fix on 10-APR-87, name_check to allow path names
```

```
;Copyright INTECHNICA LEARNING SYSTEMS, Inc. 1987, 1988

;TENSPEAK COMMANDS

;teninit
 al=0                              initialize TENSPEAK

;topen
 al=1, bx=OFFSET filespec.tfl      open,read,close .tix & open .tfl
 returns; cx = number of entries ;tsay
 al=2, ah=entry n                  read and speak entry n of .tfl ;tclose
 al=3, bx=OFFSET filespec.tfl      close .tfl ;tread
 al=4, ah=entry n, bx=OFFSET filespec.tfl   read only entry n of .tfl ;tspeak
 al=5                              speak the contents of previously loaded speech ;tload
 al=6, bx=OFFSET filespec.rec      speak file filename.rec ;trecord
 al=7                              record speech into buffer
                                   NOTE: any key stops the recording ;tsave
 al=8, bx=OFFSET filespec          save speech buffer in a file ;errors are returned in al (0 = no error)

;DOS errors
;error  1 - Invalid function number
;error  2 - File not found
;error  3 - Path not found
;error  4 - Too many files open
;error  5 - Access Denied
;error  6 - Invalid handle
;error  7 - Memory control blocks destroyed
;error  8 - Insufficient memory
;error  9 - Invalid memory block address
;error 10 - Invalid environment
;error 11 - Invalid format
;error 12 - Invalid access code
;error 13 - Invalid data
;error 14 - Not defined
;error 15 - Invalid drive was specified
;error 16 - Attempted to remove current directory
```

```
;error 17 - Not some device
;error 18 - No more files
;LOCAL errors
;error 19 - Illegal input file spec
;error 20 - Illegal index file
;error 21 - Illegal command number requested
;error 22 - archive file is already open
;error 23 - index too big for buffer
;error 24 - Entry number requested is out of range
;error 25 - No speech in buffer
;error 26 - Input filespec did not match current archive name
;error 27 - No archive open (tsay w/o topen)
;error 28 - VCLK timeout (serious hardware failure
;error 29 - speech buffer overflow before switch depressed
;error 30 - bad rec file format ;Calling TENSPEAK under TENCORE
;tenspeak,8
;      ah,1
;      al,1
;      bx,2
;filespec,45

;pack    filespec,c:\tencore\tesol\talk\spint000
;calc    bx <= varloc(filespec)

;calc    al <= command 0 to 8
;intcall h70,tenspeak,tenspeak
;jump    al;;;tenerror ;now allows input file specs of the following form:
;{drive:}\directory1\directory2\directory3\filenamef.ext},[space,CR,0]
MAX_SPEC          EQU    40          ;max length of filespec less ext + 1
MAX_TIX           EQU    80          ;allow max of 80 tix entries
SIZE_OF_TIX_ENTRY EQU    12
TIX_BUFLEN        EQU    MAX_TIX*SIZE_OF_TIX_ENTRY
SIZE_OF_ENTRY_HEADER EQU 11

VDX_PORT          EQU    380H                                        ; 0380
BYTE_SIZE         EQU    8                                           ; 0008
SAMPLE_SIZE       EQU    4                                           ; 0004

VMASK             EQU    80H                                         ; 0080
RESET_CMD         EQU    0C0H                                        ; 00C0
PLAY_CMD          EQU    00H                                         ; 0000
REC_CMD           EQU    080H                                        ; 0080
BUFFER_SIZE       EQU    0FFF0H                                      ; FFF0
IRMSTAT           EQU    60H                                         ; 0060
IBMMASK           EQU    60H                                         ; 0060

;MS-DOS FUNCTIONS CALLS
```

```
= 3C00                          FCREATE   EQU    3C00H
= 3D00                          FOPEN     EQU    3D00H
= 3E00                          FCLOSE    EQU    3E00H
= 3F00                          FREAD     EQU    3F00H
= 4000                          FWRITE    EQU    4000H
= 4200                          LSEEK     EQU    4200H

= 000D                          CR        EQU    0DH
= 000A                          LF        EQU    0AH 0000                           code      SEGMENT byte public 'CODE'
                                          ASSUME cs:code,ds:data 0000                           init_tenspeak   PROC   NEAR 0000  0C C5                              mov    bp,es              ;save es
 0002  B0 70                              mov    al,70h             ;get address of interrupt vector 70h
 0004  B4 35                              mov    ah,35h
 0006  CD 21                              int    21h                ;es:bx = seg:off of int 70h 0008  0E                                 push   cs
 0009  1F                                 pop    ds
 000A  8B FB                              mov    di,bx
 000C  BE 00A0 R                          mov    si,OFFSET int_handler
 000F  FC                                 cld
 0010  B9 000A                            mov    cx,10
 0013  F3/ A6                             rep    cmpsb
 0015  75 0D                              jnz    not_loaded 0017  BA 0066 R                          mov    dx,OFFSET already_string
 001A  B4 09                              mov    ah,09h
 001C  CD 21                              int    21h
 001E  B0 01                              mov    al,01
 0020  B4 4C                              mov    ah,4Ch             ;exit with return code = 1
 0022  CD 21                              int    21h 0024                           not_loaded:
 0024  BA 25                              mov    ah,25h             ;setup new handler at int 70h
 0026  B0 70                              mov    al,70h
 0028  BA 00A0 R                          mov    dx,OFFSET int_handler
 002B  CD 21                              int    21h 002D  BA 00B2 R                          mov    dx,OFFSET signon_string
 0030  B4 09                              mov    ah,09h
 0032  CD 21                              int    21h 0034  BB ---- R                          mov    ax,data
 0037  8E D8                              mov    ds,ax
 0037  C7 06 0000 R 0000                  mov    filespec_ptr,0000
 003F  C7 06 00B2 R 0000                  mov    length_of_speech,0000
```

```
0045  C7 06 0091 R 00FF            mov     tfl_handle,0FFH         ;in case teninit called before topen
0048  B1 04                         mov     cl,4
004D  BA 0476 R                     mov     dx,OFFSET prog_end
0050  D3 EA                         shr     dx,cl
0052  42                            inc     dx                      ;bump to next para
0053  B1 C2 ---- R                  add     dx,data
0057  B9 16 00B4 R                  mov     buffer_segment,dx
005B  2B D5                         sub     dx,bp                   ;bp=es
005D  B1 C2 1000                    add     dx,bp                   ;64K speech buffer  ;save address of 64K speech buffer
0061  B8 3100                       mov     ax,3100h                ;terminate and remain resident
0064  CD 21                         int     21h 0066  0D 0A 54 45 4E 53 50          already_string DB CR,LF,'TENSPEAK ALREADY LOADED',CR,LF,'$'
      45 41 4B 20 41 4C 52
      45 41 44 59 20 4C 4F
      41 41 44 45 44 0A 24
0082  0D 0A 54 45 4E 53 50          signon_string  DB CR,LF,'TENSPEAK, V2.4 NOW LOADED',CR,LF,'$'
      45 41 4B 2C 20 56 32
      2E 34 20 4E 4F 57 20
      4C 4F 41 44 45 44 0D
      0A 24 init_tenspeak   ENDP int_handler     PROC    FAR
00A0  FB                                    sti
00A1  50                                    push    ax      ;ax = [bp+16]
00A2  53                                    push    bx      ;bx = [bp+14]
00A3  51                                    push    cx      ;cx = [bp+12]
00A4  52                                    push    dx      ;dx = [bp+10]
00A5  56                                    push    si      ;si = [bp+08]
00A6  57                                    push    di      ;di = [bp+06]
00A7  55                                    push    bp      ;bp = [bp+04]
00A8  1E                                    push    ds      ;ds = [bp+02]
00A9  06                                    push    es      ;es = [bp+00]
00AA  8B EC                                 mov     bp,sp
00AC  B8 ---- R                             mov     ax,data
00AF  8E D8                                 mov     ds,ax 00B1  0B 46 10                              mov     ax,[bp+16]              ;get input command
00B4  3C 00                                 cmp     al,00
00B6  75 03                                 jnz     not_00
00B8  EB 4E 90                              jmp     teninit not_00:
00BB  3C 01                                 cmp     al,01
00BD  75 03                                 jnz     not_01
00BF  EB 6A 90                              jmp     topen
```

```
                        not_01:
00C2    3C 02                   cmp     al,02
00C2    75 03                   jnz     not_02
00C4    E9 0253 R               jmp     tsay not_02:
00C7    3C 03                   cmp     al,03
00C9    75 03                   jnz     not_03
00CB    E9 0230 R               jmp     tclose not_03:
00D0    3C 04                   cmp     al,04
00D0    75 03                   jnz     not_04
00D2    E9 0101 R               jmp     tread not_04:
00D7    3C 05                   cmp     al,05
00D7    75 03                   jnz     not_05
00D9    E9 0269 R               jmp     tspeak not_05:
00DE    3C 06                   cmp     al,06
00DE    75 03                   jnz     not_06
00E2    E9 02F3 R               jmp     tload not_06:
00E5    3C 07                   cmp     al,07
00E7    75 03                   jnz     not_07
                                jmp     trecord not_07:
00EC    3C 08                   cmp     al,08
00EE    75 03                   jnz     not_08
00F0    E9 042B R               jmp     tsave not_08:
00F3    B8 0015                 mov     ax,21           ;"illegal function requested"
00F6    EB 03                   jmp     SHORT error_exit normal_exit:
00F8    B8 0000                 mov     ax,0000         ;no error exit point
                        error_exit:
00FB    89 46 10                mov     [bp+16],ax      ;put error return on the stack
00FE    07                      pop     es
00FF    1F                      pop     ds
0100    5D                      pop     bp
0101    5F                      pop     di
0102    5E                      pop     si
0103    5A                      pop     dx
0104    59                      pop     cx
0105    5B                      pop     bx
```

BEST AVAILABLE COPY

```
0104  50                          pop     ax
0107  CF                          iret int_handler    ENDP ;TENSPEAK initialization routine
                                  ;       mov     al,0
                                  ;       int     70

0108                              teninit PROC    NEAR

0108  C7 06 0000 R 0000           mov     filespec_ptr,0000
010E  C7 06 0002 R 0000           mov     filespec_seg,0000
0114  8B 1E 0091 R                mov     bx,tfl_handle
0118  3E00                        mov     ax,FCLOSE
011B  CD 21                       int     21h
011D  C7 06 0091 R 00FF           mov     tfl_handle,0FFH      ;just in case
0123  EB D3                       jmp     normal_exit teninit ENDP ;topen - opens filespec.tix, fills the tix_buffer and opens the filespec.tfl
                                  ;       mov     al,1
                                  ;       mov     bx,OFFSET asciz_filespec
                                  ;       int     70

0125                              topen   PROC    NEAR 0125  83 3E 0000 R 00             cmp     filespec_ptr,0000
012A  74 05                       jz      not_occupied
012C  B8 0016                     mov     ax,22                ;tix buffer already occupied
012F  EB CA                       jmp     error_exit not_occupied:
0131  E8 0494 R                   call    create_names         ;create tix & tfl names
0134  BA 0065 R                   mov     dx,OFFSET name_tix
0137  B8 3D00                     mov     ax,FOPEN
013A  CD 21                       int     21h
013C  A3 0093 R                   mov     tix_handle,ax
013F  73 02                       jnc     open_tix_ok
0141  EB B8                       jmp     error_exit open_tix_ok:
0143  8B 1E 0093 R                mov     bx,tix_handle
0147  B8 4200                     mov     ax,LSEEK
014A  B0 02                       mov     al,2                 ;method 2
014C  33 C9                       xor     cx,cx
014E  33 D2                       xor     dx,dx
0150  CD 21                       int     21h
0152  73 02                       jnc     tix_seek_ok
```

```
0154  EB A5                          jmp     error_exit tix_seek_ok:
0156  03 F9 00                       cmp     cx,0000
0159  74 05                          jz      not_too_big
015B  B8 0017                        mov     ax,23           ;tix file too big for buffer
015E  EB 9B                          jmp     error_exit not_too_big:
0160  81 FA 03C0                     cmp     dx,TIX_BUFLEN
0164  7E 05                          jle     not_so_big
0166  B8 0017                        mov     ax,23           ;tix file too big for buffer
0169  EB 90                          jmp     error_exit not_so_big:
016B  8B 1E 0093 R                   mov     bx,tix_handle   ;re-position at beginning of file
016F  B8 4200                        mov     ax,LSEEK
0172  33 C9                          xor     cx,cx
0174  33 D2                          xor     dx,dx
0176  CD 21                          int     21h
0178  73 03                          jnc     re_seek_ok
017A  E9 00FB R                      jmp     error_exit re_seek_ok:
017D  8D 16 00D6 R                   lea     dx,tix_buffer
0181  B9 03C0                        mov     cx,TIX_BUFLEN
0184  B8 3F00                        mov     ax,FREAD
0187  CD 21                          int     21h
0189  73 03                          jnc     read_tix_ok
018B  E9 00FB R                      jmp     error_exit read_tix_ok:
018E  A3 00A3 R                      mov     tix_length,ax
0191  8B 1E 0093 R                   mov     bx,tix_handle
0195  B8 3E00                        mov     ax,FCLOSE
0198  CD 21                          int     21h
019A  C7 06 0093 R 00FF              mov     tix_handle,0FFH ;just in case ;number of entries = tix_length/12
01A0  BA 0000                        mov     dx,0            ;clear high dividend
01A3  A1 00A3 R                      mov     ax,tix_length
01A6  B9 000C                        mov     cx,12
01A9  F7 F1                          div     cx ;if dx (remainder) != 0, then error
01AB  03 FA 00                       cmp     dx,0000
01AE  74 06                          jz      legal_tix
01B0  B8 0014                        mov     ax,20           ;"Illegal tix file"
01B3  E9 00FB R                      jmp     error_exit
```

```
                    legal_tix:
01B6  A2 00A5 R              mov     number_of_entries,al
01B9  32 E4                  xor     ah,ah
01BB  09 46 0C               mov     [bp+12h],ax     ;return number_of_entries in cx register
01BE  BA 0039 R              mov     dx,OFFSET name_tfl 01C1  B8 3D00                mov     ax,FOPEN
01C4  CD 21                  int     21h
01C6  A3 0091 R              mov     tfl_handle,ax
01C9  73 03                  jnc     open_tfl_ok
01CB  E9 00FB R              jmp     error_exit open_tfl_ok:
01CE  E9 00F8 R              jmp     normal_exit ;topen    ENDP ;tread reads entry n into buffer without saying it. The filespec is checked
                    ;to make sure it matches the currently open tfl file.

mov     al,4
                            mov     ah,entry_number
                            mov     bx,OFFSET osciz_filespec
                            int     70 tread   PROC    NEAR

01D1  E8 055A R              call    num_check       ;is entry_num in range?
01D4  E8 056F R              call    name_check      ;does filespec match?
01D7  E8 01D1 R              call    read_only
01DA  E9 00F8 R              jmp     normal_exit tread   ENDP read_only       PROC    NEAR 01DD                        mov     al,SIZE_OF_TIX_ENTRY    ;fetch offset to talk entry into dx:ix
01DF  F6 2E 00A6 R          imul    entry_num
01E3  8D 1E 00B6 R          lea     bx,tix_buffer
01E7  03 D8                 add     bx,ax
01E9  8B 4F 08              mov     cx,[bx+08]              ;offset high
01EC  8B 57 0A              mov     dx,[bx+10]              ;offset low
01EF  8B 1E 0091 R          mov     bx,tfl_handle
01F3  B8 4200               mov     ax,LSEEK
01F6  CD 21                 int     21h
01F8  73 04                 jnc     seek_ok
01FA  5B                    pop     bx                      ;get rid of return address off stack
01FB  E9 00FB R             jmp     error_exit seek_ok:
01FE  BA 00A7 R             mov     dx,OFFSET entry_header
```

```
0201  B9 000D            mov     cx,SIZE_OF_ENTRY_HEADER
0204  BB 1E 0091 R       mov     bx,tfl_handle
0208  BA 3F00            mov     ax,FREAD
020B  CD 21              int     21h
020D  73 04              jnc     read_tfl_ok
020F  5B                 pop     bx
0210  E9 00FB R          jmp     error_exit read_tfl_ok:
0213  BB 0E 00AB R       mov     cx,length_of_record
0217  FB                 clc
0218  83 E8 0B           sub     cx,SIZE_OF_ENTRY_HEADER
021B  BA 0000            mov     dx,0000             ;speech buffer offset
021E  BB 1E 0091 R       mov     bx,tfl_handle
0222  1E                 push    ds
0223  A1 00B4 R          mov     ax,buffer_segment
0226  8E D8              mov     ds,ax
0228  B8 3F00            mov     ax,FREAD
022B  CD 21              int     21h
022D  1F                 pop     ds
022E  73 04              jnc     read_rest_ok
0230  5B                 pop     bx
0231  E9 00FB R          jmp     error_exit read_rest_ok:
0234  A3 00B2 R          mov     length_of_speech,ax
0237  C3                 ret read_only  ENDP ;tclose filespec - closes current .tfl file. Filespec is checked against
                  ;currently open .tfl file.

mov    al,3
                         mov    bx,OFFSET asciz_filespec
                         int    70

023A              tclose PROC   NEAR

023A  E8 056F R          call   name_check
023D  BB 1E 0091 R       mov    bx,tfl_handle
0241  B8 3E00            mov    ax,FCLOSE
0244  CD 21              int    21h
0246  C7 06 0000 R 0000  mov    filespec_ptr,0000   ;make handle illegal so any further
024A  C7 06 0091 R 00FF  mov    tfl_handle,0FFH     ;attempt to close handle will fail.
0250  E9 00FB R          jmp    normal_exit tclose ENDP ;tsay n - read and say talk entry without filespec checking
```

```
                                mov     al,2
                                mov     ah,entry n
                                int     70

;This is short hand for:
                        ;                        mov     al,4
                        ;                        mov     ah,entry n
                        ;                        mov     bx,OFFSET asciz_filespec
                        ;                        int     70
                        ;                        mov     al,5
                        ;                        int     70 tsay    PROC    NEAR 0253   83 3E 0000 R 00          cmp     filespec_ptr,0000
0258   75 06                    jnz     tsay_ok
025A   B4 27                    mov     ah,27           ;"No archive open (tsay w/o topen)
025D   E9 00FD R                jmp     error_exit tsay_ok:
0260   E8 055A R                call    num_check       ;check for legal entry number
0263   E8 01D0 R                call    read_only       ;read talk entry into buffer
0266   EB 01 90                 jmp     tspeak          ;say it tsay    ENDP ;tspeak speaks a previously loaded speech entry.
                        ;       mov     al,5
                        ;       int     70h tspeak  PROC    NEAR 0269   A1 0002 R                mov     ax,length_of_speech
026C   3D 0000                  cmp     ax,0000         ;if this is 0, then no message resides in the
                                                        ;buffer and we better not try to speak garbage.
026F   75 04                    jnz     buffer_occupied
0271   B8 0019 R                mov     ax,25           ;"No message in buffer"
0274   E9 00FD R                jmp     error_exit buffer_occupied:
0277   BB 0000                  mov     bx,0000         ;offset to play buffer
027A   BA 03D0                  mov     dx,VOX_PORT     ; set dx for port address
027D   BE 0004                  mov     si,SAMPLE_SIZE  ; set si to bits per sample
0280   8E 06 00DA R             mov     es,buffer_segment
0284   FA                       cli                     ; disable interrupts ; activate play mode 0285   2B C9                    sub     cx, cx          ; set cx to count down to zero
```

```
                        pclkloO:
02B7    41                      inc     cx                      ; cnt for time out if no v clk
02B8    74 62                   jz      epArtn                  ; when count rolls to 0 quit rtn error
02BA    EC                      in      al,dx                   ; input status from vox card
02BB    A8 80                   test    al,VMASK                ; test vclock bit
02BD    74 FB                   jz      pclkloO                 ; loop while vclk low
02BF    2B C9                   sub     cx,cx                   ; set cx to count down to zero
02C1                    pclkhiO:
02C1    41                      inc     cx                      ; cnt for time out if no v clk
02C2    74 50                   jz      epArtn                  ; when count rolls to 0 quit rtn error
02C4    EC                      in      al,dx                   ; input status from vox card
02C5    A8 80                   test    al,VMASK                ; test vclock bit
02C7    75 FB                   jnz     pclkhiO                 ; loop while vclk high
02C9    B0 00                   mov     al,PLAY_CMD             ; command to make vox card play
02CB    EE                      out     dx,al                   ; output to vox card
02CC                    pclklo1:
02CC    EC                      in      al,dx                   ; input status from vox card
02CD    A8 80                   test    al,VMASK                ; test vclock bit
02CF    74 FB                   jz      pclklo1                 ; loop while vclk low ; start of play 02A1    26: 8A 27               mov     ah,BYTE PTR es:[bx]     ; get first byte of data
02A4    43                      inc     bx                      ; point at next byte
02A5    BF 0008                 mov     di,BYTE_SIZE            ; set bits in byte
02A8    8B 0E 00D2 R            mov     cx,length_of_speech     ; set cx to length of buffer
02AC    49                      dec     cx                      ; reduce buffer size
02AD    EB 1B 90                jmp     plyshift                ; start play at plyshift
02B0                    plyloop:
02B0    D0 E8                   shr     al,1                    ; aline word for output
02B2    D0 E8                   shr     al,1                    ; shift right 1 bit shift in 0
02B4    D0 E8                   shr     al,1
02B6    BE 0004                 shr     al,1                    ; ok for 4 or 3 bit data
                                mov     si,SAMPLE_SIZE          ; reset sample counter
02B9    50                      push    ax                      ; save value in al
02BC                    pclkhi2:
02BC    EC                      in      al,dx                   ; loop while vclk high
02BD    A8 80                   test    al,VMASK
02BF    75 FB                   jnz     pclkhi2
02C1                    pclklo2:
02C1    EC                      in      al,dx                   ; loop while vclk low
02C2    A8 80                   test    al,VMASK
02C4    74 FB                   jz      pclklo2

; valid for output

02C6    58                      pop     ax                      ; get valid data from stack
02C7    0C 00                   or      al,PLAY_CMD             ; output to vox card
02C9    EE                      out     dx,al
02CA                    plyshift:
02CA    D0 DC                   rcr     ah,1                    ; rotate data into carry bit
```

```
                                        rcr     al,1            ; rotate carry into al
02CC  D0 D8                             dec     di              ; reduce bits remaining per byte
02CE  4F                                jz      loaddata        ; if no more bits load byte
02CF  74 05                             dec     si              ; reduce bits per sample
02D1  4E                                jz      plyloop         ; if end play sample
02D2  74 DC                             jmp     plyshift
02D4  EB F4 loaddata:
02D6  26: BA 27                         mov     ah,BYTE PTR es:[bx] ; load data byte & test buffer length
02D9  43                                inc     bx              ; point to next byte
02DA  BF 0008                           mov     di,BYTE_SIZE    ; reset bits remaining per byte
02DD  49                                dec     cx              ; reduce buffer size
02DE  74 05                             jz      endply          ; if more data continue
02E0  4E                                dec     si
02E1  74 CD                             jz      plyloop
02E3  EB E5                             jmp     plyshift endply:
02E5  FB                                sti                     ; end of play
02E6  E8 03F6 R                         call    init_vox        ; enable interrupts
02E9  E9 00F8 R                         jmp     normal_exit     ; all done ep4rtn:
02EC  FB                                sti                     ; return with error,
02ED  B8 001C                           mov     ax,28           ; enable interrupts
02F0  E9 00FB R                         jmp     error_exit      ; VCLK timeout
                                                                ; all done tspeak  ENDP ;tload - reads and speaks individual .rec file
                                ;
                                ;       mov     al,6
                                ;       mov     bx,OFFSET filename.rec
                                ;       int     70 tload   PROC    NEAR
02F3  E8 04CF R                         call    create_rec_name ; process incoming *.rec filename
02F6  BA 000D R                         mov     dx,OFFSET name_rec
02F9  B8 3D00                           mov     ax,FOPEN
02FC  CD 21                             int     21h
02FE  73 09                             jnc     open_rec_ok
0300  C7 06 0095 R 00FF                 mov     rec_handle,0FFH
0306  E9 00FB R                         jmp     error_exit open_rec_ok:
0309  A3 0095 R                         mov     rec_handle,ax
030C  8B D8                             mov     bx,ax
030E  BA 00A7 R                         mov     dx,OFFSET entry_header
0311  B9 000B                           mov     cx,SIZE_OF_ENTRY_HEADER
0314  B8 3F00                           mov     ax,FREAD
0317  CD 21                             int     21h
```

```
0319  73 03              jnc     read_rec_ok
031B  E9 00FB R          jmp     error_exit 031E              read_rec_ok:
031E  3D 000B            cmp     ax,SIZE_OF_ENTRY_HEADER
0321  72 07              jb      bad_vox_file
0323  80 3E 00A7 R FF    cmp     BYTE PTR entry_header,0ffh  ;first byte better be 0ffh
0328  74 06              jz      vox_file_ok 032A              bad_vox_file:
032A  B0 001E            mov     ax,30                        ;"Bad vox file format"
032D  E9 00FB R          jmp     error_exit 0330              vox_file_ok:
0330  8B 0E 00AB R       mov     cx,length_of_record
0334  F8                 clc
0335  E9 0B              sub     cx,SIZE_OF_ENTRY_HEADER
0338  BA 0000            mov     dx,0000                      ;speech buffer offset
033B  8B 1E 0095 R       mov     bx,rec_handle
033F  1E                 push    ds
0340  A1 00A4 R          mov     ax,buffer_segment
0343  8E D8              mov     ds,ax
0345  B8 3F00            mov     ax,FREAD
0348  CD 21              int     21h
034A  1F                 pop     ds
034B  73 03              jnc     rec_rest_ok
034D  E9 00FB R          jmp     error_exit 0350              rec_rest_ok:
0350  A3 00B2 R          mov     length_of_speech,ax
0353  8B 1E 0095 R       mov     bx,rec_handle
0357  B8 3E00            mov     ax,FCLOSE
035A  CD 21              int     21h
035C  73 03              jnc     rec_close_ok
035E  E9 00FB R          jmp     error_exit 0361              rec_close_ok:
0361  E9 0269 R          jmp     tspeak tloud   ENDP ;trecord records speech into the speech buffer
;
;       mov     al,7
;       int     70h
;
;the keyboard buffer is flushed of extra keys before starting
;any key on the keyboard will stop the recording trecord PROC    NEAR 0364  E8 041E R          call    clear_inbuffer              ;clear any pending chars.
```

```
                        ; activate record mode

0347  BA 0380                   mov     dx,VOX_PORT
034A  2B C9                     sub     cx,cx               ; to zero cx
034C  FA                        cli                         ; disable interrupts
034D                   rclklo0:
034D  41                        inc     cx                  ; cnt for time out if no v_clk
034E  74 6B                     jz      errtn               ; when count rolls to 0 quit rtn error
0370  EC                        in      al,dx               ; read data at port
0371  A8 80                     test    al,VMASK            ; loop while vclk low
0373  74 FB                     jz      rclklo0
0375  2B C9                     sub     cx, cx              ; set cx to count down to zero
0377                   rclkhi0:
0377  41                        inc     cx                  ; cnt for time out if no v_clk
0378  74 5E                     jz      errtn               ; when count rolls to 0 quit rtn error
037A  EC                        in      al,dx
037B  A8 80                     test    al,VMASK            ; loop while vclk high
037D  75 F8                     jnz     rclkhi0
037F  B0 80                     mov     al,REC_CMD          ; must wait one clock
0381  EE                        out     dx,al               ; for valid data out
0382                   rclklo1:
0382  EC                        in      al,dx
0383  A8 80                     test    al,VMASK            ; loop while vclk low
0385  74 FB                     jz      rclklo1

; init for recording

0387  BF 0008                   mov     di,BYTE_SIZE        ; set di to bits per byte
038A  BB 0000                   mov     bx,0000
038D  B9 FFF0                   mov     cx,BUFFER_SIZE      ; set cx to length of buffer
0390  8E 06 00B4 R              mov     es,buffer_segment
0394                   recloop:                             ; start of record loop ; check for end of record 0394  BA 0060                   mov     dx,IBMSTAT
0397  EC                        in      al,dx
0398  A8 60                     test    al,IBMMASK
039A  75 2B                     jnz     endrec
039C  BA 0380                   mov     dx,VOX_PORT
039F  BE 0004                   mov     si,SAMPLE_SIZE      ; set si to bits per sample
03A2                   rclkhi2:
03A2  EC                        in      al,dx               ; read data at port
03A3  A8 80                     test    al,VMASK
             (?)                jnz     rclkhi2             ; loop while V_CLK high
03A7                   rclklo2:
03A7  EC                        in      al,dx
03A8  A8 80                     test    al,VMASK            ; loop while V_CLK low
03AA  74 FB                     jz      rclklo2

; valid data
```

```
                    recshift:
03AC  D0 DB                   rcr     al, 1           ; rotate data into carry reg
03AE  D0 DC                   rcr     ah, 1           ; rotate carry into ah
03B0  4F                      dec     di              ; reduce bits remaining per byte
03B1  74 05                   jz      savdata         ; if no more space save byte
03B3  4E                      dec     si              ; reduce bits per sample
03B4  74 DE                   jz      recloop         ; if end of sample get new sample
03B6  EB F4                   jmp     recshift savdata:
03B8  26: 88 27               mov     BYTE PTR es:[bx],ah ; move packed data into memory
03BB  43                      inc     bx              ; point to next byte
03BC  BF 0008                 mov     di,BYTE_SIZE    ; reset bits remaining in byte
03BF  49                      dec     cx              ; reduce buffer size
03C0  74 23                   jz      over4rec        ; if more room continue
03C2  4E                      dec     si
03C3  74 CF                   jz      recloop
03C5  EB E5                   jmp     recshift endrec:
03C7  FB                      sti                     ; end of record
03C7  E8 03F6 R               call    init_vox        ; enable interrupts
03CD  A7 1E 00B2 R            mov     length_of_speech,bx
03CF  E8 03FD R               call    smooth
03D2  E8 041E R               call    clear_inbuffer  ; clear the key that stopped the speech
03D5  E9 00F0 R               jmp     normal_exit     ; all done errtn:
03D8  FB                      sti                     ; return with error.
03D9  C7 06 00B2 R 0000       mov     length_of_speech,0000 ; enable interrupts
03DF  B8 001C                 mov     ax,2B           ; VCLK timeout
03E2  E9 00F0 R               jmp     error_exit      ; all done over4rec:
03E5  FB                      sti
03E6  E8 03F6 R               call    init_vox
03E9  A7 1E 00B2 R            mov     length_of_speech,bx
03ED  E8 03FD R               call    smooth
03F0  B8 001D                 mov     ax,29           ; buffer overflow
03F3  E9 00F0 R               jmp     error_exit init_vox:
03F6  BA 03B0                 mov     dx,VOX_PORT     ; address of vox card i/o port
03F9  B0 C0                   mov     al,RESET_CMD
03FB  EE                      out     dx,al           ; set vox card to idle
03FC  C3                      ret smooth:
03FD  8F 06 00B4 R            mov     es,buffer_segment
0401  BB 0000                 mov     bx,0000
04B4  B9 0008                 mov     cx,8
```

```
                              mov     di,OFFSET quiet4
04A7   BF 0416 R smooth_it:
040A   2E: 8A 05          mov     al,cs:[di]
040A   26: 88 07          mov     BYTE PTR es:[bx],al
040D   43                 inc     bx
0410   47                 inc     di
0411   47                 inc     di
0412   49                 dec     cx
0413   75 F5              jnz     smooth_it
0415   C3                 ret 0416   80 80 80 80 80 80 80  quiet4  DB 80h,80h,80h,80h,80h,80h,80h,80h
       80 trecord ENDP clear_inbuffer:
041E   B4 01              mov     ah,1
041E   CD 16              int     16h
0420   74 06              jz      no_char_pending
0422   B4 00              mov     ah,0
0424   CD 16              int     16h
0426   EB F4              jmp     clear_inbuffer no_char_pending:
042A   C3                 ret ;tsave - saves the speech buffer in a file
                  ;        mov   al,0
                  ;        int   70h tsave   PROC    NEAR 042B   83 3E 00B2 R 00    cmp     WORD PTR length_of_speech,0000
0430   77 06              ja      save_ok
0432   B8 0019            mov     ax,25          ;"No message in buffer"
0435   E9 00FB R          jmp     error_exit save_ok:
0438   E8 0ACF R          call    create_rec_name
043B   BA 000D R          mov     dx,OFFSET name_rec
043E   C6 06 00A7 R FF    mov     BYTE PTR entry_header,0Ffh
0443   B9 0000            mov     cx,0000        ;file attribute
0446   B8 3C00            mov     ax,FCREATE
0449   CD 21              int     21h
044B   73 03              jnc     create_ok
044D   E9 00FB R          jmp     error_exit create_ok:
0450   A3 0095 R          mov     rec_handle,ax 0453   A1 00B2 R          mov     ax,length_of_speech
```

```
0456   05 000B            add    ax,SIZE_OF_ENTRY_HEADER
0459   A3 00AB R          mov    length_of_record,ax 045C   8B 1E 0095 R       mov    bx,rec_handle
0460   8D 16 00A7 R       lea    dx,entry_header
0464   B9 000B            mov    cx,SIZE_OF_ENTRY_HEADER
0467   B8 4000            mov    ax,FWRITE
046A   CD 21              int    21h
046C   8B 0E 00B2 R       mov    cx,length_of_speech
0470   BA 0000            mov    dx,0000         ;ds:dx is offset to buffer
0473   8B 1E 0095 R       mov    bx,rec_handle
0477   1E                 push   ds
0478   A1 00B4 R          mov    ax,buffer_segment
047B   8E D8              mov    ds,ax
047D   B8 4000            mov    ax,FWRITE
0480   CD 21              int    21h
0482   1F                 pop    ds
0483   73 03              jnc    write_ok
0485   E9 00FB R          jmp    error_exit write_ok:
0488   B0 3E00            mov    ax,FCLOSE
048B   8B 1E 0095 R       mov    bx,rec_handle
048F   CD 21              int    21h
0491   E9 00FB R          jmp    normal_exit t_save  ENDP create_names:
04A4   8E 46 02           mov    es,[bp+2]                      ;get segment of filespec
04A7   8C 06 0002 R       mov    filespec_seg,es                ;save segment of input spec
04AB   8B 76 0E           mov    si,[bp+14]                     ;get offset
04AE   89 36 0000 R       mov    filespec_ptr,si                ;save offset to input file spec
04A2   BF 0065 R          mov    di,OFFSET name_tix
04A5   E8 04F1 R          call   get_name                       ;process incoming file name
04A8   BE 009B R          mov    si,OFFSET tix_ext
04AB   8C D8              mov    ax,ds
04AD   8E C0              mov    es,ax
04AF   B9 0004            mov    cx,4
04B2   F3/ A4             rep    movsb
04B4   C6 05 00           mov    BYTE PTR [di],00               ;terminate string (make it asciz)
04B7   33 C9              xor    cx,cx
04B9   8A CB              mov    cl,bl
04BB   BE 0065 R          mov    si,OFFSET name_tix
04BE   BF 0039 R          mov    di,OFFSET name_tfl
04C1   F3/ A4             rep    movsb
04C3   BE 0097 R          mov    si,OFFSET tfl_ext
04C6   B9 0004            mov    cx,4
04C9   F3/ A4             rep    movsb
04CB   C6 05 00           mov    BYTE PTR [di],00
04CE   C3                 ret
```

```
                    create_rec_name:
04CF                        mov     si,[bp+14]
04CF  BB 76 0E              mov     rec_ptr,si
04D2  B9 36 000B R          mov     es,[bp+02]
04D6  BE A6 02              mov     rec_seg,es
04D9  BC 06 000A R          mov     di,OFFSET name_rec
04DD  BF 000D R             call    get_name
04E0  EB 04F1 R             mov     si,OFFSET rec.ext
04E3  BE 009F R             push    ds
04E6  1E                    pop     es
04E7  07                    mov     cx,4
04E8  B9 0004               rep     movsb
04EB  F3/ A4                mov     BYTE PTR [di],00
04ED  C6 05 00              ret
04F0  C3

;es = file name segment pointer
                    ;si = file name offset pointer
                    ;di = pointer to buffer for storage get_name:
04F1  B1 09                 mov     cl,9            ;character counter
04F1  B3 00                 mov     bl,0
04F3  C6 06 000C R 00       mov     BYTE PTR drive_flag,00  ;only one drive spec allowed move_name:
04FA  26: BA 04             mov     al,es:[si]
04FF  3C 20                 cmp     al,' '
04FF  74 5B                 jz      move_done
0501  3C 2E                 cmp     al,'.'
0503  74 54                 jz      move_done
0505  3C 0D                 cmp     al,CR
0507  74 50                 jz      move_done
0509  3C 00                 cmp     al,0
050B  74 4C                 jz      move_done
050D  3C 50                 cmp     al,'0'
050F  7C 2F                 jl      bad_name
0511  3C 39                 cmp     al,'9'
0513  7E 33                 jle     char_okay
0515  3C 3A                 cmp     al,':'
0517  75 15                 jnz     not_drive
0519  80 3E 000C R 00       cmp     BYTE PTR drive_flag,00
051E  75 20                 jnz     bad_name
0520  C6 06 000C R FF       mov     BYTE PTR drive_flag,0FFH
0525  80 F9 08              cmp     cl,8
0528  75 16                 jnz     bad_name
052A  B1 0A                 mov     cl,10           ;reset name counter and allow for ':'
052C  EB 1A                 jmp     SHORT char_okay not_drive:
052E                        and     al,5Fh          ;make upper case
052E  24 5F                 cmp     al,'A'
0530  3C 41
```

```
0532  7C 0C                      jl     bad_name
0534  3C 5A                      cmp    al,'Z'
0536  7E 10                      jle    char_okay
0538  3C 5C                      cmp    al,'\'
053A  75 04                      jnz    bad_name
053C  B1 0A                      mov    cl,10
053E  EB 0D                      jmp    SHORT char_okay 0540         bad_name:
0540  58                         pop    ax                  ;clear 'get_name' return address
0541  58                         pop    ax                  ;clear 'create_name' return address
0542  B8 0013                    mov    ax,19               ;bad file name
0545  E9 00FB R                  jmp    error_exit 0548         char_okay:
0548  88 05                      mov    BYTE PTR [di],al
054A  46                         inc    si
054B  47                         inc    di
054C  FE C3                      inc    bl                  ;count chars in name
054E  80 FB 2B                   cmp    bl,MAX_SPEC         ;filespec overflow?
0551  7D ED                      jge    bad_name
0553  FE C9                      dec    cl
0555  75 A3                      jnz    move_name
0557  EB E7                      jmp    bad_name            ;max out chars before terminator found 0559         move_done:
0559  C3                         ret 055A         num_check:
055A  8B 26 00A6 R               mov    sp,entry_num,ah
055A  A0 00A6 R                  mov    al,entry_num
055E  3A 06 00A5 R               cmp    al,number_of_entries
0561  7C 07                      jl     entry_num_ok
0563  58                         pop    ax
0564  B8 0018                    mov    ax,24               ;entry number requested is too big
0567  E9 00FB R                  jmp    error_exit 056A         entry_num_ok:
056A  C3                         ret ;compare input filespec name with current tix name.
;Checks only name up to extension or terminator.

056F         name_check:
056F  8E 46 02                   mov    es,[bp+02]          ;get input filespec segment
0572  8C 06 0006 R               mov    check_seg,es
0576  8B 76 0E                   mov    si,[bp+14]          ;get input filespec offset
0579  89 36 0004 R               mov    check_ptr,si
057D  BF 0065 R                  mov    di,OFFSET name_tix 0580         check_loop:
0580  8A 05                      mov    al,[di]
```

```
0582  3C 2E              cmp    al,'.'              ;done with tix name?
0584  74 2C              jz     check_done
0586  26: 8A 1C          mov    bl,es:[si]
0587  80 FB 30           cmp    bl,'0'
058C  7C 30              jl     mismatch
058E  80 FB 39           cmp    bl,'9'
0591  7E 17              jle    ok_to_compare
0593  80 FB 3A           cmp    bl,':'
0596  74 12              jz     ok_to_compare
0598  80 E3 5F           and    bl,5Fh
059B  80 FB 41           cmp    bl,'A'
059E  7C 2A              jl     mismatch
05A0  80 FB 5A           cmp    bl,'Z'
05A3  7E 05              jle    ok_to_compare
05A5  80 FB 5C           cmp    bl,'\'
05A8  75 21              jnz    mismatch
05AA                ok_to_compare:
05AA  3A C3              cmp    al,bl
05AC  75 1D              jnz    mismatch
05AE  46                 inc    si
05AF  47                 inc    di
05B0  EB CE              jmp    check_loop 05B2                check_done:                     ;we hit '.' in name tix. Next char in filespec better
05B2  26: 80 3C 20       cmp    BYTE PTR es:[si],' '    ;be '/' or ';' or CR or 0.
05B6  74 12              jz     match
05B8  26: 80 3C 2E       cmp    BYTE PTR es:[si],'.'
05BC  74 OC              jz     match
05BE  26: 80 3C 0D       cmp    BYTE PTR es:[si],CR
05C2  74 06              jz     match
05C4  26: 80 3C 00       cmp    BYTE PTR es:[si],0
05C8  75 01              jnz    mismatch
05CA  C3          match: ret 05CB                mismatch:
05CB  58                 pop    ax                  ;get rid of return address off stack
05CC  B8 001A            mov    ax,26               ;filespec did not match
05CF  E9 00FB R          jmp    error_exit ;Look for file 'intro.vox' on disk and play it if it exists.

;play_intro:
                        mov    ax,SETDTA
                        mov    dx,OFFSET search_buf
                        int    21h
                        mov    ax,FILESEARCH
                        mov    cx,0                ;normal
                        mov    dx,OFFSET intro_name
                        int    21h
                        jc     no_intro
```

BEST AVAILABLE COPY

```
                        mov     dx,OFFSET intro_name
                        call    load_vox
                        call    play_msg
                no_intro:
                        ret
05D2
                code    ENDS 0000            data    SEGMENT para public 'DATA'

0000  ????            filespec_ptr    DW      ?
0002  ????            filespec_seg    DW      ?
0004  ????            check_ptr       DW      ?
0006  ????            check_seg       DW      ?
0008  ????            rec_ptr         DW      ?
000A  ????            rec_seg         DW      ?

000C  ??              drive_flag      DB      ?
000D  002C[           name_rec        DB      MAX_SPEC+4 DUP (0)
         00
      ]

0039  002C[           name_tfl        DB      MAX_SPEC+4 DUP (0)
         00
      ]

0065  002C[           name_tix        DB      MAX_SPEC+4 DUP (0)
         00
      ]

0091  ????            tfl_handle      DW      ?
0093  ????            tix_handle      DW      ?
0095  ????            rec_handle      DW      ?
0097  2E 54 46 4C     tfl_ext         DB      '.TFL'
009B  2E 54 49 58     tix_ext         DB      '.TIX'
009F  2E 52 45 43     rec_ext         DB      '.REC'
00A3  ????            tix_length      DW      ?
00A5  ??              number_of_entries DB    ?
00A6  ??              entry_num       DB      ?

00A7  ??              entry_header                            ;11 byte image of talk file entry begins here
00A8  ????            length_of_record DW     ?               ;length of absolute talk entry
00AA  000B[                            DB     0 DUP (?)       ;name of talk entry
         ??
      ]

00B2  ????            length_of_speech DW     ?               ;length of speech data in talk entry
00B4  ????            buffer_segment   DW     ?
```

```
0046  03C0E                        tix_buffer         DB TIX_BUFLEN DUP (?)
      ??

= 0476                              prog_end          EQU   $ 0476                                data              ENDS
                                                      END
```

Microsoft (R) Macro Assembler Version 4.00                    4/20/87 09:26:29
TENSPEAK.ASM Hooks to TENCORE language for VoxCard            Symbols-1

Segments and Groups:

| N a m e | Size | Align | Combine Class |
|---------|------|-------|---------------|
| CODE . . . . . . . . . . . . . . . | 05D2 | BYTE | PUBLIC 'CODE' |
| DATA . . . . . . . . . . . . . . . | 0476 | PARA | PUBLIC 'DATA' |

Symbols:

| N a m e | Type | Value | Attr |
|---------|------|-------|------|
| ALREADY_STRING . . . . . . . . . . | L BYTE | 0066 | CODE |
| BAD_NAME . . . . . . . . . . . . . | L NEAR | 0540 | CODE |
| BAD_VOX_FILE . . . . . . . . . . . | L NEAR | 032A | CODE |
| BUFFER_OCCUPIED . . . . . . . . . | L NEAR | 0277 | CODE |
| BUFFER_SEGMENT . . . . . . . . . . | L WORD | 0084 | DATA |
| BUFFER_SIZE . . . . . . . . . . . | Number | FFF0 |  |
| BYTE_SIZE . . . . . . . . . . . . | Number | 0008 |  |
| CHAR_OKAY . . . . . . . . . . . . | L NEAR | 054B | CODE |
| CHECK_TONE . . . . . . . . . . . . | L NEAR | 05B2 | CODE |
| CHECK_LOOP . . . . . . . . . . . . | L NEAR | 05B0 | CODE |
| CHECK_PTR . . . . . . . . . . . . | L WORD | 0004 | DATA |
| CHECK_SEG . . . . . . . . . . . . | L WORD | 0006 | DATA |
| CLEAR_INBUFFER . . . . . . . . . . | L NEAR | 041E | CODE |
| CR . . . . . . . . . . . . . . . . | Number | 000D |  |
| CREATE_NAMES . . . . . . . . . . . | L NEAR | 0494 | CODE |
| CREATE_OK . . . . . . . . . . . . | L NEAR | 0450 | CODE |
| CREATE_REC_NAME . . . . . . . . . | L NEAR | 04CF | CODE |
| DRIVE_FLAG . . . . . . . . . . . . | L BYTE | 000C | DATA |

| Symbol | Type | Value | Segment |
|---|---|---|---|
| ENDFLY | L NEAR | 02E5 | CODE |
| ENDREC | L NEAR | 03C7 | CODE |
| ENTRY_HEADER | L BYTE | 00A7 | DATA |
| ENTRY_NUM | L BYTE | 00A8 | DATA |
| ENTRY_NUM_OK | L NEAR | 056E | CODE |
| EPARTN | L NEAR | 02EC | CODE |
| ERROR_EXIT | L NEAR | 00FB | CODE |
| ERRTN | L NEAR | 0308 | CODE |
| FCLOSE | Number | 3E00 | |
| FCREATE | Number | 3C00 | |
| FILESPEC_PTR | L WORD | 0000 | DATA |
| FILESPEC_SEG | L WORD | 0002 | DATA |
| FOPEN | Number | 3D00 | |
| FREAD | Number | 3F00 | |
| FWRITE | Number | 4000 | |
| GET_NAME | L NEAR | 04F1 | CODE |
| IMMASK | Number | 0040 | |
| IMSTAT | Number | 0060 | |
| INIT_TENSPEAK | N PROC | 0000 | CODE Length = 00A0 |
| INIT_VOX | L NEAR | 03F6 | CODE |
| INT_HANDLER | F PROC | 00A0 | CODE Length = 006B |
| LEGAL_TIX | L NEAR | 01B6 | CODE |
| LENGTH_OF_RECORD | L WORD | 00AB | DATA |
| LENGTH_OF_SPEECH | L WORD | 00B2 | DATA |
| LF | Number | 000A | |
| LOADDATA | L NEAR | 02D6 | CODE |
| LSEEK | Number | 4200 | |
| MATCH | L NEAR | 05CA | CODE |
| MAX_SPEC | Number | 0028 | |
| MAX_TIX | Number | 0050 | |
| MISMATCH | L NEAR | 05CB | CODE |
| MOVE_DONE | L NEAR | 0559 | CODE |
| MOVE_NAME | L NEAR | 04FA | CODE |
| NAME_CHECK | L NEAR | 056F | CODE |
| NAME_REC | L BYTE | 000D | DATA Length = 002C |
| NAME_TFL | L BYTE | 0039 | DATA Length = 002C |
| NAME_TIX | L BYTE | 0065 | DATA Length = 002C |
| NORMAL_EXIT | L NEAR | 00F8 | CODE |
| NOT_00 | L NEAR | 00BB | CODE |
| NOT_01 | L NEAR | 00C2 | CODE |
| NOT_02 | L NEAR | 00C9 | CODE |
| NOT_03 | L NEAR | 00D0 | CODE |
| NOT_04 | L NEAR | 00D7 | CODE |
| NOT_05 | L NEAR | 00DE | CODE |
| NOT_06 | L NEAR | 00E5 | CODE |

| Name | Type | Address | Segment | |
|---|---|---|---|---|
| NOT_07 | L NEAR | 00EC | CODE | |
| NOT_08 | L NEAR | 00F3 | CODE | |
| NOT_DRIVE | L NEAR | 052E | CODE | |
| NOT_LOADED | L NEAR | 0024 | CODE | |
| NOT_OCCUPIED | L NEAR | 0131 | CODE | |
| NOT_SO_BIG | L NEAR | 0168 | CODE | |
| NOT_TOO_BIG | L NEAR | 0180 | CODE | |
| NO_CHAR_PENDING | L NEAR | 042A | CODE | |
| NUMBER_OF_ENTRIES | L BYTE | 00A5 | DATA | |
| NUM_CHECK | L NEAR | 055A | CODE | |
| OK_TO_COMPARE | L NEAR | 05AA | CODE | |
| OPEN_REC_OK | L NEAR | 0309 | CODE | |
| OPEN_TFL_OK | L NEAR | 01CE | CODE | |
| OPEN_TIX_OK | L NEAR | 0143 | CODE | |
| OVERAREC | L NEAR | 03E5 | CODE | |
| PCLKHI0 | L NEAR | 0291 | CODE | |
| PCLKHI2 | L NEAR | 028C | CODE | |
| PCLKL00 | L NEAR | 0287 | CODE | |
| PCLKL01 | L NEAR | 029C | CODE | |
| PCLKL02 | L NEAR | 02C1 | CODE | |
| PLAY_CMD | Number | 0000 | | |
| FLYLOOP | L NEAR | 0280 | CODE | |
| PLYSHIFT | L NEAR | 02CA | CODE | |
| PROG_END | NEAR | 0476 | DATA | |
| QUIETA | L BYTE | 0416 | CODE | |
| RCLKHI0 | L NEAR | 0377 | CODE | |
| RCLKHI2 | L NEAR | 03A2 | CODE | |
| RCLKL00 | L NEAR | 036D | CODE | |
| RCLKL01 | L NEAR | 0382 | CODE | |
| RCLKL02 | L NEAR | 03A7 | CODE | |
| READ_ONLY | N PROC | 0100 | CODE | |
| READ_REC_OK | L NEAR | 031E | CODE | |
| READ_REST_OK | L NEAR | 0234 | CODE | |
| READ_TFL_OK | L NEAR | 0213 | CODE | |
| READ_TIX_OK | L NEAR | 01BE | CODE | |
| RECLOOP | L NEAR | 0394 | CODE | |
| RECSHIFT | L NEAR | 03AC | CODE | |
| REC_CLOSE_OK | L NEAR | 0361 | CODE | |
| REC_CMD | Number | 0080 | | |
| REC_EXT | L BYTE | 009F | | |
| REC_HANDLE | L WORD | 0095 | | |
| REC_PTR | L WORD | 0008 | | |
| REC_REST_OK | L NEAR | 0350 | CODE | |
| REC_SEG | L WORD | 009A | DATA | |
| RESET_CMD | Number | 00C0 | | |
| RE_SEEK_OK | L NEAR | 017D | CODE | |

| | | | |
|---|---|---|---|
| SAMPLE_SIZE . . . . . . . . . . . . . | Number | 0004 | |
| SAVDATA . . . . . . . . . . . . . . . | L NEAR | 0318 | CODE |
| SAVE_OK . . . . . . . . . . . . . . . | L NEAR | 043B | CODE |
| SEEK_OK . . . . . . . . . . . . . . . | L NEAR | 01FE | CODE |
| SIGNON_STRING . . . . . . . . . . . . | L BYTE | 0082 | CODE |
| SIZE_OF_ENTRY_HEADER . . . . . . . . . | Number | 000B | |
| SIZE_OF_TIX_ENTRY . . . . . . . . . . | Number | 000C | |
| SMOOTH . . . . . . . . . . . . . . . . | L NEAR | 03FD | CODE |
| SMOOTH_IT . . . . . . . . . . . . . . | L NEAR | 040A | CODE |
| | | | |
| TCLOSE . . . . . . . . . . . . . . . . | N PROC | 0238 | CODE  Length = 001B |
| TENINIT . . . . . . . . . . . . . . . | N PROC | 010B | CODE  Length = 001D |
| TFL_EXT . . . . . . . . . . . . . . . | L BYTE | 0097 | DATA |
| TFL_HANDLE . . . . . . . . . . . . . . | L WORD | 0091 | DATA |
| TIX_BUFFER . . . . . . . . . . . . . . | L BYTE | 00B6 | DATA |
| TIX_BUFLEN . . . . . . . . . . . . . . | Number | 03C0 | Length = 03C0 |
| TIX_EXT . . . . . . . . . . . . . . . | L BYTE | 009B | DATA |
| TIX_HANDLE . . . . . . . . . . . . . . | L WORD | 0093 | DATA |
| TIX_LENGTH . . . . . . . . . . . . . . | L WORD | 00A3 | DATA |
| TIX_SEEK_OK . . . . . . . . . . . . . | L NEAR | 0156 | CODE |
| TLOAD . . . . . . . . . . . . . . . . | N PROC | 02F3 | CODE  Length = 0071 |
| TOPEN . . . . . . . . . . . . . . . . | N PROC | 0125 | CODE  Length = 00AC |
| TREAD . . . . . . . . . . . . . . . . | N PROC | 0101 | CODE  Length = 000C |
| TRECORD . . . . . . . . . . . . . . . | N PROC | 0364 | CODE  Length = 00BA |
| TSAVE . . . . . . . . . . . . . . . . | N PROC | 042B | CODE  Length = 0087 |
| TSAY . . . . . . . . . . . . . . . . . | N PROC | 0253 | CODE  Length = 0016 |
| TSAY_OK . . . . . . . . . . . . . . . | L NEAR | 0260 | CODE |
| TSPEAK . . . . . . . . . . . . . . . . | N PROC | 0269 | CODE  Length = 008A |
| | | | |
| VMASK . . . . . . . . . . . . . . . . | Number | 0080 | |
| VOX_FILE_OK . . . . . . . . . . . . . | L NEAR | 0330 | CODE |
| VOX_PORT . . . . . . . . . . . . . . . | Number | 0380 | |
| | | | |
| WRITE_OK . . . . . . . . . . . . . . . | L NEAR | 04BB | CODE |

1071 Source Lines
1071 Total Lines
 163 Symbols

45192 Bytes symbol space free

0 Warning Errors
  0 Severe Errors

What is claimed is:

1. An interactive instruction apparatus comprising:
video display means for presenting video messages selected to exercise student reading and comprehension skills;
audio output means for presenting audio messages selected to exercise student listening skills;
audio input means for receiving audio responses selected to exercise student speaking skills;
text input means for receiving text responses selected to exercise student writing skills;
student speech reproduction means for receiving, digitizing and reproducing a student speech response;
reference response generation means for generating a reference speech response from a digital recording;
exercising generating means for generating a series of exercises, said exercises comprising: the presentation of video messages through the video display means, the presentation of audio messages through the audio output means, the reception of text responses through the text input means and the reception of audio responses through the audio input means,
at least one of said exercises including a message for prompting a student speech response, an interactive period during which the student speech reproduction means receives and reproduces a student speech response and the reference response generation means generates a reference response in comparative relation with the student response, thereby allowing the student to compare the student speech response with the reference speech response; and
exercise control means responsive to the student for either 1) autonomously signaling the exercise generating means to generate an exercise, or alternatively 2) signaling the exercise generating means to repeat an interactive period.

2. An apparatus as in claim 1 wherein:
the message presenting means includes a plurality of presenting means, each for presenting a message to a student asynchronously with other presenting means;
the student speech reproduction means includes means for receiving and reproducing a plurality of asynchronous student speech responses;
the reference response generation means includes means for generating a plurality of reference responses, each in comparative association relation with a reproduced student speech response;
the exercise control means includes means responsive to each of a plurality of students for either 1) autonomously signaling the exercise generating means to generate an exercise for a student asynchronously with exercises for other students, or alternatively 2) signaling the exercise generating means to repeat an interactive period for an exercise for a student asynchronously with interactive period for other students.

3. An apparatus as in claim 2 wherein audio and video messages of an exercise simultaneously symbolize a student speech response associated with that exercise.

4. An apparatus as in claim 1 further comprising student response storage means for recording a student speech response of a medium separable from the apparatus.

5. An interactive instruction apparatus comprising:
message presenting means for presenting visual visual messages and for presenting audio messages of an exercise to a student;
message receiving means for receiving text and audio responses from a student;
student speech reproduction means for receiving and reproducing a student speech response;
reference response generation means for generating a reference speech response; and
exercise generating means connected to the message presenting means, to the message receiving means, to the student speech reproduction means and to the reference response generation means for generating a series of exercises, said exercises comprising the presentation of visual and audio messages, and the reception of text and audio responses;
wherein at least one of said exercises includes a message for prompting a student speech response, and an interactive period for receiving and reproducing a student speech response in comparative relation with a reference speech response; thereby allowing the student to compare the student speech response with the reference speech response.

* * * * *